US011761890B2

(12) United States Patent
Shimadzu et al.

(10) Patent No.: US 11,761,890 B2
(45) Date of Patent: Sep. 19, 2023

(54) FIRE DETECTION DEVICE

(71) Applicant: HOCHIKI Corporation, Tokyo (JP)

(72) Inventors: Tomohiko Shimadzu, Tokyo (JP);
Keisuke Washizu, Tokyo (JP);
Manabu Dohi, Tokyo (JP); Yasuharu Fujiwara, Tokyo (JP); Hideki Takano, Tokyo (JP)

(73) Assignee: HOCHIKI CORPORATION, Tokyo (JP)

( * ) Notice: Subject to any disclaimer, the term of this patent is extended or adjusted under 35 U.S.C. 154(b) by 357 days.

(21) Appl. No.: 17/156,359

(22) Filed: Jan. 22, 2021

(65) Prior Publication Data

US 2021/0255101 A1 Aug. 19, 2021

Related U.S. Application Data

(63) Continuation-in-part of application No. PCT/JP2019/011695, filed on Mar. 20, 2019.

(30) Foreign Application Priority Data

Jul. 24, 2018 (JP) ................................ 2018-138209
Jul. 24, 2018 (JP) ................................ 2018-138210
Jul. 24, 2018 (JP) ................................ 2018-138692

(51) Int. Cl.
*G01N 21/53* (2006.01)
*F21V 7/00* (2006.01)
(Continued)

(52) U.S. Cl.
CPC ........... *G01N 21/53* (2013.01); *F21V 7/0025* (2013.01); *G08B 17/107* (2013.01); *G08B 17/113* (2013.01)

(58) Field of Classification Search
CPC .... F21V 7/0025; G01N 21/53; G08B 17/107; G08B 17/113
See application file for complete search history.

(56) References Cited

U.S. PATENT DOCUMENTS

2005/0242967 A1 11/2005 Yamasaki et al.
2008/0218365 A1 9/2008 Kato
(Continued)

FOREIGN PATENT DOCUMENTS

CN 1691075 A 11/2005
JP 58-76991 U 5/1983
(Continued)

OTHER PUBLICATIONS

Supplementary European Search Report issued in European Paten Application No. 19840959.1 dated Feb. 2, 2022.
(Continued)

*Primary Examiner* — Tri T Ton
(74) *Attorney, Agent, or Firm* — Brian J. Colandreo; Jeffery T. Placker; Holland & Knight LLP

(57) ABSTRACT

An occurrence space 32A which is provided in a light shielding space 3A shielded from light from an outside and into which a detection target flows, a first light emitting unit 61A and a second light emitting unit that emit detection light along a first light emitting-side optical axis 611A and a second light emitting-side optical axis toward an occurrence space 32A, a light receiving unit that receives scattered light generated when detection light emitted from the first light emitting unit 61A and the second light emitting unit is scattered by a detection target flowing into the occurrence space 32A along a light receiving-side optical axis intersecting the first light emitting-side optical axis 611A and the second light emitting-side optical axis, and a smoke detection unit cover-side inclined portion 43A that primarily reflects the detection light emitted from the first light emit-
(Continued)

ting unit 61A and the second light emitting unit in a direction intersecting a plane defined by the first light emitting-side optical axis 611A, the second light emitting-side optical axis, and the light receiving-side optical axis are included.

8 Claims, 20 Drawing Sheets

(51) Int. Cl.
*G08B 17/107* (2006.01)
*G08B 17/113* (2006.01)

(56) References Cited

U.S. PATENT DOCUMENTS

| | | |
|---|---|---|
| 2013/0176131 A1 | 7/2013 | Pichard et al. |
| 2014/0063498 A1 | 3/2014 | Numao et al. |
| 2014/0111803 A1* | 4/2014 | Matsukuma ......... G08B 17/113 356/338 |
| 2015/0146204 A1 | 5/2015 | Shibuya et al. |

FOREIGN PATENT DOCUMENTS

| | | |
|---|---|---|
| JP | 60-13449 U | 1/1985 |
| JP | 11-248629 A | 9/1999 |
| JP | 2000-137378 A | 5/2000 |
| JP | 2005-309735 A | 11/2005 |
| JP | 2006-267128 A | 10/2006 |
| JP | 2011-248545 A | 12/2011 |
| JP | 2011-248547 A | 12/2011 |
| JP | 2012-256250 4 | 12/2012 |
| JP | 2012-256250 A | 12/2012 |
| JP | 2016-200979 A | 12/2016 |
| JP | 2017-107534 A | 6/2017 |
| JP | 2019-046111 A | 3/2019 |
| JP | 2019-046112 A | 3/2019 |
| WO | 2013030918 A1 | 3/2013 |
| WO | 2014033921 A1 | 3/2014 |
| WO | 2017073582 A1 | 5/2017 |

OTHER PUBLICATIONS

Communication pursuant to Article 94(3) issued in European Paten Application No. 19840959.1 dated Feb. 22, 2022.
1st Office Action dated Aug. 23, 2022 for the JP Application No. 2018-138209 with machine partial English translation.
Japanese Unexamined Patent Application Publication No. H09-231484 cited in Office Action dated Aug. 23, 2022 for JP Application No. 2018-138209 with machine partial English translation.
1st Office Action dated Aug. 23, 2022 for the JP Application No. 2018-138210 with machine partial English translation.
Japanese Unexamined Patent Application Publication No. 2011-215705 cited in Office Action dated Aug. 23, 2022 for JP Application No. 2018-138210 with machine partial English translation.
1st Office Action dated Aug. 23, 2022 for the JP Application No. 2018-138692 with machine partial English translation.
Japanese Unexamined Patent Application Publication No. 2021-60196 cited in Office Action dated Aug. 23, 2022 for JP Application No. 2018-138692 with machine partial English translation.
International Search Report and Written Opinion issued in International PCT Application No. PCT/JP2019/011695 dated Jun. 25, 2019, 50 pages.
Microfilm of the specification and drawings annexed to the request of Japanese Utility Model Application No. 172840/1981 (Laid-Open No. 76991/1983) (Yamato Protec Co.), May 24, 1983, p. 1, line 5 from the bottom to p. 2, line 7, p. 4, lines 5-7, p. 4, line 4 from the bottom to p. 5, line 2, fig. 1 (Family: none).
Microfilm of the specification and drawings annexed to the request of Japanese Utility Model Application No. 47877/1983 (Laid-Open No. 13449/1985) (Hochiki Corp.), Jan. 29, 1985, fig. 3-4 (Family: none).

* cited by examiner

[Fig. 1]
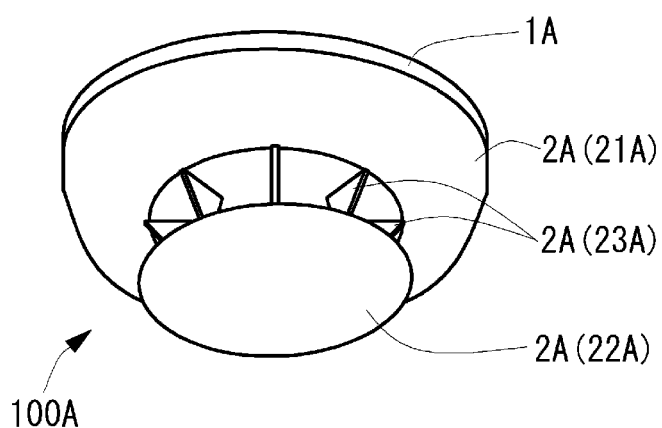
[Fig. 2]
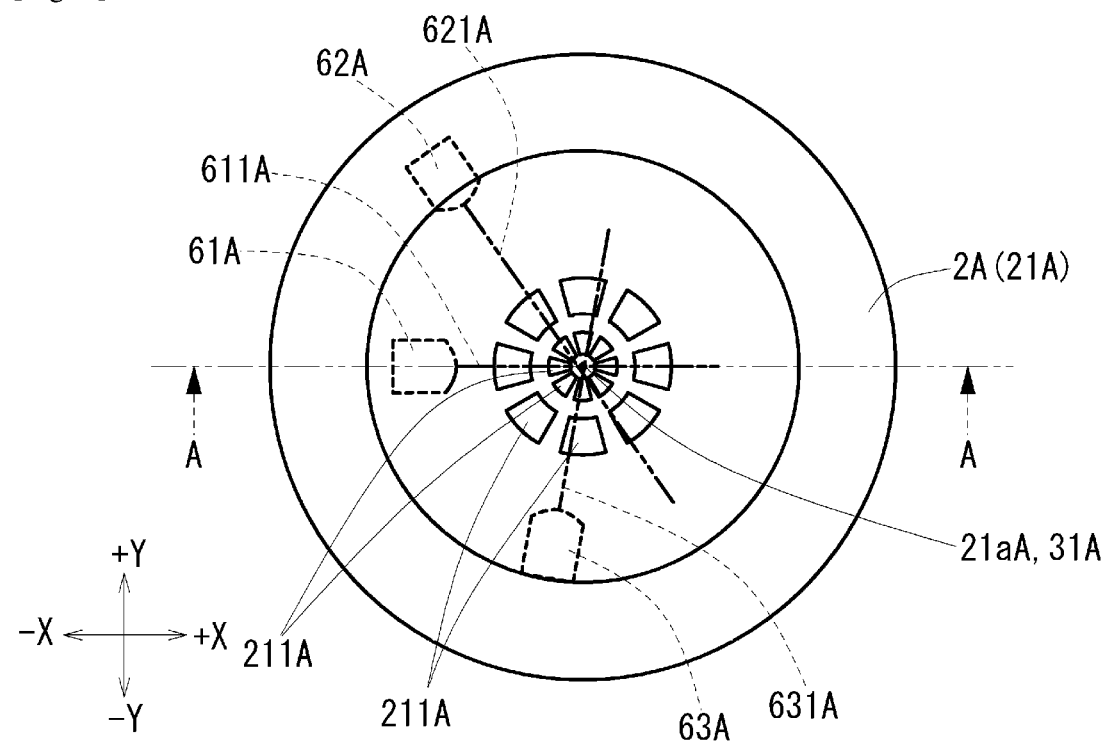

[Fig. 3]
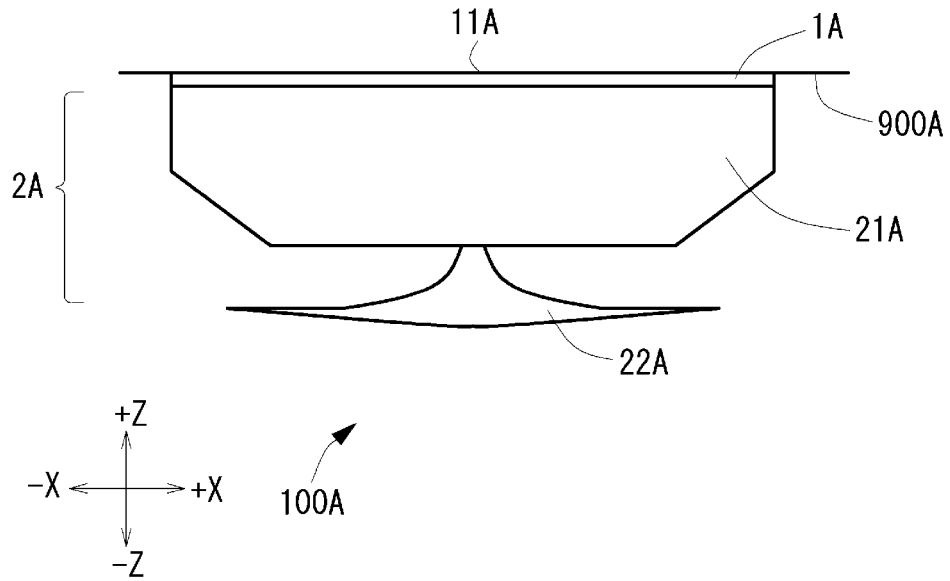
[Fig. 4]
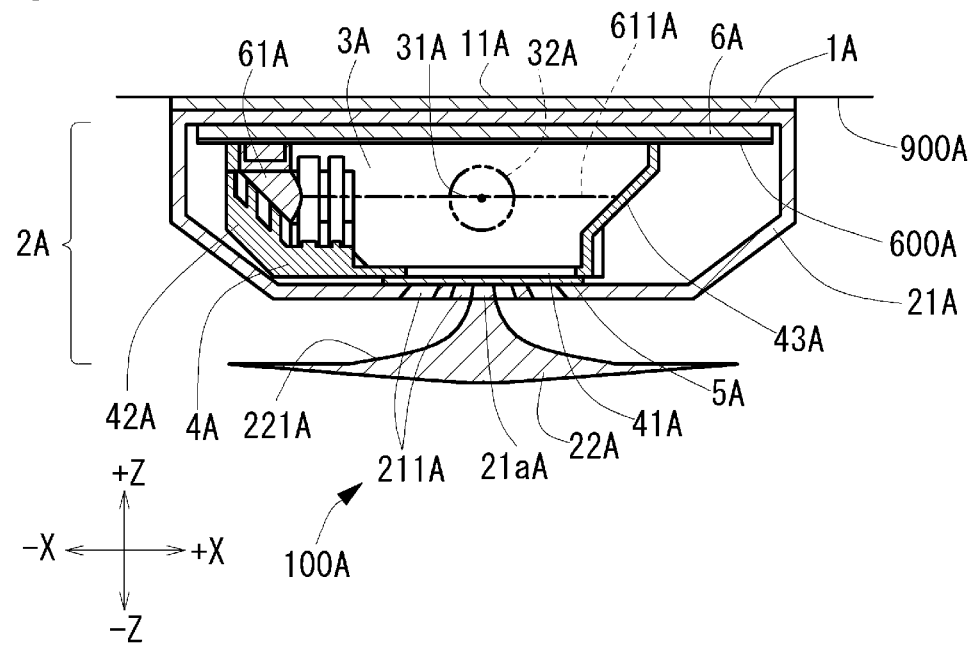

[Fig. 5]
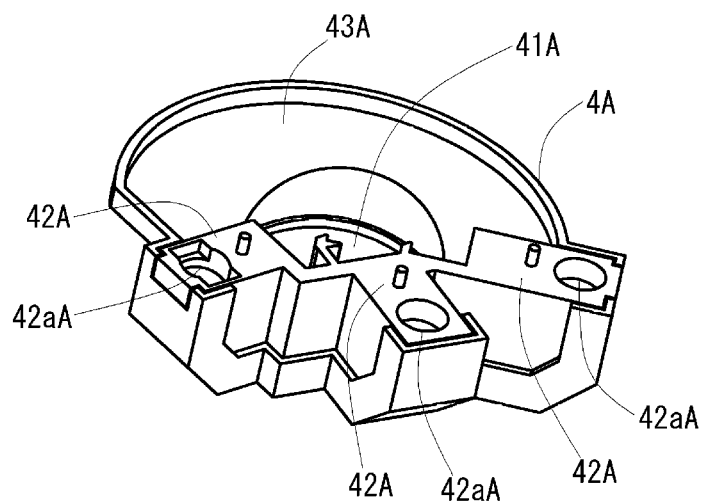
[Fig. 6]
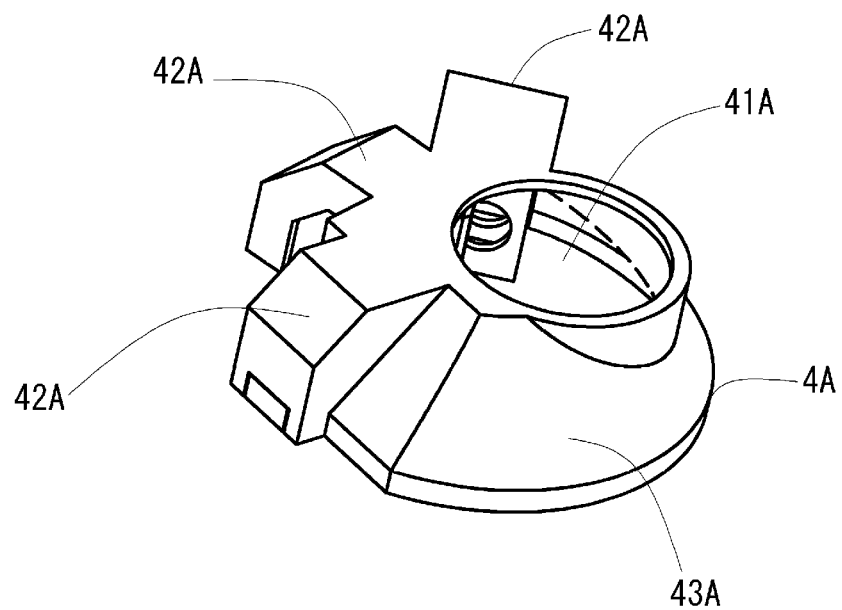

[Fig. 7]
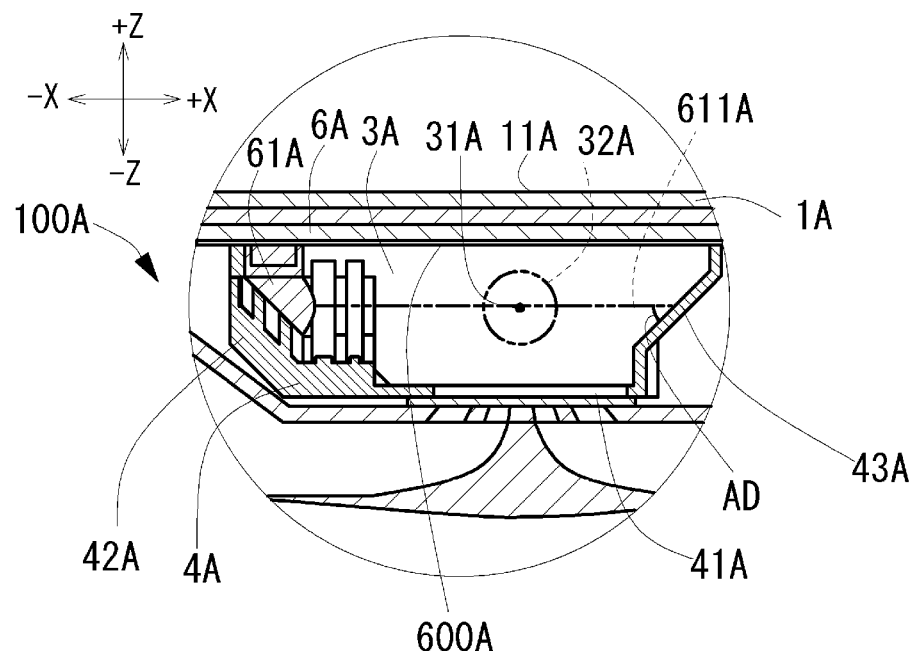
[Fig. 8]
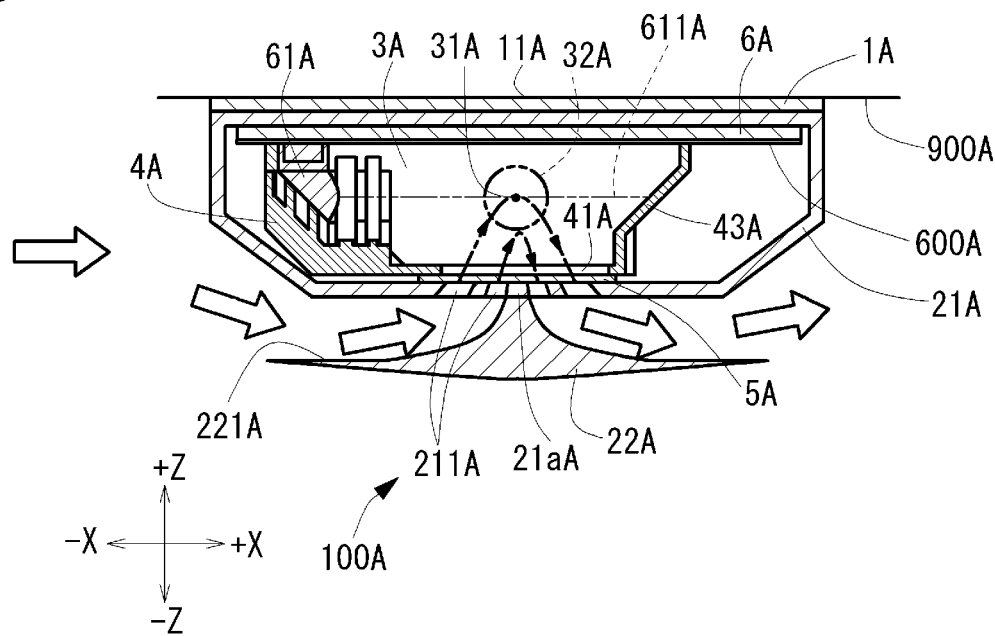

[Fig. 9]
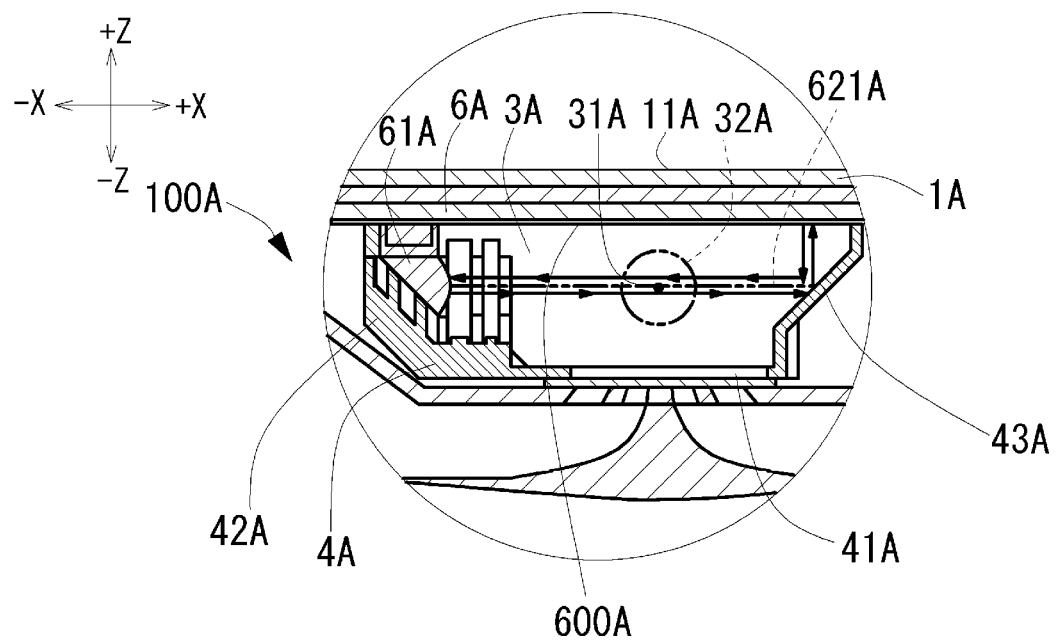
[Fig. 10]
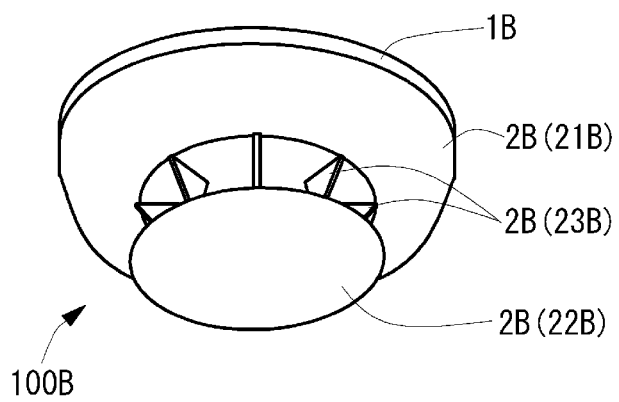

[Fig. 11]
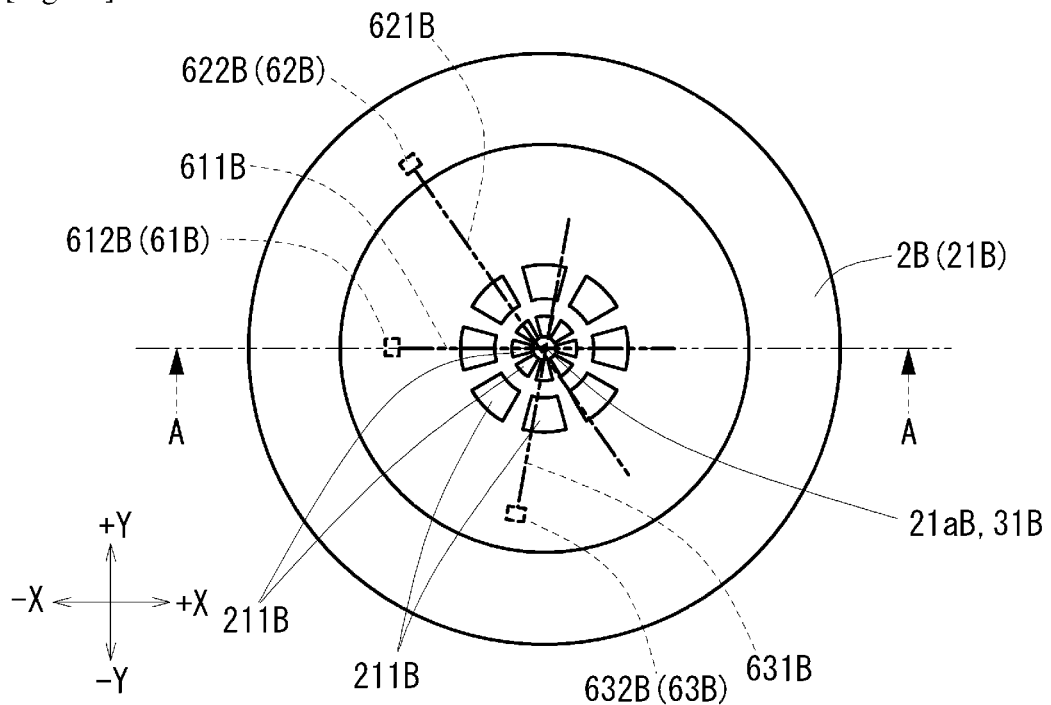
[Fig. 12]
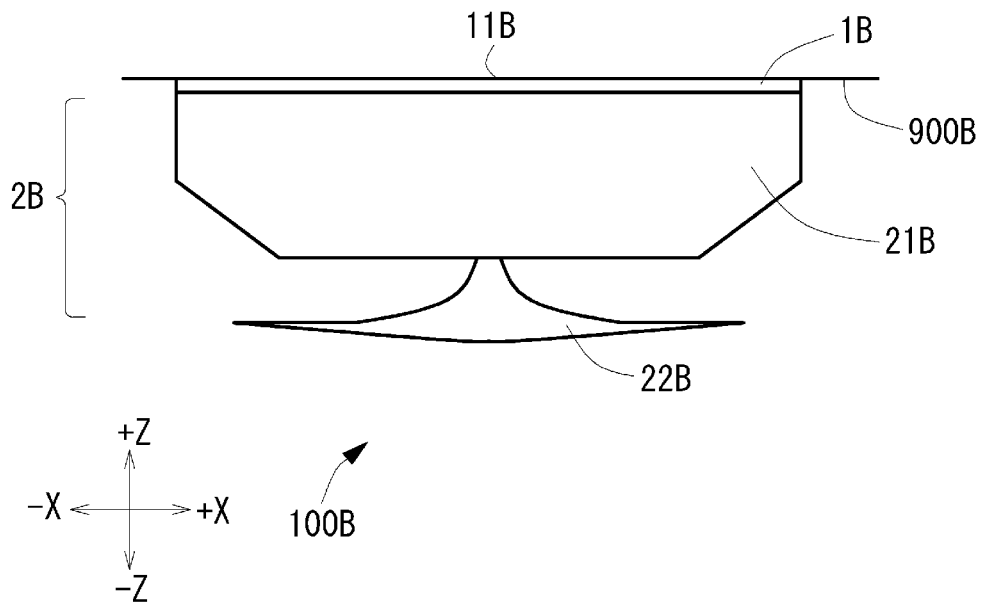

[Fig. 13]
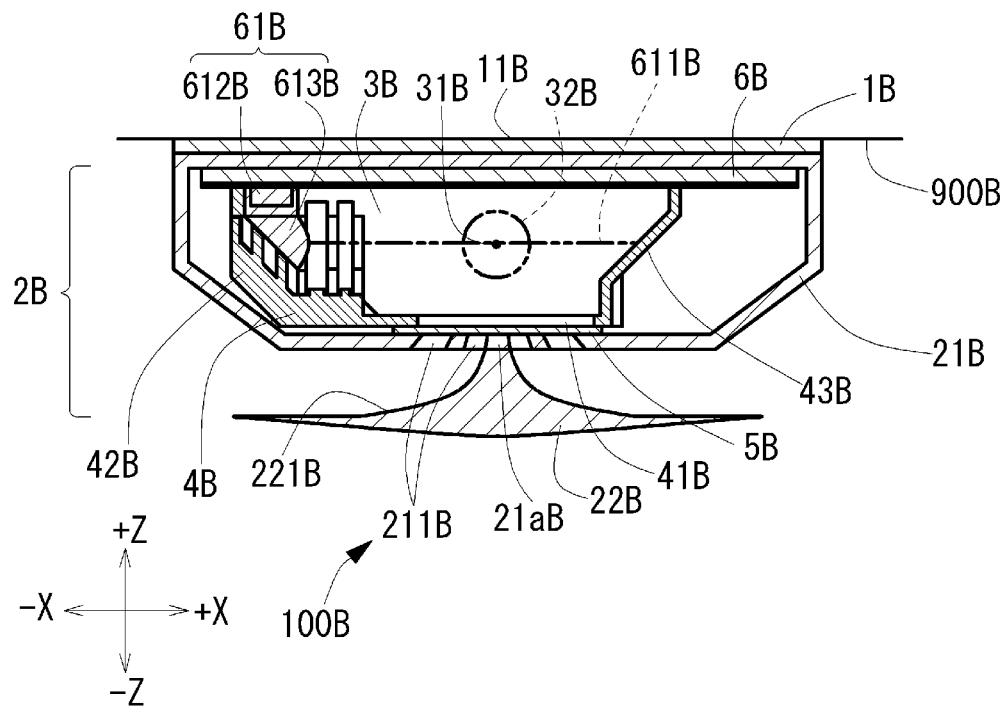
[Fig. 14]
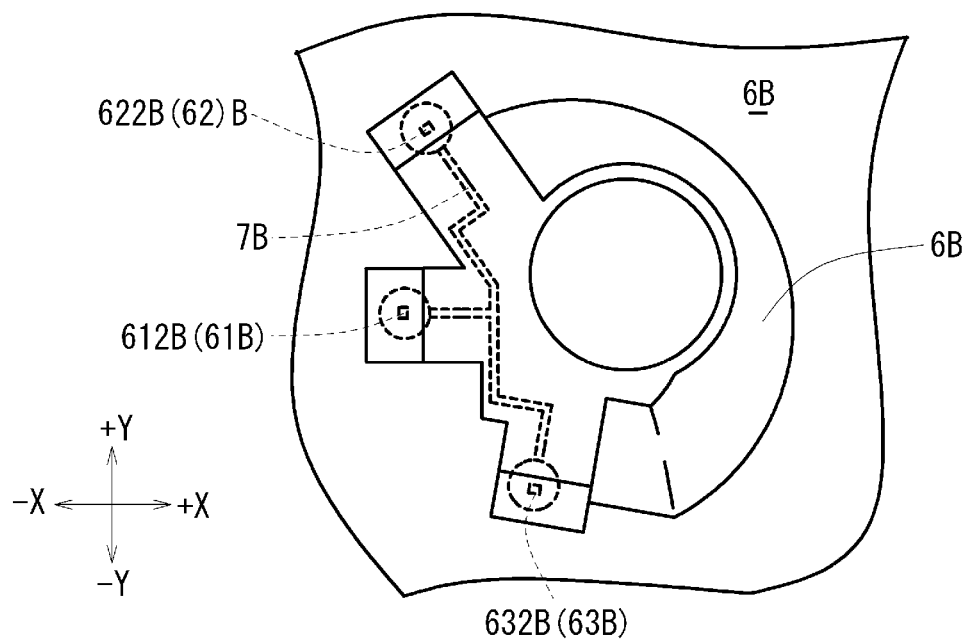

[Fig. 15]
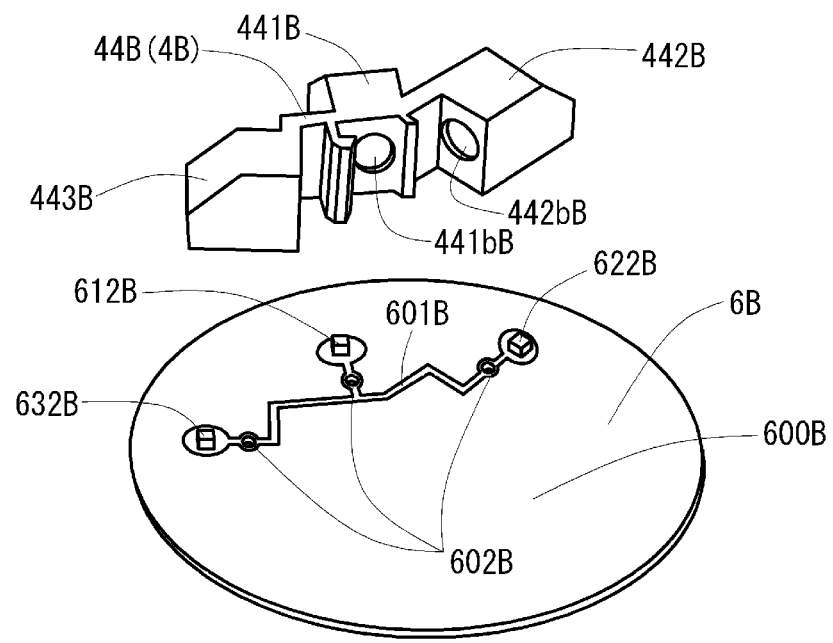
[Fig. 16]
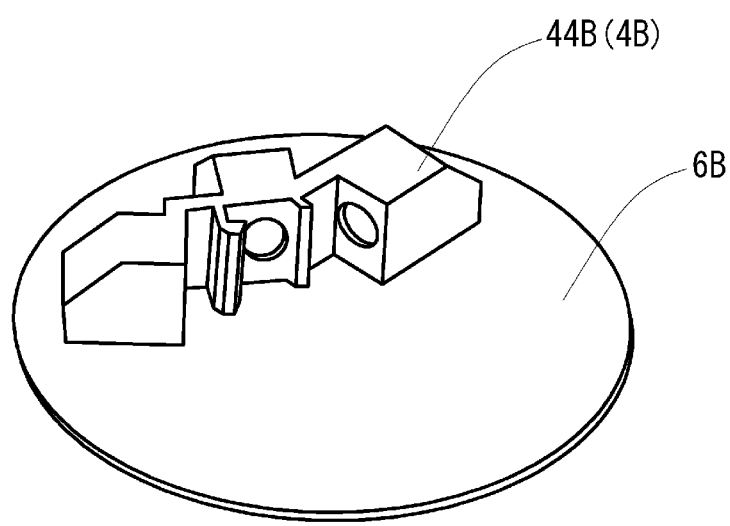

[Fig. 17]
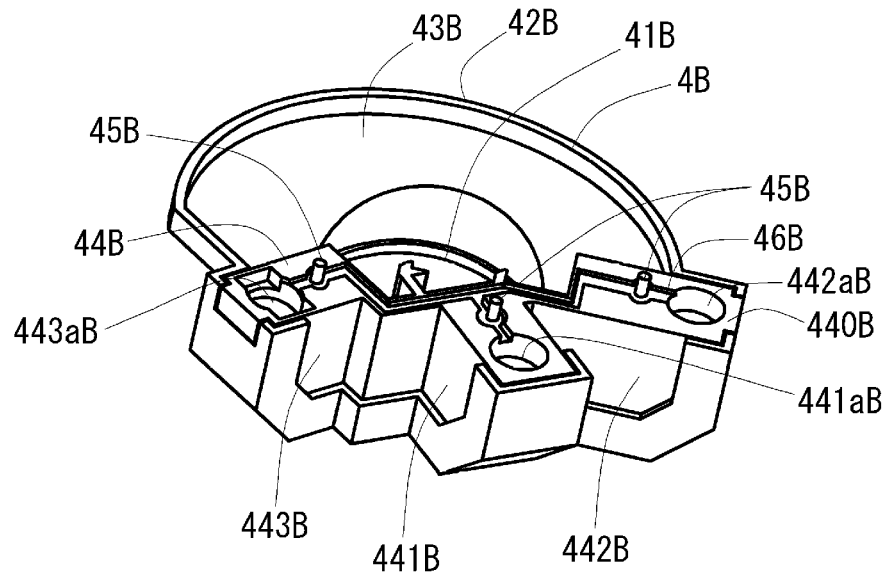
[Fig. 18]
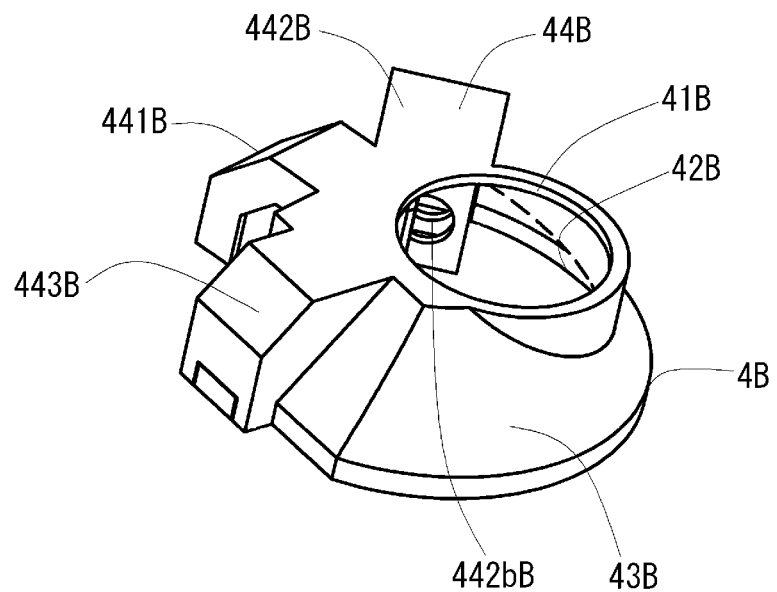

[Fig. 19]
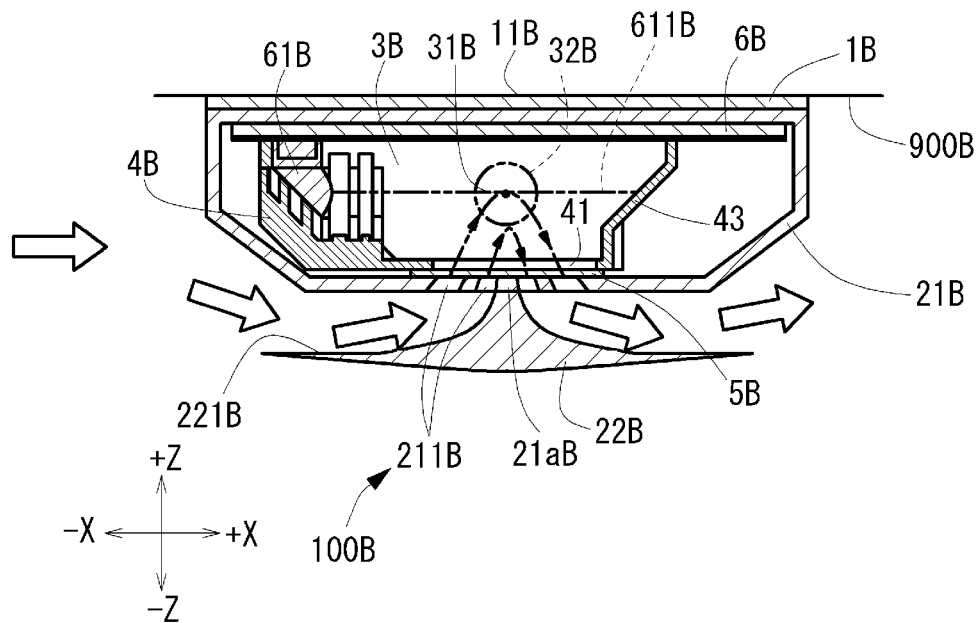
[Fig. 20]
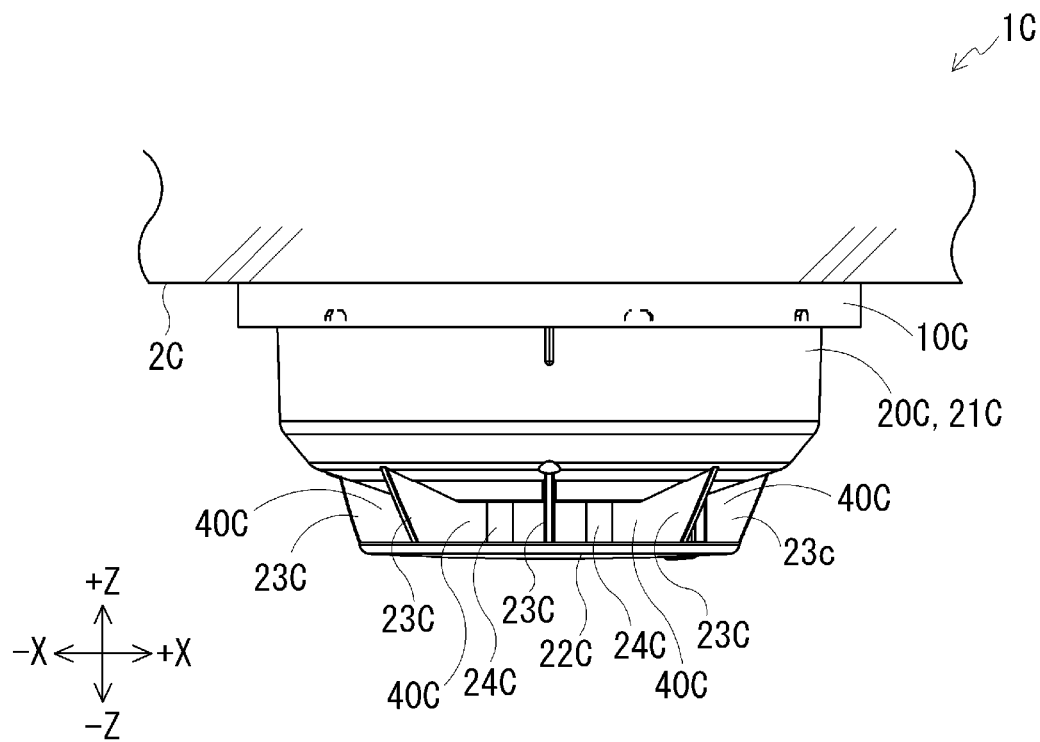

[Fig. 21]
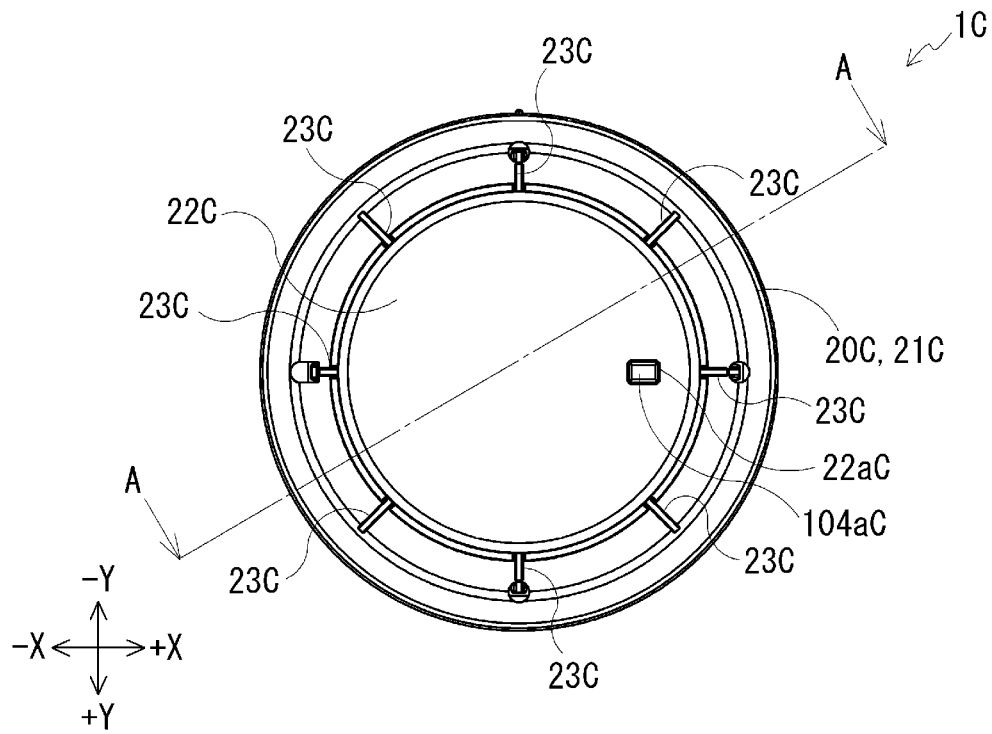
[Fig. 22]
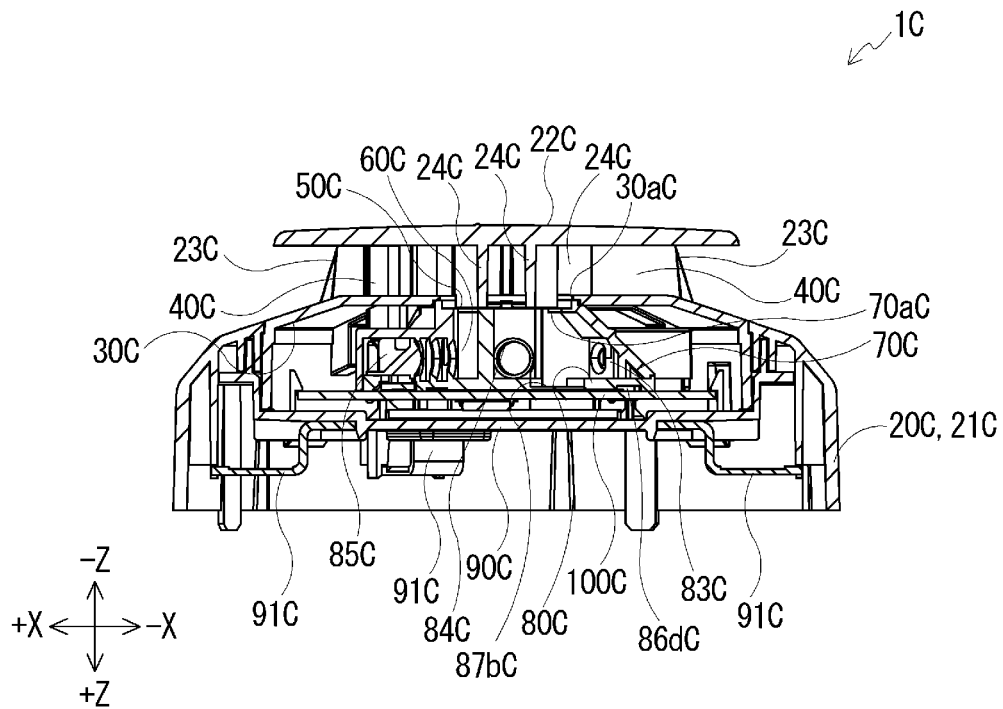

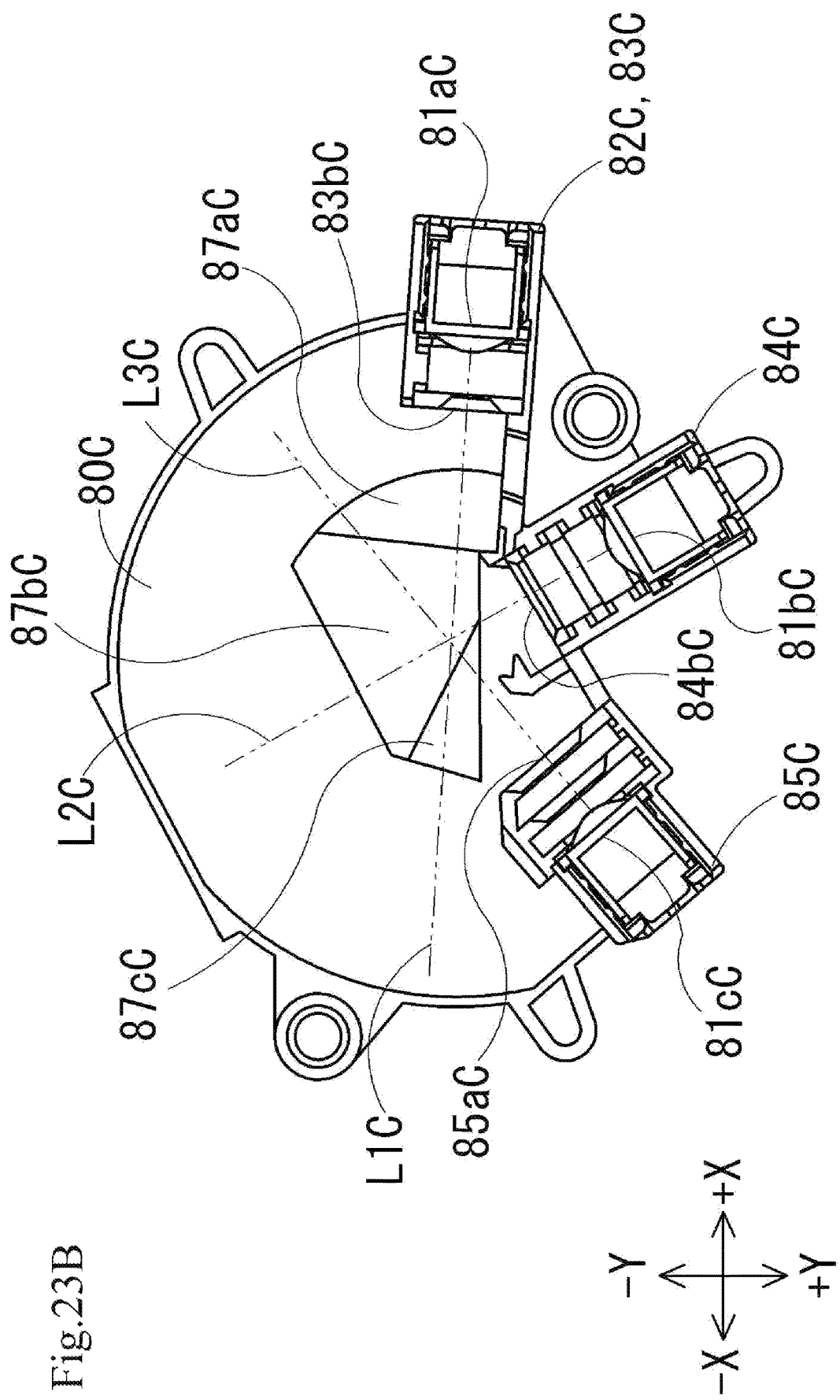

[Fig. 24]
| Test Objects | Quantity of Received Light (A/D conversion value) |
|---|---|
| The first detector body | 30 |
| The second detector body | 23 |
| The third detector body | 22 |
| The fourth detector body | 15 |
[Fig. 25]
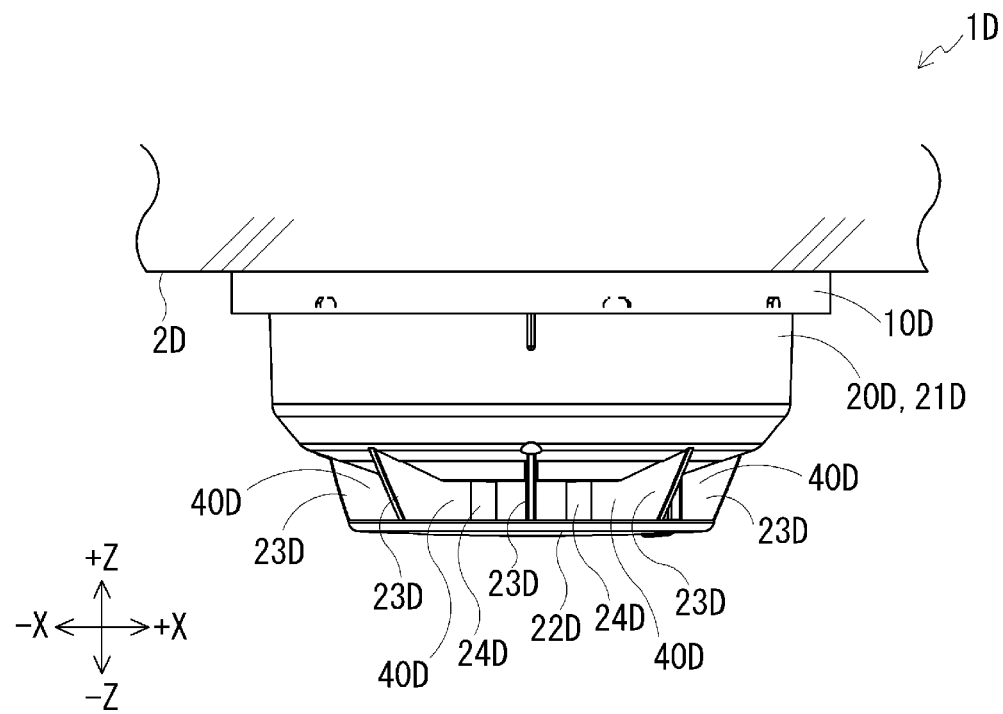

[Fig. 26]
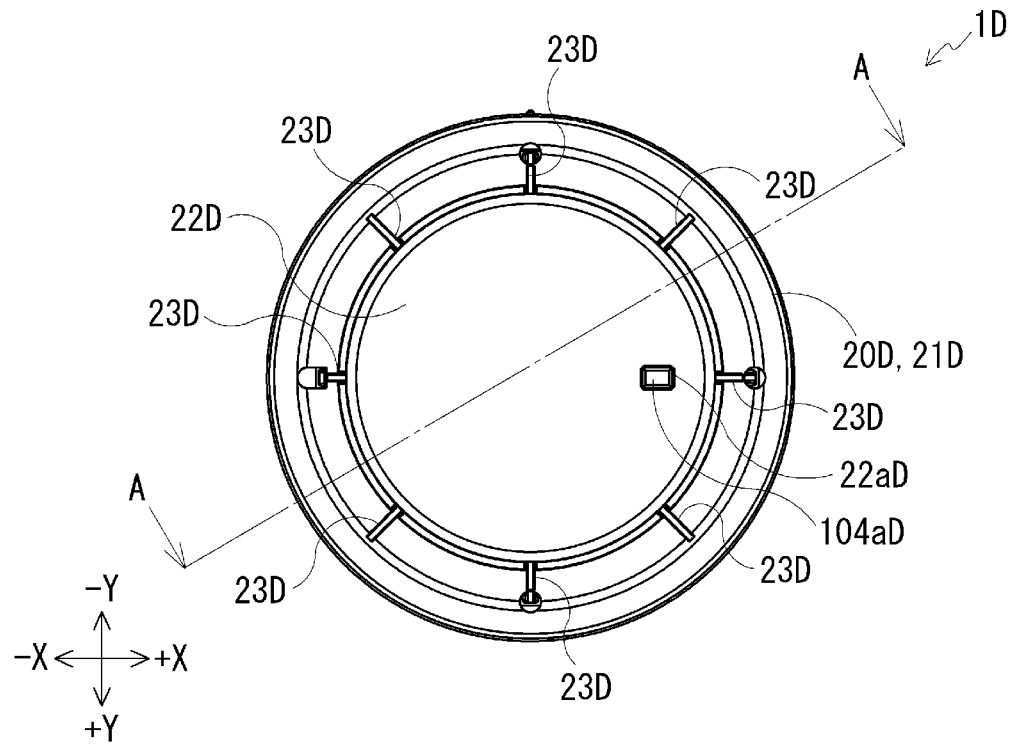
[Fig. 27]
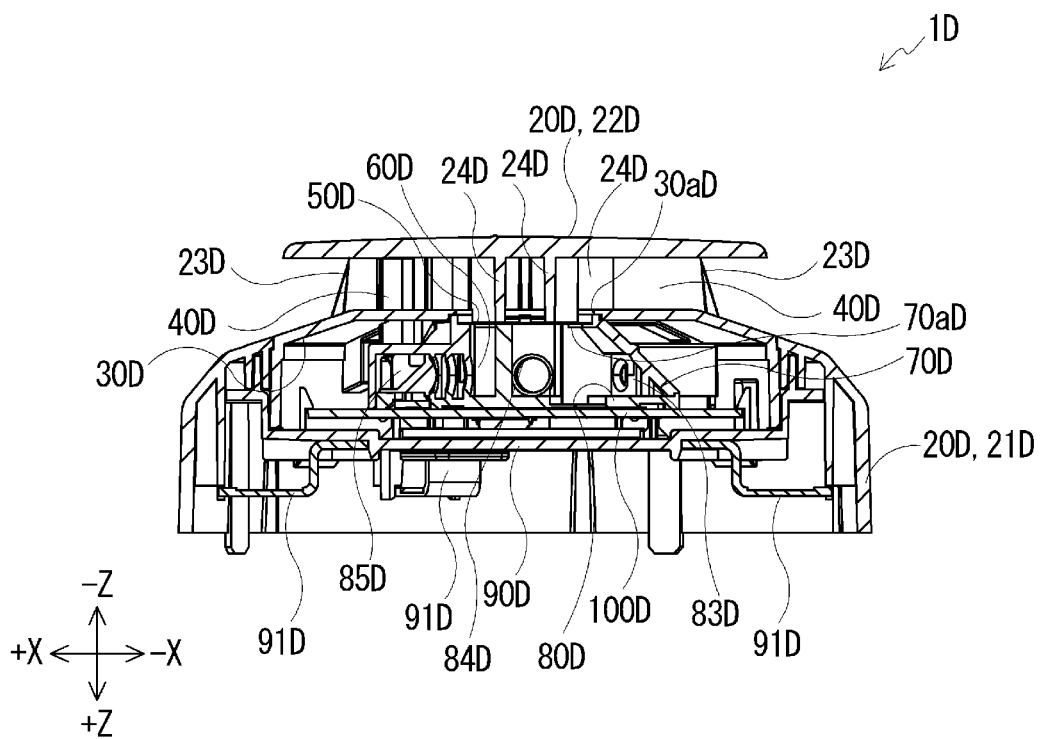

[Fig. 28]
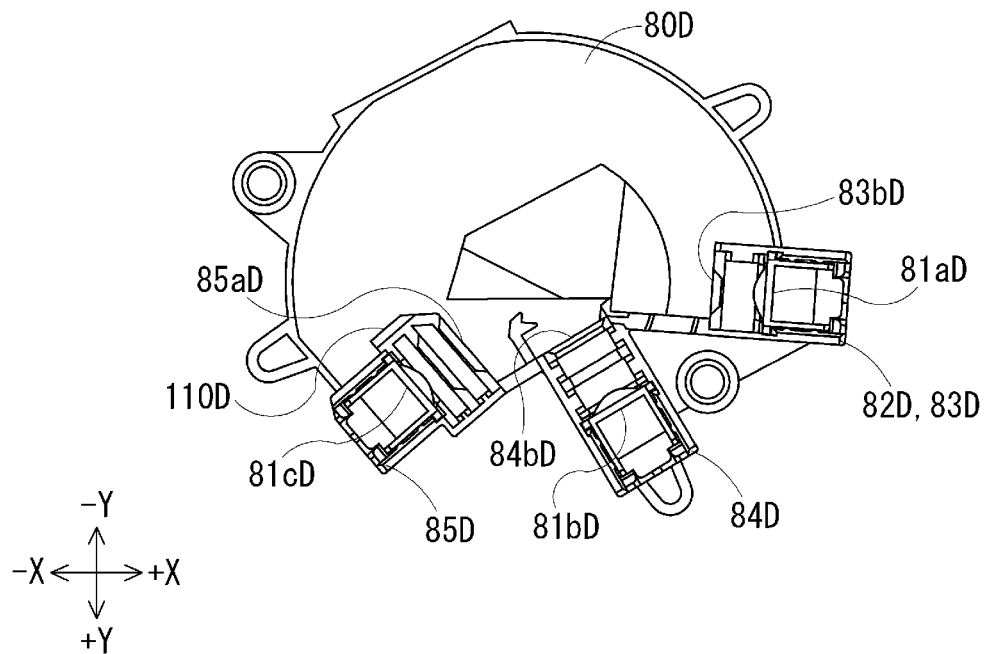
[Fig. 29]
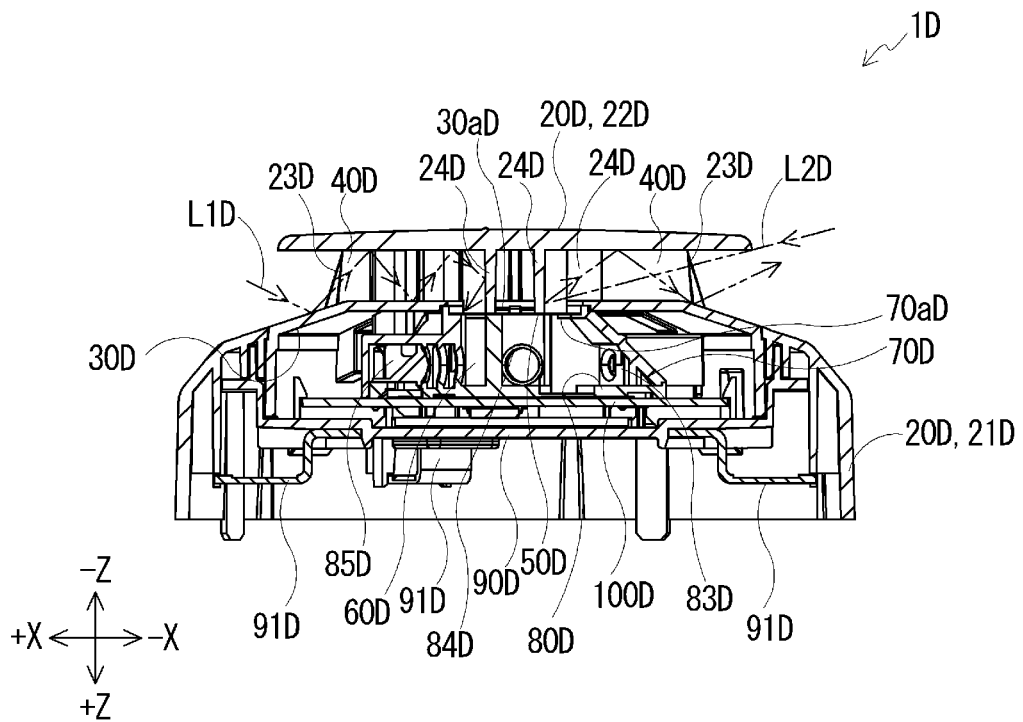

[Fig. 30]
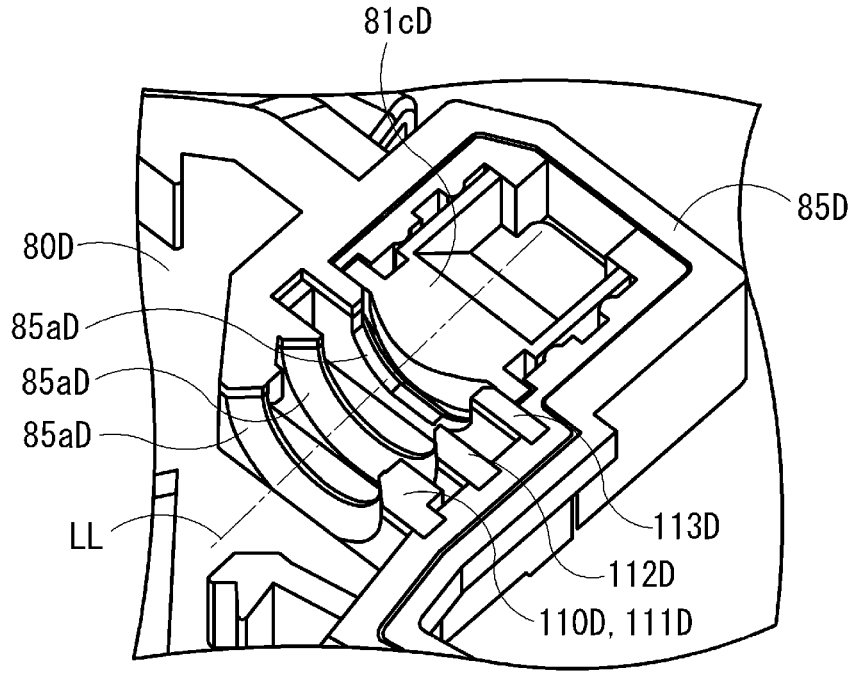
[Fig. 31]
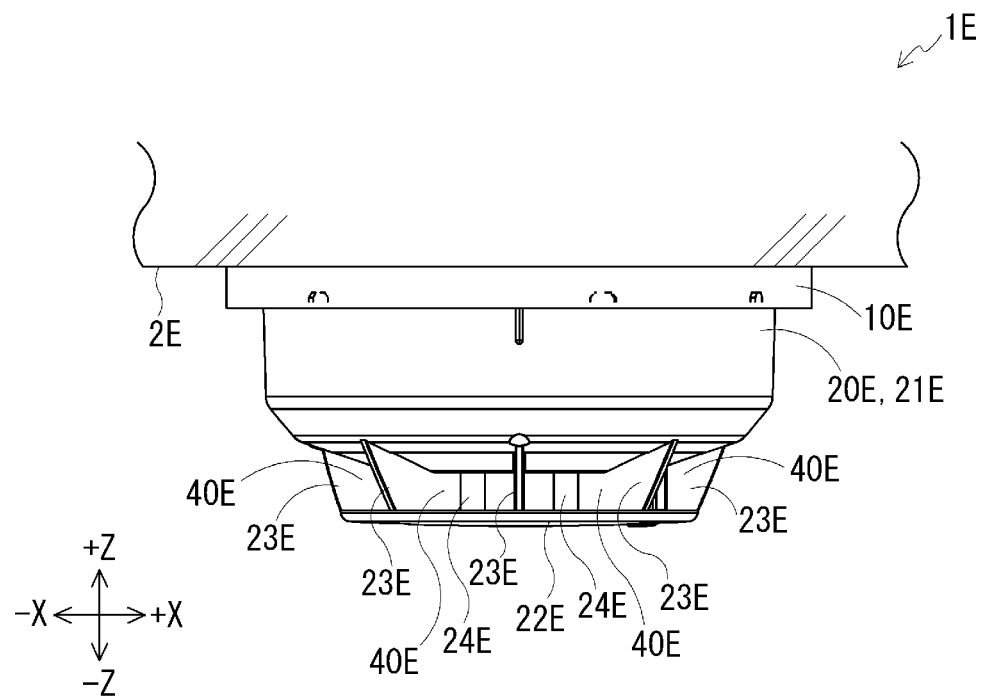

[Fig. 32]
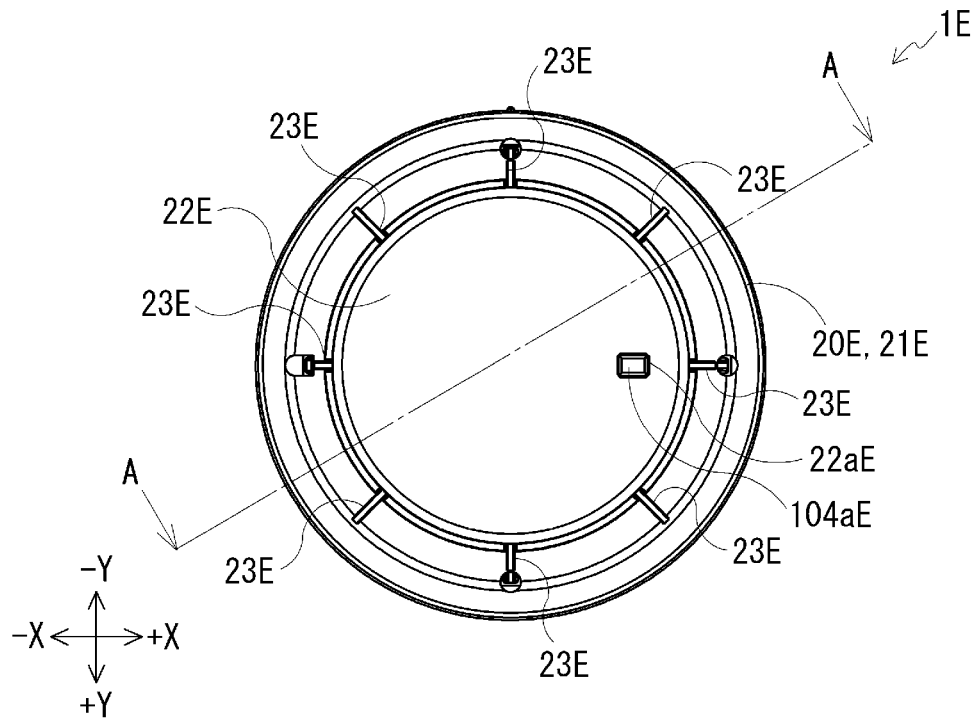
[Fig. 33]
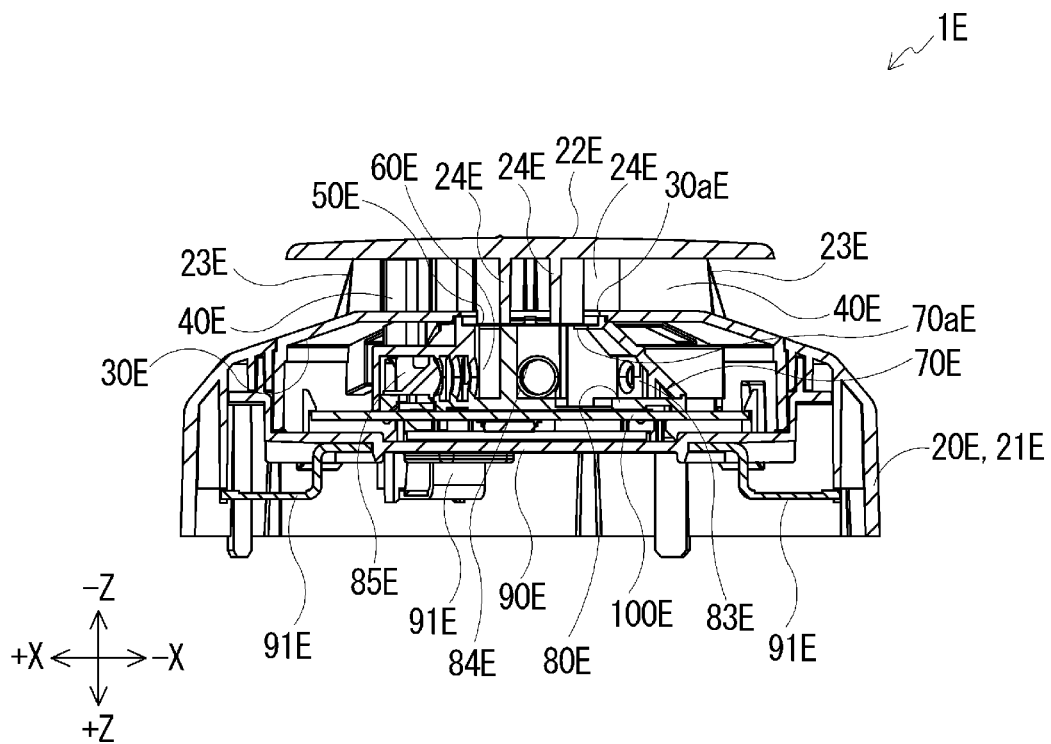

[Fig. 34]
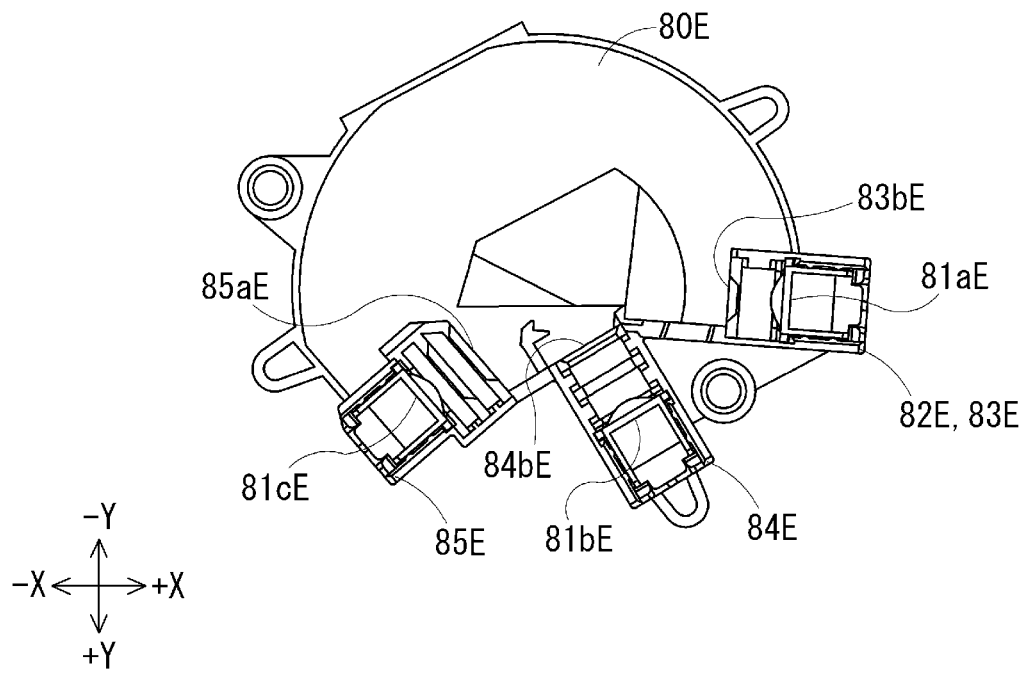
[Fig. 35]
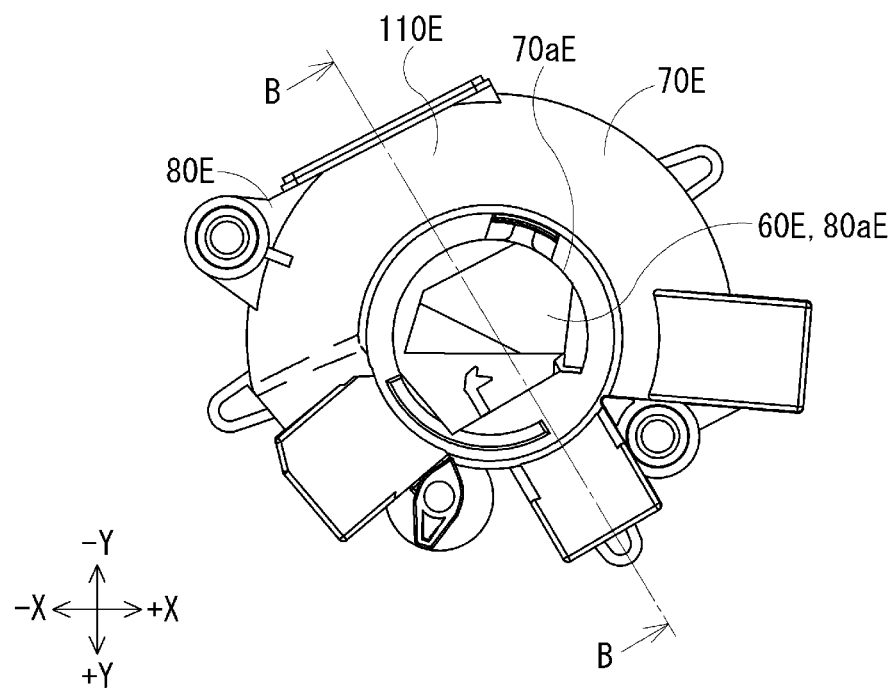

[Fig. 36]
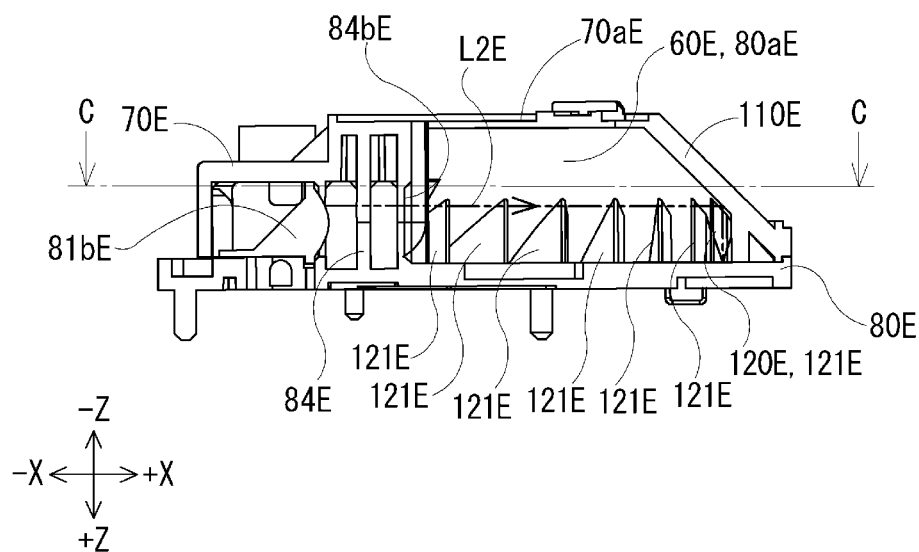
[Fig. 37]
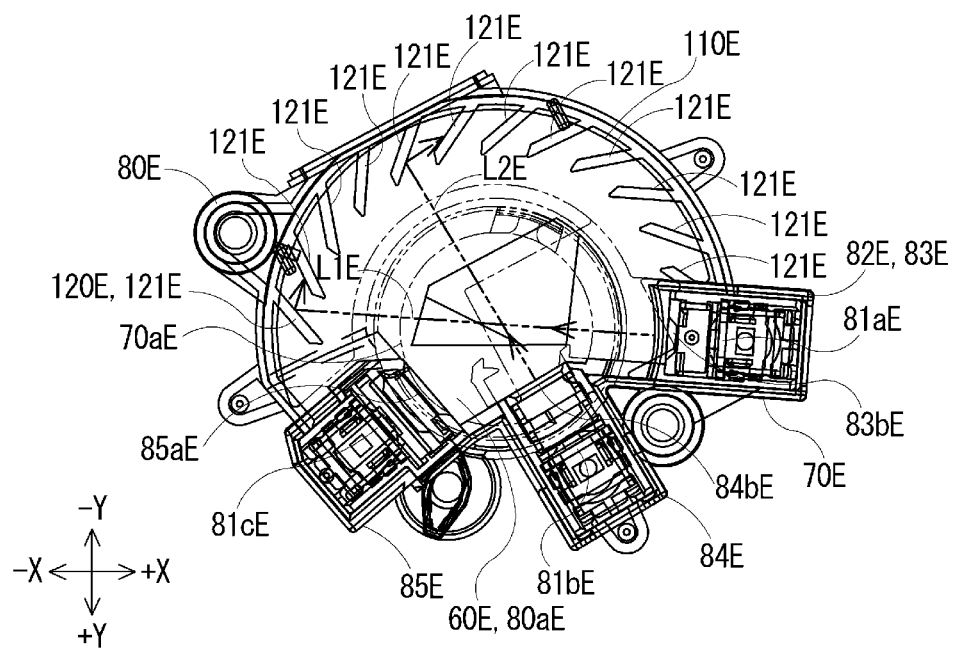

FIRE DETECTION DEVICE

CROSS REFERENCE TO RELATED APPLICATIONS

This application is a Continuation-in-Part of PCT Application No. PCT/JP2019/011695, filed Mar. 20, 2019, which claims priority to Japanese Patent Application No. 2018-138209, filed Jul. 24, 2018; Japanese Patent Application No. 2018-138210, filed Jul. 24, 2018; and Japanese Patent Application No. 2018-138692, filed Jul. 24, 2018, the contents of which are all incorporated herein by reference in its entirety.

INCORPORATION BY REFERENCE

All publications and patent applications mentioned in this specification are herein incorporated by reference in their entirety to the same extent as if each individual publication or patent application was specifically and individually indicated to be incorporated by reference.

TECHNICAL FIELD

The present invention relates to a fire detection apparatus.

BACKGROUND ART

Conventionally, a fire detector for detecting a fire in a monitored area has been known (for example, see Patent Document 1 to Patent Document 4).

Specifically, a fire detector of Patent Document 1 includes a light emitting unit that emits detection light and a light receiving unit that receives light based on the detection light emitted from the light emitting unit. In the fire detector, scattered light generated by scattering of the detection light emitted from the light emitting unit due to particles of smoke in a detection space is received by a light receiving unit, and a fire is determined on the basis of a quantity of light received by the light receiving unit.

In addition, in the conventional fire detector, regardless of whether smoke has flowed into the detection space, detection light from the light emitting unit enters the light receiving unit after being reflected by a component (for example, a labyrinth, etc. that partitions a light shielding area) in the light shielding area to adversely affect detection of smoke, and there is a possibility that determination of a fire by the fire detector may be adversely affected. Therefore, to prevent detection light from the light emitting unit from being reflected in the light shielding area and entering the light receiving unit, there has been a proposed technology (hereinafter referred to as a "related art") for providing a light attenuating structure corresponding to a structure for attenuating light in the light shielding area to attenuate the detection light from the light emitting unit in the light shielding area.

In addition, a fire detector of Patent Document 2 has a smoke detector including a housing capable of accommodating a substrate on which components including a light emitting unit and a light receiving unit are mounted and a detection space, and a flat base provided on a detection space side of the substrate to support the light emitting unit and the light receiving unit such that the light emitting unit and the light receiving unit are located on a side surface of the base on the detection space side. Further, the light emitting unit is supported on the base such that an irradiation direction of detection light irradiated from the light emitting unit is substantially parallel to the side surface of the base on the detection space side.

In addition, a fire detector of Patent Document 3 has a smoke detector including a housing, an inflow space provided inside the housing to allow an external gas to flow in through an opening formed in the housing, a detection space provided inside the housing and arranged in parallel with the inflow space along an installation surface, a light emitting unit and a light receiving unit provided inside the detection space, and a labyrinth provided inside the housing and having a plurality of labyrinth members spaced apart from one another to surround the detection space.

In addition, a fire detector of Patent Document 4 includes a light emitting unit that emits detection light and a light receiving unit that receives light based on the detection light emitted from the light emitting unit, in which scattered light generated by scattering of the detection light emitted from the light emitting unit due to particles of smoke in a detection space is received by the light receiving unit, and presence or absence of a fire is determined on the basis of a quantity of light received by the light receiving unit.

CITATION LIST

Patent Document

Patent Document 1: Laid-open Patent Application Publication in Japan No. 2011-248547.
Patent Document 2: Laid-open Patent Application Publication in Japan No. 2012-256250.
Patent Document 3: Laid-open Patent Application Publication in Japan No. 2006-267128.
Patent Document 4: Laid-open Patent Application Publication in Japan No. 2011-248545.

SUMMARY OF THE INVENTION

Technical Problem

However, a first problem to a fifth problem shown below occur in the fire detectors of Patent Document 1 to Patent Document 4.

First, with regard to the first problem, in the fire detector of Patent Document 1, regardless of whether smoke has flowed into the detection space, detection light from the light emitting unit directly enters the light receiving unit after being reflected by a component (for example, a labyrinth, etc. that partitions a light shielding area) in the light shielding area to adversely affect detection of smoke, and there is a possibility that determination of a fire by the fire detector may be adversely affected.

In addition, with regard to the second problem, in general, in the fire detector, detection light is periodically output from the light emitting unit, and the output detection light is detected by the light receiving unit, thereby comprehending a state of the light emitting unit or the light receiving unit of the fire detector. However, when the light attenuating structure is provided in the fire detector of the conventional technology, detection light from light emitting unit attenuates before entering the light receiving unit. Thus, it may be difficult to comprehend the state of the light emitting unit or the light receiving unit of the fire detector using the detection light from the light emitting unit.

In addition, with regard to the third problem, in the fire detector of Patent Document 2, since the base is formed in the flat shape, for example, it becomes relatively difficult to ensure a space for accommodating the components mounted on the substrate between the base and the substrate, and thus it may be difficult to improve an accommodation characteristic of the components. In addition, due to the shape of the substrate, when detection light irradiated from the light emitting unit is incident on the base, the incident detection light is reflected toward the light receiving unit, so that there is concern that a quantity of received light of the light receiving unit may become excessive even though no smoke is detected. Thus, it may be difficult to maintain detection accuracy of the fire detection apparatus such as the smoke detector.

In addition, with regard to the fourth problem, in the fire detector of Patent Document 3, as described above, since the inflow space and the detection space are arranged in parallel along the installation surface, there is a possibility that ambient light from the outside of the housing may directly enter the detection space through a gap between the labyrinth members. Thus, there is concern that it may be difficult to maintain detection accuracy of the fire detection apparatus such as the smoke detector due to the ambient light. Therefore, there is room for improvement from a viewpoint of maintaining an inflow property of gas and detection accuracy of the fire detection apparatus.

In addition, with regard to the fifth problem, in the fire detector of Patent Document 4, it is presumed that detection light from the light emitting unit directly enters the light receiving unit after being reflected by a component (for example, a labyrinth, etc. that partitions the light shielding area) in the light shielding area. In this way, for example, since an increase in quantity of received light of the light receiving unit may adversely affect detection of smoke, there is room for improvement from a viewpoint of maintaining detection accuracy of the fire detection apparatus.

It is an object of the present invention to solve the problems of the above mentioned prior arts.

One aspect of the present invention provides a fire detection apparatus comprises a detection space into which a detection target flows, detection light being allowed to enter the detection space.

BRIEF DESCRIPTION OF THE DRAWINGS

FIG. 1 is a perspective view of a detector according to Embodiment 1.

FIG. 2 is a bottom view of the detector.

FIG. 3 is a side view of the detector.

FIG. 4 is a cross-sectional view taken along A-A line of FIG. 2.

FIG. 5 is a perspective view of a smoke detection unit cover in a state viewed from an attachment surface side.

FIG. 6 is a perspective view of the smoke detection unit cover in a state viewed from an opposite side from the attachment surface side.

FIG. 7 is an enlarged view of a part of FIG. 4.

FIG. 8 is a diagram illustrating an air flow in FIG. 4 using white arrows.

FIG. 9 is a diagram illustrating a path of detection light in FIG. 7 using arrows.

FIG. 10 is a perspective view of a detector according to Embodiment 2.

FIG. 11 is a bottom view of the detector.

FIG. 12 is a side view of the detector.

FIG. 13 is a cross-sectional view taken along A-A line of FIG. 11.

FIG. 14 is a bottom view of a part of a circuit board and a smoke detection unit cover in the detector.

FIG. 15 is an exploded perspective view of the circuit board and a part of the smoke detection unit cover in the detector.

FIG. 16 is a perspective view of the circuit board and the part of the smoke detection unit cover in the detector.

FIG. 17 is a perspective view of the smoke detection unit cover in a state viewed from an attachment surface side.

FIG. 18 is a perspective view of the smoke detection unit cover in a state viewed from an opposite side from the attachment surface side.

FIG. 19 is a diagram illustrating an air flow in FIG. 13 using white arrows.

FIG. 20 is a side view illustrating an attachment situation of a fire detection apparatus according to Embodiment 3.

FIG. 21 is a bottom view illustrating the fire detection apparatus in a state of removing an attachment base.

FIG. 22 is a cross-sectional view taken along A-A line of FIG. 21.

FIGS. 23A and 23B are diagrams illustrating a detector body, in which FIG. 23A is a plan view and FIG. 23B is a bottom view.

FIG. 24 is a diagram illustrating a test result of a light receiving test.

FIG. 25 is a side view illustrating an attachment situation of a fire detection apparatus according to Embodiment 4.

FIG. 26 is a bottom view illustrating the fire detection apparatus in a state of removing an attachment base.

FIG. 27 is a cross-sectional view taken along A-A line of FIG. 26.

FIG. 28 is a bottom view illustrating a detector body.

FIG. 29 is a diagram illustrating a situation in which ambient light enters a detection space from the outside of the fire detection apparatus through an inflow space and is a diagram illustrating an area corresponding to FIG. 27.

FIG. 30 is an enlarged view of an area of a light reception suppressing portion of FIG. 28.

FIG. 31 is a side view illustrating an attachment situation of a fire detection apparatus according to Embodiment 5.

FIG. 32 is a bottom view illustrating the fire detection apparatus in a state of removing an attachment base.

FIG. 33 is a cross-sectional view taken along A-A line of FIG. 32.

FIG. 34 is a bottom view illustrating a detector body.

FIG. 35 is a bottom view illustrating a detector cover and the detector body.

FIG. 36 is a cross-sectional view taken along B-B line of FIG. 35.

FIG. 37 is a cross-sectional view taken along C-C line of FIG. 36.

DESCRIPTION OF EMBODIMENTS

Figure 23A:
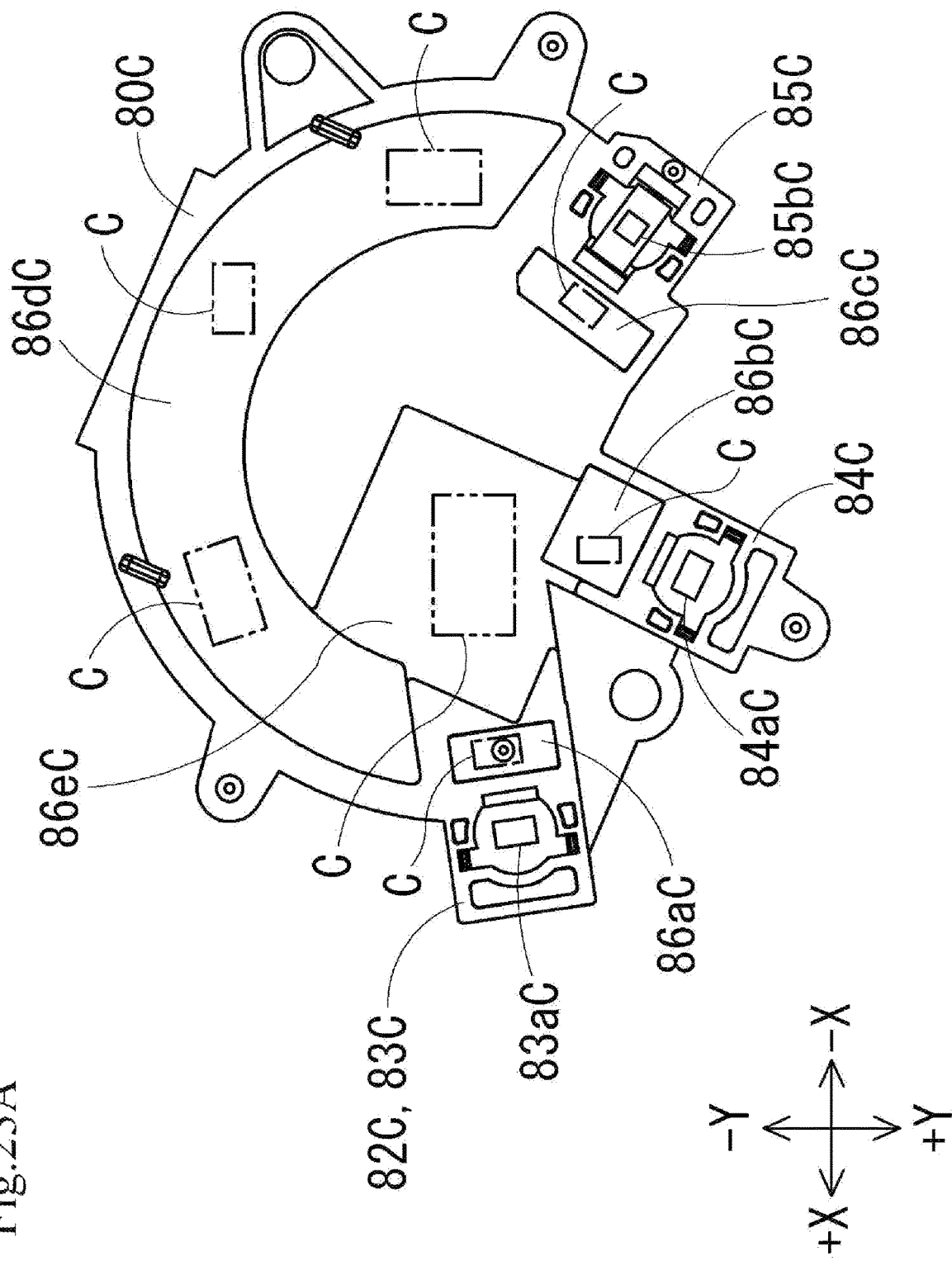

Hereinafter, embodiments of a fire detection apparatus according to the invention will be described in detail with reference to drawings. First, [I] basic concepts of the embodiments will be described, and then [II] specific contents of the embodiments will be described. Finally, [III] modifications to the embodiments will be described. However, the invention is not limited by the embodiments.

[I] Basic Concepts of Embodiments

First, a description will be given of basic concepts of Embodiment 1 to Embodiment 5.

Basic Concept of Embodiment 1

First, a basic concept of Embodiment 1 will be described. Embodiment 1 (a mode corresponding to the first problem) generally relates to a scattered light detector.

Here, the "scattered light detector" is an apparatus that monitors a monitored area, and specifically monitors an abnormality in the monitored area by detecting a detection target in the monitored area using scattered light described below. For example, the scattered light detector is attached to an installation surface of an installation object, and corresponds to, as an example, equipment that determines an abnormality such as a fire. For example, this "scattered light detector" is a concept including a smoke detector, a fire detector, etc.

The "monitored area" is an area which is an object to be monitored by the scattered light detector, and is specifically a space having a certain extent, which is an indoor or outdoor space. For example, the monitored area corresponds to a concept including a space such as a corridor, stairs, or a room of a building. In addition, the "installation object" is an object on which the scattered light detector is installed, and examples thereof include a ceiling, a wall, etc. in the monitored area. In addition, the "installation surface" is a surface of the installation object on which the scattered light detector is installed, and examples thereof include a surface of the ceiling on the monitored area side (that is, a lower surface of the ceiling), a surface of the wall on the monitored area side (that is, an indoor side surface of the wall), etc.

In addition, the "abnormality in the monitored area" means that the monitored area is in a state different from a normal state, and corresponds to a concept including, for example, an occurrence of a fire. In addition, the "detection target" is a target to be detected by the scattered light detector and specifically related to an abnormality in the monitored area, and corresponds to a concept including, for example, smoke.

Further, in Embodiment 1 below, a description will be given of a case in which the "scattered light detector" is the "fire detector", the "monitored area" is the "room of the building", the "installation object" is the "ceiling", the "abnormality in the monitored area" is the "occurrence of the fire", and the "detection target" is the "smoke".

Basic Concept of Embodiment 2

Next, a basic concept of Embodiment 2 will be described. Embodiment 2 (a mode corresponding to the second problem) generally relates to a scattered light detector.

Here, the "scattered light detector" is an apparatus that monitors a monitored area, and specifically monitors an abnormality in the monitored area by detecting a detection target in the monitored area using scattered light described below. For example, the scattered light detector is attached to an installation surface of an installation object, and corresponds to, as an example, equipment including a light emitting unit, a light receiving unit, and a light guiding unit and equipment that determines an abnormality such as a fire. For example, this "scattered light detector" is a concept including a smoke detector, a fire detector, etc.

The "monitored area" is an area which is an object to be monitored by the scattered light detector, and is specifically a space having a certain extent, which is an indoor or outdoor space. For example, the monitored area corresponds to a concept including a space such as a corridor, stairs, or a room of a building. In addition, the "installation object" is an object on which the scattered light detector is installed, and examples thereof include a ceiling, a wall, etc. in the monitored area. In addition, the "installation surface" is a surface of the installation object on which the scattered light detector is installed, and examples thereof include a surface of the ceiling on the monitored area side (that is, a lower surface of the ceiling), a surface of the wall on the monitored area side (that is, an indoor side surface of the wall), etc.

In addition, the "abnormality in the monitored area" means that the monitored area is in a state different from a normal state, and corresponds to a concept including, for example, an occurrence of a fire. In addition, the "detection target" is a target to be detected by the scattered light detector and specifically relates to an abnormality in the monitored area, and corresponds to a concept including, for example, smoke.

In addition, the "light emitting unit" emits detection light toward a detection space corresponding to a space into which a detection target flows, and the "light receiving unit" receives scattered light generated when at least detection light emitted from the light emitting unit is scattered by the detection target flowing into the detection space. The "detection light" is light for detecting smoke corresponding to the detection target to determine occurrence of an abnormality, and is specifically light corresponding to a basis of scattered light. In addition, the "scattered light" is light for detecting smoke corresponding to the detection target to determine occurrence of an abnormality, and is specifically light generated by scattering when detection light is scattered by being irradiated to particles of smoke corresponding to the detection target.

In addition, the "light guiding unit" guides partial detection light, specifically guides the partial detection light to the light receiving unit without passing through the detection space, and corresponds to a concept including, for example, a light guiding space or a light guiding member. The "partial detection light" is light corresponding to only a part of the detection light emitted from the light emitting unit, is light for comprehending a state of the light emitting unit or the light receiving unit, and is, for example, light that can be guided by the light guiding unit. In addition, the "light guiding space" is a space for guiding the partial detection light, is a space from the light emitting unit side to the light receiving unit side, corresponds to a concept including, for example, a space in which an object (here, a solid) is not present to guide the partial detection light, and corresponds to a concept including an enclosed space and a non-closed space, as an example. The "enclosed space" is a space capable of guiding at least light, is specifically a space closed from the outside, and is, for example, a space into which and from which smoke corresponding to the detection target may not flow. In addition, the "non-closed space" is a space capable of guiding at least light, is specifically a space open to the outside, and is, for example, a space into which and from which smoke corresponding to the detection target can flow. In addition, the "light guiding member" is a member that guides the partial detection light, is a member from the light emitting unit side to the light receiving unit side, corresponds to a concept including, for example, a member formed of a material for guiding the partial detection light, and corresponds to a concept distinguished from the light guiding space and including an optical fiber, a light guide, etc., as an example.

Further, in Embodiment 2 below, a description will be given of a case in which the "scattered light detector" corresponds to the "fire detector", the "monitored area" corresponds to the "room of the building", the "installation object" corresponds to the "ceiling", the "abnormality in the monitored area" corresponds to "occurrence of the fire", the "detection target" corresponds to "smoke", the "light guiding unit" corresponds to the "light guiding space", and the "light guiding space" corresponds to the "enclosed space".

Basic Concept of Embodiment 3

Next, a basic concept of Embodiment 3 will be described. Embodiment 3 (a mode corresponding to the third problem) generally relates to a fire detection apparatus for detecting and reporting a fire in the monitored area.

Here, in Embodiment 3, the "fire detection apparatus" is an apparatus that optically detects and reports a fire in the monitored area, and corresponds to a concept including, for example, an optical fire detector or a fire alarm. In addition, the "monitored area" is an area to be monitored and is a concept including, for example, an area inside the building, an area outside the building, etc. In addition, a specific structure or type of the "building" is arbitrary. For example, the "building" is a concept including, for example, a detached house, a complex building such as a row house or an apartment, an office building, an event facility, a commercial facility, a public facility, etc. In addition, "reporting" corresponds to a concept including, for example, outputting predetermined information to an external apparatus, displaying predetermined information or outputting the predetermined information as a sound via an output unit (a display unit or a sound output unit), etc. Hereinafter, in Embodiment 3, a description will be given of a case where the "fire detection apparatus" corresponds to the "optical fire detector", and the "monitored area" corresponds to the "area inside the office building".

Basic Concept of Embodiment 4

Next, a basic concept of Embodiment 4 will be described. Embodiment 4 (a mode corresponding to the fourth problem) generally relates to a fire detection apparatus attached to the installation surface of the installation object to detect a fire in the monitored area.

Here, in Embodiment 4, the "fire detection apparatus" is an apparatus that optically detects and reports a fire in the monitored area, and corresponds to a concept including, for example, an optical fire detector or a fire alarm. In addition, the "installation object" is an object on which the fire detection apparatus is installed, and corresponds to a concept including, for example, a ceiling portion or a wall portion of a building. In addition, a specific structure or type of the "building" is arbitrary. For example, the "building" corresponds to a concept including, for example, a detached house, a complex building such as a row house or an apartment, an office building, an event facility, a commercial facility, a public facility, etc. In addition, the "monitored area" is an area to be monitored and corresponds to a concept including, for example, an area inside the building, an area outside the building, etc. In addition, "reporting" corresponds to a concept including, for example, outputting predetermined information to an external apparatus, displaying predetermined information or outputting the predetermined information as a sound via an output unit (a display unit or a sound output unit), etc. Hereinafter, in Embodiment 4, a description will be given of a case where the "fire detection apparatus" corresponds to the "optical fire detector", the "installation object" corresponds to the "ceiling portion of the office building", and the "monitored area" corresponds to the "area inside the office building".

Basic Concept of Embodiment 5

Next, a basic concept of Embodiment 5 will be described. Embodiment 5 (a mode corresponding to the fifth problem) generally relates to a fire detection apparatus attached to the installation surface of the installation object to detect a fire in the monitored area.

Here, in Embodiment 5, the "fire detection apparatus" is an apparatus that optically detects and reports a fire in the monitored area, and corresponds to a concept including, for example, an optical fire detector or a fire alarm. In addition, the "installation object" is an object on which the fire detection apparatus is installed, and corresponds to a concept including, for example, a ceiling portion or a wall portion of a building. In addition, a specific structure or type of the "building" is arbitrary. For example, the "building" is a concept including, for example, a detached house, a complex building such as a row house or an apartment, an office building, an event facility, a commercial facility, a public facility, etc. In addition, the "monitored area" is an area to be monitored and is a concept including, for example, an area inside the building, an area outside the building, etc. In addition, "reporting" is a concept including, for example, outputting predetermined information to an external apparatus, displaying predetermined information or outputting the predetermined information as a sound via an output unit (a display unit or a sound output unit), etc. Hereinafter, in Embodiment 5, a description will be given of a case where the "fire detection apparatus" corresponds to the "optical fire detector", the "installation object" corresponds to the "ceiling portion of the office building", and the "monitored area" corresponds to the "area inside the office building".

[II] Specific Contents of Embodiments

Next, specific contents of the embodiments will be described.

Embodiment 1

First, the fire detection apparatus according to Embodiment 1 will be described. Embodiment 1 corresponds to a mode of including a reflecting unit that primarily reflects detection light emitted from a light emitting unit described below in a direction intersecting with a plane defined by a light emitting-side optical axis described below and a light receiving-side optical axis described below.

(Configuration)

First, a description will be given of a configuration of a detector according to Embodiment 1. FIG. 1 is a perspective view of the detector according to Embodiment 1, FIG. 2 is a bottom view of the detector, FIG. 3 is a side view of the detector, and FIG. 4 is a cross-sectional view taken along A-A line of FIG. 2. For convenience of description, a guide portion 22A and a rib 23A of FIG. 1 are omitted in FIG. 2, and the rib 23A of FIG. 1 is omitted in FIG. 3 and FIG. 4.

In the following description, X-Y-Z illustrated in the respective drawings are directions orthogonal to one another. Specifically, the Z direction is a vertical direction (that is, a direction in which gravity acts), and the X direction and the Y direction are horizontal directions (lateral side) orthogonal to the vertical direction. For example, the Z direction is referred to as a height direction, a +Z direction is referred to as an upper side (plane surface), and a −Z direction is referred to as a lower side (bottom surface). In addition, in the illustrated detector 100A, terms related to the [X-Y-Z directions] below are convenient expressions for describing a relative positional relationship (or direction) of respective components. In the following description, with reference to a center position of a light shielding space 3A of FIG. 4, a direction away from the light shielding space 3A is referred to as an "outer side", and a direction approaching the light shielding space 3A is referred to as an "inner side". In the following, after describing an overall configuration of the detector 100A, details of a particularly characteristic configuration will be described.

The detector 100A illustrated in each of these figures is a scattered light detector and an alarm unit that monitors and warns an occurrence of a fire by detecting smoke corresponding to a detection target contained in gas. Specifically, as illustrated in FIG. 4, the detector 100A is used by being attached to an installation surface 900A corresponding to a surface on a lower side (−Z direction) (that is, a lower surface) of the ceiling in the monitored area. For example, the detector 100A includes an attachment base 1A, an outer cover 2A, a light shielding space 3A, a smoke detection unit cover 4A, an insect screen 5A, and a circuit board 6A.

(Configuration—Attachment Base)

The attachment base 1A is an attaching unit that attaches the outer cover 2A to the installation surface 900A. A specific type or configuration of the attachment base 1A is arbitrary. For example, the attachment base 1A has an attachment surface 11A corresponding to a surface facing the installation surface 900A, is fixed to the installation surface 900A between the outer cover 2A and the installation surface 900A by a known fixing unit (for example, a screw or a fitting structure), and is made of a disc-shaped resin as a whole.

(Configuration—Outer Cover)

Next, the outer cover 2A of FIG. 4 is a cover that covers the light shielding space 3A, the smoke detection unit cover 4A, the insect screen 5A, and the circuit board 6A (hereinafter an object to be accommodated) corresponding to components of the detector 100A. Specifically, the outer cover 2A is attached to the installation surface 900A via the attachment base 1A. For example, the outer cover 2A is made of a disc-shaped resin as a whole. A specific type or configuration of the outer cover 2A is arbitrary. For example, the outer cover 2A includes a main body 21A, the guide portion 22A, and the rib 23A of FIG. 1.

(Configuration—Outer Cover—Main Body)

The main body 21A is an accommodation unit that accommodates the object to be accommodated, is specifically formed by a cylindrical portion provided on the upper side (+Z direction) in the height direction (Z direction) and a tapered portion whose diameter decreases from the cylindrical portion toward the lower side (−Z direction), and includes, for example, an outer cover-side inflow/outflow opening 211A.

(Configuration—Outer Cover—Main Body—Outer Cover-Side Inflow/Outflow Opening)

The outer cover-side inflow/outflow opening 211A is an inflow/outflow opening that allows gas containing smoke to flow into and/or flow out of the light shielding space 3A, and is provided toward the opposite side (−Z direction) from the attachment surface 11A in the main body 21A with respect to the direction (Z direction) substantially orthogonal to the attachment surface 11A. A specific configuration of the outer cover-side inflow/outflow opening 211A is arbitrary. For example, as illustrated in FIG. 2, a plurality of outer cover-side inflow/outflow openings 211A is provided around a division point 21aA. Here, the division point 21aA is a point that divides gas flowing into the light shielding space 3A and gas flowing out of the light shielding space 3A, is specifically a part of the main body 21A on the lower side (−Z direction), and is, for example, a part in which the main body 21A and the guide portion 22A immediately below a detection point 31A are mutually connected to each other.

(Configuration—Outer Cover—Guide Portion)

The guide portion 22A of FIG. 4 is a guide member provided on the opposite side (−Z direction) from the attachment surface 11A via the main body 21A with respect to the direction (Z direction) substantially orthogonal to the attachment surface 11A, specifically has a smaller diameter than that of the main body 21A as a whole, and includes, for example, a guide portion-side inclination portion 221A.

(Configuration—Outer Cover—Guide Portion—Guide Portion-Side Inclination Portion)

The guide portion-side inclination portion 221A is a guiding unit that guides gas such that the gas flows into the light shielding space 3A through the outer cover-side inflow/outflow opening 211A, and is specifically formed by inclining at least a part of the guide portion 22A on the main body 21A side such that the part approaches the attachment surface 11A toward the division point 21aA side (that is, from the outer side toward the inner side along an XY plane).

(Configuration—Outer Cover—Guide Portion—Rib)

The rib 23A of FIG. 1 is a guiding unit that guides gas such that the gas flows into the light shielding space 3A through the outer cover-side inflow/outflow opening 211A, and specifically functions as a reinforcing unit that fixes and reinforces the guide portion 22A with respect to the main body 21A while functioning as the guiding unit. A specific configuration of the rib 23A is arbitrary. For example, the rib 23A is provided between the main body 21A and the guide portion 22A. In addition, eight ribs 23A are radially provided with respect to the division portion 21aA to mutually partition the plurality of outer cover-side inflow/outflow openings 211A in two radial combinations.

(Configuration—Light Shielding Space)

Next, the light shielding space 3A of FIG. 4 is a light shielding area shielded from light from the outside, and is specifically a space surrounded by the smoke detection unit cover 4A and the circuit board 6A. A specific type or configuration of the light shielding space 3A is arbitrary. For example, the light shielding space 3A is a space including a detection point 31A and an occurrence space 32A.

(Configuration—Light Shielding Space—Detection Point)

The detection point 31A is a point in the light shielding space 3A, and is a point serving as a reference for detecting smoke. For example, the detection point 31A corresponds to a position at which a first light emitting-side optical axis 611A, a second light emitting-side optical axis 621A, and a light receiving-side optical axis 631A illustrated in FIG. 2 and described below intersect one another. As an example, the detection point 31A corresponds to a position near a center of the detector 100A in a horizontal direction (a direction parallel to the XY plane).

(Configuration—Light Shielding Space—Occurrence Space)

The occurrence space 32A is a space in the light shielding space 3A, is a detection space into which smoke flows, and is specifically a space surrounding the detection point 31A. For example, the occurrence space 32A is a space irradiated with detection light emitted from a first light emitting unit 61A or a second light emitting unit 62A described below and is a space in which scattered light received by a light receiving unit 63A can be generated. Here, the "detection light" is light for detecting smoke to determine an occurrence of a fire, is specifically light corresponding to a basis of scattered light, and is, for example, light emitted and output from the first light emitting unit 61A or the second light emitting unit 62A. In addition, the "scattered light" is light for detecting smoke to determine an occurrence of a fire, is specifically light generated due to scattering when detection light is scattered by being irradiated to smoke particles, and is, for example, light received by the light receiving unit 63A described below.

(Configuration—Smoke Detection Unit Cover)

Next, the smoke detection unit cover 4A of FIG. 4 is a partition unit that partitions the light shielding space 3A. Specifically, the smoke detection unit cover 4A surrounds the light shielding space 3A together with the circuit board 6A, and is a light shielding area formation member that forms the light shielding space 3A. Details of the smoke detection unit cover 4A will be described below.

(Configuration—Insect Screen)

Next, the insect screen 5A of FIG. 4 is an insect repellent unit that prevents insects outside the outer cover 2A from intruding into the light shielding space 3A. Specifically, the insect screen 5A prevents insects from entering the light shielding space 3A while allowing gas to flow into the light shielding space 3A from the outside of the outer cover 2A through small holes of the insect screen 5A. A specific type or configuration of the insect screen 5A is arbitrary. For example, the insect screen 5A has a flat plate shape and is formed separately from the smoke detection unit cover 4A. In addition, only one insect screen 5A is provided to cover the entire outer cover-side inflow/outflow opening 211A.

(Configuration—Circuit Board)

Next, the circuit board 6A of FIG. 4 is a mounting unit on which each element of the detector 100A is mounted, is a partition unit that partitions the light shielding space 3A, and specifically surrounds the light shielding space 3A together with the smoke detection unit cover 4A. A specific type or configuration of the circuit board 6A is arbitrary. For example, the circuit board 6A is fixed to an inside of the outer cover 2A using the arbitrary fixing unit described above, has a flat plate shape extending along the XY plane as a whole, and includes an absorbing layer 600A and the first light emitting unit 61A, the second light emitting unit 62A, and the light receiving unit 63A of FIG. 2.

(Configuration—Circuit Board—Absorbing Layer)

The absorbing layer 600A is an absorbing unit that absorbs light, specifically absorbs light reflected by the smoke detection unit cover 4A inside the light shielding space 3A, and is a layer provided on the light shielding space 3A side in the circuit board 6A. A specific type or configuration of the absorbing layer 600A is arbitrary. For example, the absorbing layer 600A is a layer to which a known black light absorption material having a high absorptivity is applied or which is formed of the absorption material.

(Configuration—Circuit Board—First Light Emitting Unit)

The first light emitting unit 61A is a detection unit that detects smoke flowing into the light shielding space 3A, and is specifically a first light emitting unit that emits detection light toward the occurrence space 32A in the light shielding space 3A along the first light emitting-side optical axis 611A. The first light emitting unit 61A is mounted on the circuit board 6A, and includes, for example, an arbitrary light emitting component (as an example, a blue light emitting diode, etc.) and an arbitrary optical component (as an example, a prism, etc.). Here, the first light emitting-side optical axis 611A is an axis indicating a straight direction in which detection light from the first light emitting unit 61A is output, is specifically an axis intersecting at least the light receiving-side optical axis 631A, corresponds to, for example, a straight line connecting a portion of the first light emitting unit 61A at which detection light is output and the detection point 31A, and corresponds to a straight line virtually illustrated in FIG. 2.

(Configuration—Circuit Board—Second Light Emitting Unit)

The second light emitting unit 62A is a detection unit that detects smoke flowing into the light shielding space 3A, is specifically a second light emitting unit that emits detection light toward the occurrence space 32A in the light shielding space 3A along the second light emitting-side optical axis 621A, is mounted on the circuit board 6A, is configured to, for example, emit detection light having a different wavelength from that of detection light from the first light emitting unit 61A, and includes, as an example, an arbitrary light emitting component (as an example, a red light emitting diode, etc.) and an arbitrary optical component (as an example, a prism, etc.). Here, the second light emitting-side optical axis 621A is an axis indicating a straight direction in which detection light from the second light emitting unit 62A is output, is specifically an axis intersecting at least the light receiving-side optical axis 631A, corresponds to, for example, a straight line connecting a portion of the second light emitting unit 62A at which detection light is output and the detection point 31A, and corresponds to a straight line virtually illustrated in FIG. 2.

(Configuration—Circuit Board—Light Receiving Unit)

The light receiving unit 63A is a detection unit that detects smoke flowing into the light shielding space 3A, and is specifically a light receiving unit that receives the scattered light generated when detection light emitted from the first light emitting unit 61A or the second light emitting unit 62A is scattered by smoke flowing into the occurrence space 32A of the light shielding space 3A along the light receiving-side optical axis 631A. The light receiving unit 63A is mounted on the circuit board 6A, and includes, for example, an arbitrary light receiving component (as an example, a photodiode) and an arbitrary optical component (as an example, a prism). Here, the light receiving-side optical axis 631A is an axis indicating a direction in which the light receiving unit 63A receives scattered light. For example, the light receiving-side optical axis 631A intersects the first light emitting-side optical axis 611A and the second light emitting-side optical axis 621A at the detection point 31A, corresponds to a straight line connecting a portion of the light receiving unit 63A at which scattered light is received and the detection point 31A, and corresponds to a straight line virtually illustrated in FIG. 2. Further, orientations and arrangements of the light receiving-side optical axis 631A, the first light emitting-side optical axis 611A, and the second light emitting-side optical axis 621A may be arbitrarily set as long as at least a point at which the light receiving-side optical axis 631A and the first light emitting-side optical axis 611A intersect each other is inside the light shielding space 3A, and a point at which the light receiving-side optical axis 631A and the second light emitting-side optical axis 621A intersect each other is inside the light shielding space 3A. Here, for example, the following description will be made on the assumption that the orientations and arrangements are set so that the respective optical axes mutually intersect each other at the detection point 31A corresponding to one point, and the respective optical axes are provided on the same plane parallel to the XY plane. In addition, in the following description, a plane defined by the light receiving-side optical axis 631A, the first light emitting-side optical axis 611A, and the second light emitting-side optical axis 621A is referred to as an "optical axis definition plane".

(Configuration—Details)

Next, details of the smoke detection unit cover 4A will be described.

(Configuration—Details—Smoke Detection Unit Cover)

FIG. 5 is a perspective view of a smoke detection unit cover in a state viewed from the attachment surface side, FIG. 6 is a perspective view of the smoke detection unit cover in a state viewed from an opposite side from the attachment surface side, and FIG. 7 is an enlarged view of a part of FIG. 4. For example, the smoke detection unit cover 4A of the respective figures is fixed to the circuit board 6A using an arbitrary fixing unit (for example, a screw, an adhesive, an engaging structure, or a fitting structure), is formed by a known material having the same property as that of the absorption material forming the absorbing layer 600A of the circuit board 6A, is made of a black resin having a hollow portion, and includes a smoke detection unit cover-side inflow/outflow opening 41A, a component accommodation portion 42A, and a smoke detection unit cover-side inclined portion 43A.

(Configuration—Details—Smoke Detection Unit Cover—Smoke Detection Unit Cover-Side Inflow/Outflow Opening)

The smoke detection unit cover-side inflow/outflow opening 41A of FIG. 4 is an inflow/outflow opening that allows gas containing smoke to flow into and/or flow out of the light shielding space 3A, is specifically an opening provided in the smoke detection unit cover 4A, and is, for example, an opening provided toward an opposite side (−Z direction) from the attachment surface 11A in the smoke detection unit cover 4A with respect to a direction (Z direction) substantially orthogonal to the attachment surface 11A. Only one smoke detection unit cover-side inflow/outflow opening 41A is provided.

(Configuration—Details—Smoke Detection Unit Cover—Component Accommodation Portion)

The component accommodation portion 42A of FIG. 5 and FIG. 6 is a component accommodation unit that accommodates a component, specifically corresponds to three parts accommodating the first light emitting unit 61A, the second light emitting unit 62A, and the light receiving unit 63A, respectively, and, for example, accommodates the first light emitting unit 61A, the second light emitting unit 62A, and the light receiving unit 63A mounted on the circuit board 6A of FIG. 4 inside the component accommodation portion 42A through a communication opening 42aA communicating with the inside of the component accommodation portion 42A.

(Configuration—Details—Smoke Detection Unit Cover—Smoke Detection Unit Cover-Side Inclined Portion)

The smoke detection unit cover-side inclined portion 43A of FIG. 5 to FIG. 7 is a reflecting unit that primarily reflects detection light emitted from the first light emitting unit 61A and the second light emitting unit 62A in a direction intersecting the optical axis definition plane, is specifically formed by inclining at least a part of the smoke detection unit cover 4A on the first light emitting-side optical axis 611A and the second light emitting-side optical axis 621A, and corresponds to, for example, a side wall of the smoke detection unit cover 4A. The "reflecting unit" primarily reflects detection light emitted from the light emitting unit in a direction intersecting a plane defined by the light emitting-side optical axis and the light receiving-side optical axis. For example, in Embodiment 1, the "reflecting unit" primarily reflects detection light from the first light emitting unit 61A in a direction intersecting a plane defined by the first light emitting-side optical axis 611A and the light receiving-side optical axis 631A (that is, the optical axis definition plane). In addition, the "reflecting unit" primarily reflects detection light from the second light emitting unit 62A in a direction intersecting a plane defined by the second light emitting-side optical axis 621A and the light receiving-side optical axis 631A (that is, the optical axis definition plane). In addition, the "direction intersecting the optical axis definition plane" is any direction that is not parallel to the optical axis definition plane, and corresponds to a concept including, for example, a direction forming a predetermined angle (for example, 90 degrees, etc.) with respect to the optical axis definition plane. In addition, "primarily reflecting" refers to reflecting output light for the first time, and corresponds to a concept including, for example, reflecting detection light from the first light emitting unit 61A not reflected in the light shielding space 3A for the first time, or reflecting detection light from the second light emitting unit 62A not reflected in the light shielding space 3A for the first time.

Further, a specific type or configuration of the smoke detection unit cover-side inclined portion 43A is arbitrary. For example, the smoke detection unit cover-side inclined portion 43A is configured as below to reduce a degree of adverse effect on detection of smoke by the detector 100A caused when detection light emitted from each of the first light emitting unit 61A and the second light emitting unit 62A is reflected in the light shielding space 3A without being scattered and the reflected detection light is received by the light receiving unit 63A. Specifically, a configuration of the smoke detection unit cover-side inclined portion 43A is arbitrary as long as detection light emitted from each of the first light emitting unit 61A and the second light emitting unit 62A is primarily reflected in the direction intersecting the optical axis definition plane. For example, a description will be given below on the assumption that the smoke detection unit cover-side inclined portion 43A is configured to have the following configurations. Detection light emitted from each of the first light emitting unit 61A and the second light emitting unit 62A is primarily reflected mutually in the same direction. Specifically, detection light emitted from each of the first light emitting unit 61A and the second light emitting unit 62A is primarily reflected to the upper side (+Z direction) corresponding to the attachment surface 11A side of FIG. 4, and detection light emitted from each of the first light emitting unit 61A and the second light emitting unit 62A is primarily reflected by the absorbing layer 600A of the circuit board 6A. In addition, when detection light from the first light emitting unit 61A reflected by the smoke detection unit cover-side inclined portion 43A is reflected in the light shielding space 3A once after the primary reflection and returns to the smoke detection unit cover-side inclined portion 43A, the returning detection light is reflected to the first light emitting unit 61A side. In addition, when detection light from the second light emitting unit 62A reflected by the smoke detection unit cover-side inclined portion 43A is reflected in the light shielding space 3A once after the primary reflection and returns to the smoke detection unit cover-side inclined portion 43A, the returning detection light is reflected to the second light emitting unit 62A side.

The smoke detection unit cover-side inclined portion 43A is inclined as a whole. For example, as illustrated in FIG. 7, the smoke detection unit cover-side inclined portion 43A is inclined so that an acute angle AD formed by the first light emitting-side optical axis 611A and the smoke detection unit cover-side inclined portion 43A is 45 degrees, and an acute angle (not illustrated) formed by the second light emitting-side optical axis 621A and the smoke detection unit cover-side inclined portion 43A is 45 degrees. An acute angle (not illustrated) formed by the light receiving-side optical axis 633A and the smoke detection unit cover-side inclined portion 43A may be arbitrarily set. Here, for example, to reliably reduce the degree of adverse effect on detection of smoke by the detector 100A, the smoke detection unit cover-side inclined portion 43A is inclined such that the acute angle is 45 degrees.

(Air Flow)

Next, the air flow in the detector 100A configured as described above will be described. FIG. 8 is a diagram illustrating the air flow in FIG. 4 using white arrows. When gas containing smoke generated by occurrence of a fire moves from all directions, the detector 100A takes the gas into the light shielding space 3A to detect the gas, and can promptly and reliably determine occurrence of the fire. Here, with reference to FIG. 8, for example, a description will be given of an example of the air flow when the gas containing smoke due to the fire moves from a left side of the drawing toward the detector 100A.

First, as indicated by the white arrows of FIG. 8, the gas moving toward the detector 100A flows into the light shielding space 3A through the outer cover-side inflow/outflow opening 211A, the insect screen 5A, and the smoke detection unit cover-side inflow/outflow opening 41A. Thereafter, the gas flows out to the outside of the light shielding space 3A through the smoke detection unit cover-side inflow/outflow opening 41A, the insect screen 5A, and the outer cover-side inflow/outflow opening 211A.

(Determination of Fire)

Next, a description will be given of determination of a fire in the detector 100A configured as described above. FIG. 9 is a diagram illustrating a path of detection light in FIG. 7 using arrows. The detector 100A determines a fire by emitting detection light from at least one of the first light emitting unit 61A and the second light emitting unit 62A to detect smoke in a similar manner to that in a related technology using a known scheme. However, since paths of detection lights from the first light emitting unit 61A and the second light emitting unit 62A are similar to each other, a case in which smoke is detected using detection light from the first light emitting unit 61A will be described as an example here.

First, as indicated by the arrows of FIG. 9, the first light emitting unit 61A outputs detection light along the first light emitting-side optical axis 611A. The detection light is irradiated to the smoke detection unit cover-side inclined portion 43A by passing through the occurrence space 32A, primarily reflected to the upper side (+Z direction) by the smoke detection unit cover-side inclined portion 43A, and irradiated to the absorbing layer 600A of the circuit board 6A. Here, since the smoke detection unit cover-side inclined portion 43A is configured as described above, the primarily reflected detection light is irradiated in a state of forming 90 degrees with respect to the absorbing layer 600A of the circuit board 6A. Further, at least a part of the detection light is absorbed by the absorbing layer 600A, and the other part of the detection light irradiated to the absorbing layer 600A other than the part absorbed by the absorbing layer 600A is reflected by the absorbing layer 600A, reflected in a state of forming 90 degrees with respect to the absorbing layer 600A, and irradiated to the smoke detection unit cover-side inclined portion 43A. Subsequently, the detection light irradiated to the smoke detection unit cover-side inclined portion 43A is reflected by the smoke detection unit cover-side inclined portion 43A and returns to the first light emitting unit 61A side by passing through the occurrence space 32A.

Further, for example, when smoke flows into the occurrence space 32A by the air flow described with reference to FIG. 8, scattered light is generated by the occurrence space 32A, the scattered light is received by the light receiving unit 63A of FIG. 2, and the detector 100A detects smoke on the basis of a quantity of received light of the scattered light to determine a fire. In particular, as described above with reference to the arrows of FIG. 9, since the detection light from the first light emitting unit 61A is prevented from being reflected without being scattered in the light shielding space 3A and received by the light receiving unit 63A, the detector 100A can accurately detect smoke and reliably determine a fire.

Effect of Embodiment 1

As described above, according to Embodiment 1, by primarily reflecting detection light emitted from the first light emitting unit 61A and the second light emitting unit 62A in the direction intersecting the plane defined by the first light emitting-side optical axis 611A, the second light emitting-side optical axis 621A, and the light receiving-side optical axis 631A, for example, the detection light from the first light emitting unit 61A and the second light emitting unit 62A can be prevented from being directly incident on the light receiving unit 63A after being reflected only once in the light shielding space 3A. Thus, it is possible to reduce the degree of the adverse effect of the detection light on determination of a fire.

In addition, when the reflecting unit is formed by inclining at least a part of the first light emitting-side optical axis 611A and the second light emitting-side optical axis 621A in the smoke detection unit cover 4A forming the light shielding space 3A, for example, the smoke detection unit cover 4A can be used as the light reflecting unit. Thus, a dedicated component for configuring the reflecting unit is unnecessary, the number of components of the detector 100A can be reduced, and the weight and cost of the detector 100A can be reduced.

In addition, in the case where detection light primarily reflected by the smoke detection unit cover-side inclined portion 43A corresponding to the reflecting unit is reflected once in the light shielding space 3A after the primary reflection and returns to the smoke detection unit cover-side inclined portion 43A, for example, it is possible to prevent the detection light returning to the smoke detection unit cover-side inclined portion 43A from being incident on the light receiving unit 63A by reflecting the returning detection light to a side of the first light emitting unit 61A and the second light emitting unit 62A. Thus, it is possible to further reduce the degree of adverse effect of the detection light on determination of a fire. In addition, for example, in the case where smoke corresponding to the detection target is present in the occurrence space 32A, in addition to detection light before primary reflection by the smoke detection unit cover-side inclined portion 43A, detection light returning after primary reflection can be allowed to pass through the occurrence space 32A. Thus, it is possible to increase the quantity of light in the occurrence space 32A, and it is possible to provide a scattered light detector having relatively high sensitivity.

In addition, by primarily reflecting detection light emitted from the first light emitting unit 61A and the second light emitting unit 62A by the absorbing layer 600A, for example, the detection light can be absorbed by the absorbing layer 600A. Thus, it is possible to weaken the intensity of the detection light after primary reflection, and it is possible to further reduce the degree of adverse effect of the detection light on determination of a fire.

In addition, by primarily reflecting the detection light emitted from the first light emitting unit 61A and the second light emitting unit 62A to the attachment surface 11A side, for example, it is possible to primarily reflect the detection light toward the upper side (+Z direction) on the opposite side from the lower side (−Z direction) corresponding to a side at which dust is generally likely to be deposited. Thus, it is possible to prevent the detection light from being incident on the light receiving unit 63A due to reflection of the detection light by dust, and it is possible to further reduce the degree of adverse effect of the detection light on determination of a fire.

In addition, since the smoke can be detected, for example, when the detection target is smoke, it is possible to reliably determine a fire by detecting the smoke.

Embodiment 2

Next, the fire detection apparatus according to Embodiment 2 will be described. Embodiment 2 corresponds to a mode in which a light guiding unit described below corresponds to a light guiding space for guiding partial detection light described below, and a light guiding space from a light emitting unit side described below to a light receiving unit side described below is included.

(Configuration)

First, a description will be given of a configuration of a detector according to Embodiment 2. FIG. 10 is a perspective view of the detector according to Embodiment 2, FIG. 11 is a bottom view of the detector, FIG. 12 is a side view of the detector, FIG. 13 is a cross-sectional view taken along A-A line of FIG. 11, and FIG. 14 is a bottom view of a part of a circuit board and a smoke detection unit cover in the detector. For convenience of description, a guide portion 22B and a rib 23B of FIG. 10 are omitted in FIG. 11, the rib 23B of FIG. 10 is omitted in FIG. 12 and FIG. 13, and only a part of a circuit board 6B is illustrated in FIG. 14.

In the following description, X-Y-Z illustrated in the respective drawings are directions orthogonal to one another. Specifically, the Z direction is a vertical direction (that is, a direction in which gravity acts), and the X direction and the Y direction are horizontal directions orthogonal to the vertical direction. For example, the Z direction is referred to as a height direction, a +Z direction is referred to as an upper side (plane surface), and a −Z direction is referred to as a lower side (bottom surface). In addition, in the illustrated detector 100B, terms related to the [X-Y-Z directions] below are convenient expressions for describing a relative positional relationship (or direction) of respective components. In the following description, with reference to a center position of a light shielding space 3B of FIG. 13, a direction away from the light shielding space 3B is referred to as an "outer side", and a direction approaching the light shielding space 3B is referred to as an "inner side". In the following, after describing an overall configuration of the detector 100B, details of a particularly characteristic configuration will be described.

The detector 100B illustrated in each of these figures is a scattered light detector and an alarm unit that monitors and warns an occurrence of a fire by detecting smoke corresponding to a detection target contained in gas. Specifically, as illustrated in FIG. 13, the detector 100B is used by being attached to an installation surface 900B corresponding to a surface on a lower side (−Z direction) (that is, a lower surface) of the ceiling in the monitored area. For example, the detector 100B includes an attachment base 1B, an outer cover 2B, a light shielding space 3B, a smoke detection unit cover 4B, an insect screen 5B, a circuit board 6B, and a light guiding space 7B of FIG. 14.

(Configuration—Attachment Base)

The attachment base 1B is an attaching unit that attaches the outer cover 2B to the installation surface 900B. A specific type or configuration of the attachment base 1B is arbitrary. For example, the attachment base 1B has an attachment surface 11B corresponding to a surface facing the installation surface 900B, is fixed to the installation surface 900B between the outer cover 2B and the installation surface 900B by a known fixing unit (for example, a screw or a fitting structure), and is made of a disc-shaped resin as a whole.

(Configuration—Outer Cover)

Next, the outer cover 2B of FIG. 13 is a cover that covers the light shielding space 3B, the smoke detection unit cover 4B, the insect screen 5B, the circuit board 6B, and the light guiding space 7B (hereinafter an object to be accommodated) corresponding to components of the detector 100B. Specifically, the outer cover 2B is attached to the installation surface 900B via the attachment base 1B. For example, the outer cover 2B is made of a disc-shaped resin as a whole. A specific type of configuration of the outer cover 2B is arbitrary. For example, the outer cover 2B includes a main body 21B, the guide portion 22B, and the rib 23B of FIG. 10.

(Configuration—Outer Cover—Main Body)

The main body 21B is an accommodation unit that accommodates the object to be accommodated, is specifically formed by a cylindrical portion provided on the upper side (+Z direction) in the height direction (Z direction) and a tapered portion whose diameter decreases from the cylindrical portion toward the lower side (−Z direction), and includes, for example, an outer cover-side inflow/outflow opening 211B.

(Configuration—Outer Cover—Main Body—Outer Cover-Side Inflow/Outflow Opening)

The outer cover-side inflow/outflow opening 211B is an inflow/outflow opening that allows gas containing smoke to flow into and/or flow out of the light shielding space 3B, and is provided toward the opposite side (−Z direction) from the attachment surface 11B in the main body 21B with respect to the direction (Z direction) substantially orthogonal to the attachment surface 11B. A specific configuration of the outer cover-side inflow/outflow opening 211B is arbitrary. For example, as illustrated in FIG. 11, a plurality of outer cover-side inflow/outflow openings 211B is provided around a division point 21aB. Here, the division point 21aB is a point that divides gas flowing into the light shielding space 3B and gas flowing out of the light shielding space 3B, is specifically a part of the main body 21B on the lower side (−Z direction), and is, for example, a part in which the main body 21B and the guide portion 22B immediately below a detection point 31B are mutually connected to each other.

(Configuration—Outer Cover—Guide Portion)

The guide portion 22B of FIG. 13 is a guide member provided on the opposite side (−Z direction) from the attachment surface 11B via the main body 21B with respect to the direction (Z direction) substantially orthogonal to the attachment surface 11B, specifically has a smaller diameter than that of the main body 21B as a whole, and includes, for example, a guide portion-side inclination portion 221B.

(Configuration—Outer Cover—Guide Portion—Guide Portion-Side Inclination Portion)

The guide portion-side inclination portion 221B is a guiding unit that guides gas such that the gas flows into the light shielding space 3B through the outer cover-side inflow/outflow opening 211B, and is specifically formed by inclining at least a part of the guide portion 22B on the main body 21B side such that the part approaches the attachment surface 11B toward the division point 21aB side (that is, from the outer side toward the inner side along an XY plane).

(Configuration—Outer Cover—Guide Portion—Rib)

The rib 23B of FIG. 10 is a guiding unit that guides gas such that the gas flows into the light shielding space 3B through the outer cover-side inflow/outflow opening 211B, and specifically functions as a reinforcing unit that fixes and reinforces the guide portion 22B with respect to the main body 21B while functioning as the guiding unit. A specific configuration of the rib 23B is arbitrary. For example, the rib 23B is provided between the main body 21B and the guide portion 22B. In addition, eight ribs 23B are radially provided with respect to the division portion 21aB to mutually partition the plurality of outer cover-side inflow/outflow openings 211B of FIG. 11 in two radial combinations.

(Configuration—Light Shielding Space)

Next, the light shielding space 3B of FIG. 13 is a light shielding area shielded from light from the outside, and is specifically a space surrounded by the smoke detection unit cover 4B and the circuit board 6B. A specific type or configuration of the light shielding space 3B is arbitrary. For example, the light shielding space 3B is a space including a detection point 31B and an occurrence space 32B.

(Configuration—Light Shielding Space—Detection Point)

The detection point 31B is a point in the light shielding space 3B, and is a point serving as a reference for detecting smoke. For example, the detection point 31B corresponds to a position at which a first light emitting-side optical axis 611B, a second light emitting-side optical axis 621B, and a light receiving-side optical axis 631B illustrated in FIG. 11 and described below intersect one another. As an example, the detection point 31B corresponds to a position near a center of the detector 100B in a horizontal direction (a direction parallel to the XY plane).

(Configuration—Light Shielding Space—Occurrence Space)

The occurrence space 32B is a space in the light shielding space 3B, is a detection space into which smoke flows, and is specifically a space surrounding the detection point 31B. For example, the occurrence space 32B is a space irradiated with the detection light emitted from a first light emitting unit 61B or a second light emitting unit 62B described below and is a space in which the scattered light received by a light receiving unit 63B can be generated.

(Configuration—Smoke Detection Unit Cover)

Next, the smoke detection unit cover 4B of FIG. 13 is a partition unit that partitions the light shielding space 3B. Specifically, the smoke detection unit cover 4B surrounds the light shielding space 3B together with the circuit board 6B, and is a light shielding area formation member that forms the light shielding space 3B. Details of the smoke detection unit cover 4B will be described below.

(Configuration—Insect Screen)

Next, the insect screen 5B of FIG. 13 is an insect repellent unit that prevents insects outside the outer cover 2B from intruding into the light shielding space 3B. Specifically, the insect screen 5B prevents insects from entering the light shielding space 3B while allowing gas to flow into the light shielding space 3B from the outside of the outer cover 2B through small holes of the insect screen 5B. A specific type or configuration of the insect screen 5B is arbitrary. For example, the insect screen 5B has a flat plate shape and is formed separately from the smoke detection unit cover 4B. In addition, only one insect screen 5B is provided to cover the entire outer cover-side inflow/outflow opening 211B.

(Configuration—Circuit Board)

Next, the circuit board 6B of FIG. 13 is a mounting unit on which each element of the detector 100B is mounted, is a partition unit that partitions the light shielding space 3B, and specifically surrounds the light shielding space 3B together with the smoke detection unit cover 4B. The circuit board 6B includes at least the first light emitting unit 61B, the second light emitting unit 62B, and the light receiving unit 63B of FIG. 11. Details of the circuit board 6B including these respective units will be described below.

(Configuration—Light Guiding Space)

The light guiding space 7B of FIG. 11 is the light guiding unit, and specifically guides the partial detection light corresponding to light which is only a part of the detection light emitted from the first light emitting unit 61B and the second light emitting unit 62B without passing through the occurrence space 32B. Details of the light guiding space 7B will be described below.

(Configuration—Details)

Next, a description will be given of details of the smoke detection unit cover 4B, the circuit board 6B, and the light guiding space 7B. For convenience of description, the circuit board 6B, the smoke detection unit cover 4B, and the light guiding space 7B will be described in this order.

(Configuration—Details—Circuit Board)

FIG. 15 is an exploded perspective view of the circuit board and a part of the smoke detection unit cover in the detector, and FIG. 16 is a perspective view of the circuit board and the part of the smoke detection unit cover in the detector. For example, the circuit board 6B is used to form the light guiding space 7B of FIG. 14 between the smoke detection unit cover 4B and the circuit board 6B, is fixed to the inside of the outer cover 2B using the arbitrary fixing unit, has a flat plate shape extending along the XY plane as a whole, and includes an absorbing layer 600B, a reflective layer 601B, and a positioning hole 602B of FIG. 15 and the first light emitting unit 61B, the second light emitting unit 62B, and the light receiving unit 63B of FIG. 11.

(Configuration—Details—Circuit Board—Absorbing Layer)

The absorbing layer 600B of FIG. 15 is an absorbing unit that absorbs light, specifically absorbs light reflected by the smoke detection unit cover 4B inside the light shielding space 3B, and is a layer provided on an entire surface of a portion corresponding to a wall that partitions the light shielding space 3B in the circuit board 6B. A specific type or configuration of the absorbing layer 600B is arbitrary. For example, the absorbing layer 600B is a layer to which a known black light absorption material having a high absorptivity is applied or which is formed of the absorption material.

(Configuration—Details—Circuit Board—Reflective Layer)

The reflective layer 601B of FIG. 15 is a reflecting unit that reflects the partial detection light corresponding to light which is only a part of detection light emitted from the first light emitting unit 61B and the second light emitting unit 62B at a predetermined reflectance, specifically forms the light guiding space 7B, and has a shape corresponding to a shape of a light guiding space groove 46B described below. The "predetermined reflectance" is a reflectance determined in advance, and is specifically a reflectance which is at least higher than a reflectance of the absorbing layer 600B. A specific type or configuration of the reflective layer 601B is arbitrary. For example, the reflective layer 601B is a layer provided overlapping on a surface of the absorbing layer 600B, and is a layer formed of a material having a predetermined reflectance. As an example, the reflective layer 601B is a layer formed of a silk material having a predetermined reflectance.

(Configuration—Details—Circuit Board—Positioning Hole)

The positioning hole 602B of FIG. 15 is a positioning unit that positions the smoke detection unit cover 4B with respect to the circuit board 6B. For example, three positioning holes 602B are provided.

(Configuration—Details—Circuit Board—First Light Emitting Unit)

The first light emitting unit 61B of FIG. 11 is a detection unit that detects smoke flowing into the light shielding space 3B, is specifically a first light emitting unit that emits detection light toward the occurrence space 32B in the light shielding space 3B along the first light emitting-side optical axis 611B, and is mounted on the circuit board 6B. Here, the first light emitting-side optical axis 611B is an axis indicating a straight direction in which detection light from the first light emitting unit 61B is output, is specifically an axis intersecting at least the light receiving-side optical axis 631B, corresponds to, for example, a straight line connecting a portion of the first light emitting unit 61B at which detection light is output and the detection point 31B, and corresponds to a straight line virtually illustrated in FIG. 11. A specific type of configuration of the first light emitting unit 61B is arbitrary. For example, the first light emitting unit 61B includes a first light emitting element 612B and a first light emitting side optical component 613B of FIG. 13.

The first light emitting element 612B is a detection light output unit that outputs detection light, and is, for example, a light emitting diode that outputs blue detection light. In addition, the first light emitting side optical component 613B is a detection light guiding unit that guides detection light from the first light emitting element 612B to the light shielding space 3B side, and is, for example, a prism. Further, the first light emitting unit 61B including the first light emitting element 612B and the first light emitting side optical component 613B is configured to output most of detection light from the first light emitting element 612B to the light shielding space 3B through the first light emitting side optical component 613B, and output at least a part of a portion of detection light from the first light emitting element 612B which is not output to the light shielding space 3B to the light guiding space 7B of FIG. 14 as partial detection light.

(Configuration—Details—Circuit Board—Second Light Emitting Unit)

The second light emitting unit 62B of FIG. 11 is a detection unit that detects smoke flowing into the light shielding space 3B, is specifically a second light emitting unit that emits detection light toward the occurrence space 32B in the light shielding space 3B along the second light emitting-side optical axis 621B, and is mounted on the circuit board 6B. Here, the second light emitting-side optical axis 621B is an axis indicating a straight direction in which detection light from the second light emitting unit 62B is output, is specifically an axis intersecting at least the light receiving-side optical axis 631B, corresponds to, for example, a straight line connecting a portion of the second light emitting unit 62B at which detection light is output and the detection point 31B, and corresponds to a straight line virtually illustrated in FIG. 11. A specific type or configuration of the second light emitting unit 62B is arbitrary. For example, the second light emitting unit 62B includes a second light emitting element 622B of FIG. 15 and a second light emitting side optical component (not illustrated).

The second light emitting element 622B is a detection light output unit that outputs detection light, and is, for example, a light emitting diode that outputs red detection light. In addition, the second light emitting side optical component (not illustrated) is similar to the first light emitting side optical component 613B of the first light emitting unit 61B. That is, the second light emitting side optical component is a detection light guiding unit that guides detection light from the second light emitting element 622B to the light shielding space 3B side, and is, for example, a prism. Further, the second light emitting unit 62B including the second light emitting element 622B and the second light emitting side optical component is configured to output most of detection light from the second light emitting element 622B to the light shielding space 3B through the second light emitting side optical component, and output at least a part of a portion of detection light from the second light emitting element 622B which is not output to the light shielding space 3B to the light guiding space 7B of FIG. 14 as partial detection light.

(Configuration—Details—Circuit Board—Light Receiving Unit)

The light receiving unit 63B of FIG. 11 is a detection unit that detects smoke flowing into the light shielding space 3B, is specifically a light receiving unit that receives the scattered light generated when detection light emitted from the first light emitting unit 61B or the second light emitting unit 62B is scattered by smoke flowing into the occurrence space 32B of the light shielding space 3B along the light receiving-side optical axis 631B, and is mounted on the circuit board 6B. Here, the light receiving-side optical axis 631B is an axis indicating a direction in which the light receiving unit 63B receives scattered light. For example, the light receiving-side optical axis 631B intersects the first light emitting-side optical axis 611B and the second light emitting-side optical axis 621B at the detection point 31B, corresponds to a straight line connecting a portion of the light receiving unit 63B at which scattered light is received and the detection point 31B, and corresponds to a straight line virtually illustrated in FIG. 11. Further, orientations and arrangements of the light receiving-side optical axis 631B, the first light emitting-side optical axis 611B, and the second light emitting-side optical axis 621B may be arbitrarily set as long as at least a point at which the light receiving-side optical axis 631B and the first light emitting-side optical axis 611B intersect each other is inside the light shielding space 3B, and a point at which the light receiving-side optical axis 631B and the second light emitting-side optical axis 621B intersect each other is inside the light shielding space 3B. Here, for example, the following description will be made on the assumption that the orientations and arrangements are set so that the respective optical axes mutually intersect each other at the detection point 31B corresponding to one point, and the respective optical axes are provided on the same plane parallel to the XY plane. In addition, in the following description, a plane defined by the light receiving-side optical axis 631B, the first light emitting-side optical axis 611B, and the second light emitting-side optical axis 621B is referred to as an "optical axis definition plane". Returning to FIG. 11, a specific type or configuration of the light receiving unit 63B is arbitrary. For example, the light receiving unit 63B includes a light receiving element 632B of FIG. 15 and a light receiving side optical component (not illustrated).

The light receiving element 632B is a detection light output unit that receives scattered light, and is, for example, a photodiode. In addition, the light receiving side optical component (not illustrated) is similar to the first light emitting side optical component 613B of the first light emitting unit 61B, that is, is a scattered light guiding unit that guides the scattered light incident thereon to the light receiving element 632B, for example, a prism. Further, the light receiving unit 63B including the light receiving element 632B and the light receiving side optical component is configured to receive scattered light from the occurrence space 32B, and receive partial detection light from the first light emitting unit 61B and the second light emitting unit 62B through the light guiding space 7B.

(Configuration—Details—Smoke Detection Unit Cover)

FIG. 17 is a perspective view of a smoke detection unit cover in a state viewed from the attachment surface side, and FIG. 18 is a perspective view of the smoke detection unit cover in a state viewed from an opposite side from the attachment surface side. For example, the smoke detection unit cover 4B of the respective figures is used to form the light guiding space 7B between the smoke detection unit cover 4B and the circuit board 6B, is fixed to the circuit board 6B using an arbitrary fixing unit (for example, a screw, an adhesive, an engaging structure, or a fitting structure), is formed by a known material having the same property as that of the absorption material forming the absorbing layer 600B of the circuit board 6B, is made of a black resin having a hollow portion, and includes a smoke detection unit cover-side inflow/outflow opening 41B, a smoke detection unit cover side substrate facing opening 42B, a smoke detection unit cover-side inclined portion 43B, a smoke detection unit cover side component accommodation portion 44B, a positioning projection 45B, and a light guiding space groove 46B.

(Configuration—Details—Smoke Detection Unit Cover—Smoke Detection Unit Cover-Side Inflow/Outflow Opening)

The smoke detection unit cover-side inflow/outflow opening 41B of FIG. 13 is an inflow/outflow opening that allows gas containing smoke to flow into and/or flow out of the light shielding space 3B, is specifically an opening provided in the smoke detection unit cover 4B, and is, for example, an opening provided toward an opposite side (−Z direction) from the attachment surface 11B in the smoke detection unit cover 4B with respect to a direction (Z direction) substantially orthogonal to the attachment surface 11B. Only one smoke detection unit cover-side inflow/outflow opening 41B is provided.

(Configuration—Details—Smoke Detection Unit Cover—Smoke Detection Unit Cover Side Substrate Facing Opening)

The smoke detection unit cover side substrate facing opening 42B of FIG. 17 is an opening that can be provided on the circuit board 6B side as illustrated in FIG. 13, and, for example, has a larger diameter than that of the smoke detection unit cover-side inflow/outflow opening 41B.

(Configuration—Details—Smoke Detection Unit Cover—Smoke Detection Unit Cover-Side Inclined Portion)

The smoke detection unit cover-side inclined portion 43B of FIG. 17 is a reflecting unit that primarily reflects detection light emitted from each of the first light emitting unit 61B and the second light emitting unit 62B in a direction intersecting the optical axis definition plane, is specifically formed by inclining at least a part of the smoke detection unit cover 4B on the first light emitting-side optical axis 611B and the second light emitting-side optical axis 621B, and corresponds to, for example, a side wall of the smoke detection unit cover 4B.

(Configuration—Details—Smoke Detection Unit Cover—Smoke Detection Unit Cover Side Component Accommodation Portion)

The smoke detection unit cover side component accommodation portion 44B of FIG. 17 and FIG. 18 is a component accommodation unit that accommodates a component, and includes, for example, a first light emitting unit accommodation portion 441B, a second light emitting unit accommodation portion 442B, and a light receiving unit accommodation portion 443B configured similarly to one another.

(Configuration—Details—Smoke Detection Unit Cover—Smoke Detection Unit Cover Side Component Accommodation Portion—First Light Emitting Unit Accommodation Portion)

The first light emitting unit accommodation portion 441B of FIG. 17 accommodates at least a part of the first light emitting unit 61B (for example, at least a part of the first light emitting side optical component 613B), for example, communicates with the circuit board 6B side through a first light emitting unit substrate side opening 441aB, and communicates with a hollow portion (that is, the light shielding space 3B) side of the smoke detection unit cover through a first light emitting unit light shielding space side opening 441bB of FIG. 15.

(Configuration—Details—Smoke Detection Unit Cover—Smoke Detection Unit Cover Side Component Accommodation Portion—Second Light Emitting Unit Accommodation Portion)

The second light emitting unit accommodation portion 442B of FIG. 17 accommodates at least a part of the second light emitting unit 62B (for example, at least a part of the second light emitting side optical component (not illustrated)), for example, communicates with the circuit board 6B side through a second light emitting unit substrate side opening 442aB, and communicates with the hollow portion side of the smoke detection unit cover through a second light emitting unit light shielding space side opening 442bB of FIG. 18.

(Configuration—Details—Smoke Detection Unit Cover—Smoke Detection Unit Cover Side Component Accommodation Portion—Light Receiving Unit Accommodation Portion)

The light receiving unit accommodation portion 443B of FIG. 17 accommodates at least a part of the light receiving unit 63B (for example, at least a part of the light receiving side optical component (not illustrated)), for example, communicates with the circuit board 6B side through a light receiving unit substrate side opening 443aB, and communicates with the hollow portion side of the smoke detection unit cover through a light receiving unit light shielding space side opening (not illustrated).

(Configuration—Details—Smoke Detection Unit Cover—Smoke Detection Unit Cover Side Component Accommodation Portion—Positioning Projection)

The positioning projection 45B of FIG. 17 is a positioning unit that positions the smoke detection unit cover 4B with respect to the circuit board 6B, and is specifically inserted into the positioning hole 602B of FIG. 15. For example, three positioning projections 45B are provided.

(Configuration—Details—Smoke Detection Unit Cover—Smoke Detection Unit Cover Side Component Accommodation Portion—Light Guiding Space Groove)

The light guiding space groove 46B of FIG. 17 forms the light guiding space 7B, and is a groove provided on a circuit board side facing surface 400B which is a surface facing the circuit board 6B in the smoke detection unit cover side component accommodation portion 44B. A specific type or configuration of the light guiding space groove 46B is arbitrary. For example, the light guiding space groove 46B is formed as a groove that connects the first light emitting unit substrate side opening 441aB, the second light emitting unit substrate side opening 442aB, and the light receiving unit substrate side opening 443aB to one another.

(Configuration—Details—Light Guiding Space)

The light guiding space 7B of FIG. 14 is a light guiding unit that guides partial detection light from the first light emitting unit 61B and partial detection light from the second light emitting unit 62B to the light receiving unit 63B without passing through the occurrence space 32B. A specific type or configuration of the light guiding space 7B is arbitrary. For example, the light guiding space 7B extends from a side of the first light emitting unit 61B and the second light emitting unit 62B to a side of the light receiving unit 63B, includes the reflective layer 601B of FIG. 15, is surrounded by at least a part of the smoke detection unit cover 4B (specifically, the light guiding space groove 46B of FIG. 17) and at least a part of the circuit board 6B (specifically, a portion corresponding to the reflective layer 601B), and is an enclosed space into which and from which smoke may not flow.

(Air Flow)

Next, the air flow in the detector 100B configured as described above will be described. FIG. 19 is a diagram illustrating the air flow in FIG. 13 using white arrows. When gas containing smoke generated by occurrence of a fire moves from all directions, the detector 100B takes the gas into the light shielding space 3B to detect the gas, and can promptly and reliably determine occurrence of the fire. Here, with reference to FIG. 19, for example, a description will be given of an example of the air flow when the gas containing smoke due to the fire moves from a left side of the drawing toward the detector 100B.

First, as indicated by the white arrows of FIG. 19, the gas moving toward the detector 100B flows into the light shielding space 3B through the outer cover-side inflow/outflow opening 211B, the insect screen 5B, and the smoke detection unit cover-side inflow/outflow opening 41B. In this case, since the light guiding space 7B of FIG. 14 is an enclosed space as described above, the gas does not flow into the light guiding space 7B. Thereafter, the gas flows out to the outside of the light shielding space 3B through the smoke detection unit cover-side inflow/outflow opening 41B, the insect screen 5B, and the outer cover-side inflow/outflow opening 211B.

(Determination of Fire)

Next, a description will be given of determination of a fire in the detector 100B configured as described above. The detector 100B determines a fire by emitting detection light from at least one of the first light emitting unit 61B and the second light emitting unit 62B to detect smoke. As specific contents of a smoke detection scheme and fire determination here, an arbitrary scheme including a known scheme may be used. Thus, a description thereof will be omitted.

(State Comprehending Process)

Next, a description will be given of a state comprehending process executed by the detector 100B configured as described above. Here, the "state comprehending process" is a process for comprehending a state of the detector 100B, and is specifically a process for comprehending a state of the first light emitting unit 61B, the second light emitting unit 62B, or the light receiving unit 63B. Specific content of the state comprehending process is arbitrary. For example, a control unit (not illustrated) of the detector 100B successively and repeatedly performs a control operation of outputting detection light from the first light emitting unit 61B and the second light emitting unit 62B every predetermined time. When this control operation is performed, whether detection light having a quantity of light within a reference range determined in advance is received by the light receiving unit 63B is determined to comprehend a state.

Specifically, first, the control unit (not illustrated) of the detector 100B performs a control operation of outputting detection light from the first light emitting unit 61B. In this instance, when the first light emitting unit 61B of FIG. 13 is normal, the first light emitting unit 61B outputs the detection light, and most of the detection light is output to the light shielding space 3B and repeatedly reflected inside the light shielding space 3B to attenuate to near a detection limit of the light receiving unit 63B. On the other hand, at least a part of the detection light from the first light emitting unit 61B which is not output to the light shielding space 3B is output as a partial detection light to the light guiding space 7B of FIG. 14, repeatedly reflected by the reflective layer 601B in the light guiding space 7B, and then incident on the light receiving unit 63B at a level that allows sufficient detection by the light receiving unit 63B. Further, when a quantity of partial detection light received by the light receiving unit 63B is within a reference range, the control unit (not illustrated) of the detector 100B comprehends that both the first light emitting unit 61B and the light receiving unit 63B are normal, and displays and outputs (for example, lighting for five seconds in green, etc.) the information through, for example, an indicator light (not illustrated) of the detector 100B. In addition, when the quantity of partial detection light received by the light receiving unit 63B is not within the reference range, the control unit (not illustrated) of the detector 100B comprehends that at least one of the first light emitting unit 61B or the light receiving unit 63B is abnormal, and displays and outputs (for example, repeated flashing in red, etc.) the information through, for example, the indicator light (not illustrated) of the detector 100B. In addition, the control unit (not illustrated) of the detector 100B performs a control operation of outputting detection light from the second light emitting unit 62B, and performs a similar process to that in a case of performing the control operation of outputting detection light from the first light emitting unit 61B. In this way, it is possible to comprehend a state using partial detection light passing through the light guiding space 7B.

Effect of Embodiment 2

As described above, according to Embodiment 2, by guiding partial detection light corresponding to light which is only a part of detection light emitted from the first light emitting unit 61B and the second light emitting unit 62B used to comprehend a state of the first light emitting unit 61B, the second light emitting unit 62B, or the light receiving unit 63B to the light receiving unit 63B without passing through the occurrence space 32B, for example, the partial detection light may be allowed to enter the light receiving unit 63B. Thus, it is possible to comprehend the state of the first light emitting unit 61B, the second light emitting unit 62B, or the light receiving unit 63B. In particular, for example, by including the light guiding space 7B, it is possible to freely set a path of the light guiding space 7B by surrounding a certain space. Thus, for example, guidance of a light guiding member such as an optical fiber in the detector 100B is unnecessary, and it is possible to improve manufacturability of the detector 100B. In addition, for example, since the inside of the light guiding space 7B can be made hollow, it is possible to reduce the amount of a material for forming the light guiding space 7B, and thus it is possible to reduce the cost and weight of the detector 100B.

In addition, when the light guiding space 7B includes the reflective layer 601B, for example, it is possible to prevent partial detection light from attenuating in the light guiding space 7B. Thus, partial detection light can be reliably made incident on the light receiving unit 63B.

In addition, since the light guiding space 7B is surrounded by at least a part of the circuit board 6B, for example, it is unnecessary to provide a dedicated component for forming the light guiding space 7B. Thus, it is possible to reduce the number of components, and it is possible to reduce the cost and weight of the detector 100B.

In addition, when the light guiding space 7B is an enclosed space, for example, it is possible to prevent smoke corresponding to the detection target from flowing into the light guiding space 7B. Therefore, partial detection light can be made stably incident on the light receiving unit 63B regardless of the detection target flowing into the occurrence space 32B, and thus it is possible to accurately comprehend a state of the first light emitting unit 61B and the second light emitting unit 62B, or the light receiving unit 63B at all times.

In addition, when the detection target is smoke, for example, smoke can be detected, and thus it is possible to reliably determine a fire by detection of the smoke.

Embodiment 3

Next, the fire detection apparatus according to Embodiment 3 will be described. Embodiment 3 corresponds to a mode including an incidence suppression unit described below that suppresses incidence of ambient light into a detection space and a depression described below obtained by forming a predetermined portion of a base portion described below in a concave shape.

(Configuration)

First, a description will be given of a configuration of the fire detection apparatus according to Embodiment 3. FIG. 20 is a side view illustrating an attachment situation of the fire detection apparatus according to Embodiment 3. FIG. 21 is a bottom view illustrating the fire detection apparatus in a state of removing an attachment base described below. FIG. 22 is a cross-sectional view taken along A-A line of FIG. 21. In the following description, an X direction of FIG. 20 is referred to as a left-right direction of the fire detection apparatus (a +X direction is a left direction of the fire detection apparatus and a −X direction is a right direction of the fire detection apparatus), a Y direction of FIG. 21 is referred to as a front-back direction of the fire detection apparatus (a +Y direction is a frontward direction of the fire detection apparatus and a −Y direction is a backward direction of the fire detection apparatus), and a Z direction of FIG. 20 is referred to as a vertical direction of the fire detection apparatus (a +Z direction is an upward direction of the fire detection apparatus and a −Z direction is a downward direction of the fire detection apparatus). In addition, with reference to a center position of the detection space of FIG. 22 described below, a direction away from the detection space described below is referred to as an "outer side", and a direction approaching the detection space described below is referred to as an "inner side".

The fire detection apparatus 1C is an apparatus that detects and reports a detection target (for example, smoke, etc.) contained in gas. The fire detection apparatus 1C is installed on an installation surface 2C on a lower surface of a ceiling portion of a building in an interior of the building, and includes an attachment base 10C, an outer cover 20C, an inner cover 30C, an inflow space 40C, an insect screen 50C, a detection space 60C, a detector cover 70C, a detector body 80C, a terminal board 90C, and a substrate 100C as illustrated in FIG. 20 to FIG. 22.

(Configuration—Attachment Base)

Returning to FIG. 20, the attachment base 10C is an attaching unit that attaches the outer cover 20C to the installation surface 2C. The attachment base 10C is configured using, for example, a known attachment base for the fire detection apparatus (as an example, a substantially plate-shaped attachment base made of resin), etc., and is fixed to the installation surface 2C by a fixing tool, etc. as illustrated in FIG. 20.

(Configuration—Outer Cover)

The outer cover 20C is a cover that covers the inner cover 30C, the inflow space 40C, the insect screen 50C, the detection space 60C, the detector cover 70C, the detector body 80C, the terminal board 90C, and the substrate 100C. The outer cover 20C is formed of, for example, a resin material having a light shielding property, and includes an outer cover body 21C, a top surface portion 22C, a first rib portion 23C, and a second rib portion 24C as illustrated in FIG. 20 to FIG. 22.

Among these portions, the outer cover body 21C is a basic structure of the outer cover 20C. The outer cover body 21C is formed from, for example, a substantially hollow cylindrical body whose upper surface and lower surface are open, is disposed so that an upper end portion of the outer cover body 21C comes into contact with a lower surface of the attachment base 10C as illustrated in FIG. 20, and is fixed to the attachment base 10C by a fitting structure (or a fixing tool), etc.

In addition, the top surface portion 22C is a partition unit that partitions the inflow space 40C. The top surface portion 22C is formed from, for example, a substantially circular plate-shaped body, and is provided substantially horizontally below the outer cover body 21C as illustrated in FIG. 20 to FIG. 22. In addition, as illustrated in FIG. 21, a display hole 22aC is provided in the top surface portion 22C. The display hole 22aC is a through-hole for guiding light irradiated from a display unit described below to the outside of the fire detection apparatus 1C through a light guide 104aC and the display hole 22aC of FIG. 21.

In addition, the first rib portion 23C is a partition unit that partitions the inflow space 40C. The first rib portion 23C is formed from a substantially plate-shaped body, and is provided vertically between the outer cover body 21C and the top surface portion 22C. Specifically, as illustrated in FIG. 20 and FIG. 22, a plurality of first rib portions 23C is provided radially from the vicinity of a center of the outer cover 20C, and is connected to the outer cover body 21C and the top surface portion 22C.

In addition, the second rib portion 24C is a partition unit that partitions the inflow space 40C. The second rib portion 24C is formed from a substantially plate-shaped body, and is provided vertically between the outer cover body 21C and the top surface portion 22C. Specifically, as illustrated in FIG. 20 and FIG. 22, a plurality of second rib portions 24C is provided between inner end portions of adjacent first rib portions 23C, and is connected to the outer cover body 21C and the top surface portion 22C.

(Configuration—Inflow Space)

Returning to FIG. 20, the inflow space 40C is a space for allowing gas on the outside of the fire detection apparatus 1C to flow into the fire detection apparatus 1C. A plurality of inflow spaces 40C is formed inside the outer cover 20C. Specifically, as illustrated in FIG. 20 and FIG. 22, a space surrounded by the top surface portion 22C, the first rib portion 23C, the second rib portion 24C, and the inner cover 30C in an internal space of the outer cover 20C is formed as the inflow space 40C.

(Configuration—Inner Cover)

The inner cover 30C is a cover that covers the detection space 60C, the detector cover 70C, the detector body 80C, and the substrate 100C, and is a partition unit that partitions the inflow space 40C. The inner cover 30C is, for example, a substantially hollow cylindrical body whose upper surface is open, is formed of a resin material having a light shielding property, and is provided so that a lower side portion of the inner cover 30C faces the top surface portion 22C of the outer cover 20C through the inflow space 40C on the inside of the outer cover 20C as illustrated in FIG. 22. In addition, as illustrated in FIG. 22, a first opening 30aC is formed in the lower side portion of the inner cover 30C. The first opening 30aC is an opening for sending gas flowing into the inflow space 40C to the detection space 60C, and is provided at a substantially central portion and the vicinity thereof in the lower side portion of the inner cover 30C as illustrated in FIG. 22.

(Configuration—Detection Space)

The detection space 60C is a space for detecting a detection target. As illustrated in FIG. 22, a space surrounded by the detector cover 70C and the detector body 80C in an internal space of the inner cover 30C is formed as the detection space 60C.

(Configuration—Detector Cover)

The detector cover 70C is a partition unit that partitions the detection space 60C, and is an incidence suppression unit that suppresses incidence of ambient light into the detection space 60C. The detector cover 70C is a substantially hollow cylindrical body whose upper surface is open, and is formed of a resin material having a light shielding property. In addition, as illustrated in FIG. 22, the detector cover 70C is disposed so that a lower side portion of the detector cover 70C faces the top surface portion 22C of the outer cover 20C through the first opening 30aC and the inflow space 40C on the inside of the inner cover 30C, and is fixed to the detector body 80C. In addition, as illustrated in FIG. 22, a second opening 70aC is formed in the lower side portion of the detector cover 70C. The second opening 70aC is an opening for allowing gas sent from the first opening 30aC to flow into the detection space 60C, and is provided at a portion corresponding to the first opening 30aC in the lower side portion of the detector cover 70C as illustrated in FIG. 22. The "detector cover 70C" corresponds to a "cover portion" in claims.

(Configuration—Insect Screen)

The insect screen 50C is a net for preventing insects present outside the fire detection apparatus 1C from intruding into the detection space 60C. The insect screen 50C is configured using a mesh-like and circular net, and is attached to the detector cover 70C as illustrated in FIG. 22.

(Configuration—Detector Body)

The detector body 80C is an attaching unit that attaches the detector cover 70C, and is an incidence suppression unit that suppresses incidence of ambient light into the detection space 60C. The detector body 80C is, for example, a thick plate-shaped body (as an example, a substantially circular plate-shaped body) formed of a resin material having a light shielding property, is provided on the substrate 100C side (in FIG. 22, upper side) of the detector cover 70C, is specifically disposed to cover an upper surface of the detector cover 70C as illustrated in FIG. 22, and is fixed to the substrate 100C by a fixing tool, etc. Details of a configuration of the detector body 80C will be described below. In addition, the detector body 80C corresponds to a "base portion" in the claims.

(Configuration—Terminal Board)

Returning to FIG. 22, the terminal board 90C is an accommodation unit that accommodates the inner cover 30C, the detector cover 70C, the detector body 80C, and the substrate 100C. The terminal board 90C has a substantially hollow cylindrical shape whose lower surface is open, and is formed of, for example, a resin material having a light shielding property. In addition, as illustrated in FIG. 22, the terminal board 90C is provided to cover the inner cover 30C, the detector cover 70C, the detector body 80C, and the substrate 100C from above, is fixed to the outer cover 20C by a fitting structure, etc., and is fixed to the attachment base 10C by a fixing tool, etc. through a first attachment hole (not illustrated) formed in an attachment member 91C.

(Configuration—Substrate)

The substrate 100C is a mounting unit on which various electric circuits (not illustrated) are mounted. The substrate 100C is configured using, for example, a known flat plate-shaped circuit board, etc., is disposed substantially horizontally at an interval from an upper end portion and a lower end portion of the terminal board 90C in the terminal board 90C as illustrated in FIG. 22, and is fixed to the terminal board 90C by a fixing tool through an attachment hole (not illustrated) formed in the terminal board 90C and a second attachment hole (not illustrated) formed in the attachment member 91C.

Further, in addition to the fact that a component C of FIG. 23A described below (for example, a known electric component) used for the conventional fire detection apparatus 1C is mounted on the substrate 100C, a first light emitting unit, a second light emitting unit, a light receiving unit, a display unit, a communication unit, a power supply unit, a control unit, and a storage unit (all of which are not illustrated) are mounted on the substrate 100C.

(Configuration—Substrate—First Light Emitting Unit, Second Light Emitting Unit, and Light Receiving Unit)

Among these units, the first light emitting unit is a first light emitting unit that irradiates the detection space 60C with detection light (hereinafter referred to as "first detection light"), and is configured using, for example, a known light emitting element (as an example, an infrared light emitting diode (LED), etc.). In addition, the second light emitting unit is a second light emitting unit that irradiates the detection space 60C with detection light (hereinafter referred to as "second detection light") having a different wavelength from that of the first detection light, and is configured using, for example, a known light emitting element (as an example, an blue LED, etc.). In addition, the light receiving unit is a light receiving unit that receives scattered light of the first detection light irradiated from the first light emitting unit due to smoke, outputs a first light receiving signal according to the received scattered light, receives scattered light of the second detection light irradiated from the second light emitting unit with respect to smoke, and outputs a second light receiving signal according to the received scattered light, and is configured using, for example, a known light receiving element (as an example, a photodiode, etc.). In addition, a method of installing the first light emitting unit, the second light emitting unit, and the light receiving unit is arbitrary. In Embodiment 3, installation is performed to be able to avoid direct reception of the first detection light or the second detection light irradiated from the first light emitting unit or the second light emitting unit through various prism lens portions described below. For example, as illustrated in FIG. 23B described below, the first light emitting unit and the light receiving unit are installed at a position at which an angle between an optical axis L1C of the first light emitting unit (hereinafter referred to as a "first light emitting-side optical axis L1C") and an optical axis L3C of the light receiving unit (hereinafter referred to as a "light receiving-side optical axis L3C") is about 135°. In addition, the second light emitting unit and the light receiving unit are installed at a position at which an angle between an optical axis L2C of the second light emitting unit (hereinafter referred to as a "second light emitting-side optical axis L2C") and the light receiving-side optical axis L3C is about 90°. The "first light emitting unit", the "second light emitting unit", and the "light receiving unit" described above correspond to "detection unit" in the claims.

(Configuration—Substrate—Display Unit, Communication Unit, and Power Supply Unit)

In addition, the display unit is a display unit that displays designated information (for example, information indicating the presence or absence of detection of a fire) by irradiating light (hereinafter, referred to as "display light") toward the outside of the fire detection apparatus 1C, and is configured using, for example, a known display unit (an LED, etc.). A light projection method of the display unit is arbitrary. Examples thereof include light projection by guiding display light from the display unit toward the outside of the fire detection apparatus 1C through the light guide 104aC inserted into insertion holes (not illustrated) provided in each of the detector cover 70C, the detector body 80C, and the inner cover 30C and the display hole 22aC of the outer cover 20C described below. In addition, the communication unit is a communication unit that communicates with an external apparatus (for example, a receiver, etc.). In addition, the power supply unit is a power supply unit that supplies power supplied from a commercial power supply or a battery (not illustrated) to each unit of the fire detection apparatus 1C.

(Configuration—Substrate—Control Unit and Storage Unit)

In addition, the control unit is a control unit that controls the fire detection apparatus 1C. Specifically, the control unit is a computer including a central processing unit (CPU) and an internal memory such as a random access memory (RAM) for storing various programs (including a basic control program such as the OS and an application program activated on the OS to realize a specific function) to be interpreted and executed on the CPU, a program, and various data. In addition, the storage unit is a storage unit that stores programs and various data necessary for an operation of the fire detection apparatus 1C. The storage unit is configured using a rewritable recording medium. For example, a non-volatile recording medium such as a flash memory can be used.

Next, details of a configuration of the detector body 80C will be described. FIGS. 23A and 23B are diagrams illustrating the detector body 80C, in which FIG. 23A is a plan view and FIG. 23B is a bottom view. In FIG. 23B, the first light emitting-side optical axis L1C, the second light emitting-side optical axis L2C, and the light receiving-side optical axis L3C are indicated by imaginary lines. However, the detector body 80C can be manufactured in an arbitrary shape using an arbitrary method and material, unless otherwise specified.

In Embodiment 3, as illustrated in FIGS. 23A and 23B, a first prism lens portion 81aC, a second prism lens portion 81bC, a third prism lens portion 81cC, and a chamber portion 82C are provided in the detector body 80C.

(Configuration—Details of Configuration of Detector Body—First Prism Lens Portion, Second Prism Lens Portion, and Third Prism Lens Portion)

The first prism lens portion 81aC is used to change an orientation of the first detection light of the first light emitting unit so that the first detection light enters the detection space 60C (specifically, change the orientation of the first detection light so that the orientation is substantially parallel to a side surface of the detector body 80C on the detection space 60C side). The first prism lens portion 81aC is configured using, for example, a known prism lens (this description is similarly applied to the second prism lens portion 81bC and the third prism lens portion 81cC), and is provided in a first chamber portion 83C described below as illustrated in FIGS. 23A and 23B. In addition, the second prism lens portion 81bC changes an orientation of the second detection light of the second light emitting unit so that the second detection light enters the detection space 60C, and is provided in a second chamber portion 84C described below as illustrated in FIGS. 23A and 23B. In addition, the third prism lens portion 81cC changes an orientation of scattered light received from the detection space 60C so that the scattered light enters the light receiving unit, and is provided in a third chamber portion 85C described below as illustrated in FIGS. 23A and 23B.

(Configuration—Details of Configuration of Detector Body—Chamber Portion)

Returning to FIG. 22, the chamber portion 82C is used to support the first prism lens portion 81aC, the second prism lens portion 81bC, the third prism lens portion 81cC, and the detector cover 70C. As illustrated in FIG. 22 and FIGS. 23A and 23B, the chamber portion 82C is provided on a lower surface of the detector body 80C and includes the first chamber portion 83C, the second chamber portion 84C, and the third chamber portion 85C.

Among these portions, the first chamber portion 83C supports the first prism lens portion 81aC and a part of the detector cover 70C, is formed from, for example, a hollow body whose upper surface and lower surface are open (this description is similarly applied to the second chamber portion 84C and the third chamber portion 85C), and is provided at a position corresponding to the first light emitting unit as illustrated in FIGS. 23A and 23B. In addition, as illustrated in FIGS. 23A and 23B, a first incidence port 83aC for allowing first detection light irradiated from the first light emitting unit to enter the first prism lens portion 81aC and a first incidence port 83bC for allowing first detection light whose orientation is changed by the first prism lens portion 81aC to enter the detection space 60C are provided in the first chamber portion 83C.

In addition, the second chamber portion 84C supports the second prism lens portion 81bC and the other part of the detector cover 70C, and is provided at a position corresponding to the second light emitting unit as illustrated in FIGS. 23A and 23B. In addition, as illustrated in FIGS. 23A and 23B, a second incidence port 84aC for allowing second detection light irradiated from the second light emitting unit to enter the second prism lens portion 81bC and a second incidence port 84bC for allowing second detection light whose orientation is changed by the second prism lens portion 81bC to enter the detection space 60C are provided in the second chamber portion 84C.

In addition, the third chamber portion 85C supports the third prism lens portion 81cC and the other part of the detector cover 70C, and is provided at a position corresponding to the light receiving unit as illustrated in FIGS. 23A and 23B. In addition, as illustrated in FIGS. 23A and 23B, a third incidence port 85aC for allowing scattered light from the detection space 60C to enter the third prism lens portion 81cC and a third incidence port 85bC for allowing scattered light whose orientation is changed by the third prism lens portion 81cC to enter the light receiving unit are provided in the third chamber portion 85C.

In addition, a method of forming the chamber portion 82C is arbitrary. For example, the chamber portion 82C and the detector body 80C may be integrally formed by injection-molding a resin material having a light shielding property.

In addition, a method of attaching the first prism lens portion 81aC, the second prism lens portion 81bC, the third prism lens portion 81cC, and the detector cover 70C is arbitrary. For example, after vertically inserting the first prism lens portion 81aC to the third prism lens portion 81cC into the first chamber portion 83C to the third chamber portion 85C, respectively, a part of an upper portion of the detector cover 70C is attached to the first chamber portion 83C to the third chamber portion 85C by fitting.

(Configuration—Accommodation Structure)

Next, an accommodation structure of the detector body 80C will be described. A feature of the accommodation structure for improving an accommodation characteristic of the component C mounted on the substrate 100C (indicated by an imaginary line in FIG. 23A and hereinafter simply referred to as a "component C") is described below in Embodiment 3.

That is, as illustrated in FIG. 23A, a first substrate side depression 86aC, a second substrate side depression 86bC, a third substrate side depression 86cC, a fourth substrate side depression 86dC, and a fifth substrate side depression 86eC are provided in the detector body 80C.

The first substrate side depression 86aC, the second substrate side depression 86bC, the third substrate side depression 86cC, the fourth substrate side depression 86dC, and the fifth substrate side depression 86eC are depressions for accommodating the component C. The first substrate side depression 86aC, the second substrate side depression 86bC, the third substrate side depression 86cC, the fourth substrate side depression 86dC, and the fifth substrate side depression 86eC are configured by forming a part of a portion of the detector body 80C on the substrate 100C side (a predetermined portion. An upper portion of the detector body 80C in FIG. 22.) in a concave shape. Specifically, as illustrated in FIG. 23A, the first substrate side depression 86aC is configured by forming a portion corresponding to the first chamber portion 83C or a portion in the vicinity thereof and facing a part of the component C in the portion of the detector body 80C on the substrate 100C side in a concave shape. In addition, the second substrate side depression 86bC is configured by forming a portion corresponding to the second chamber portion 84C or a portion in the vicinity thereof and facing another part of the component C in the portion of the detector body 80C on the substrate 100C side in a concave shape. In addition, the third substrate side depression 86cC is configured by forming a portion corresponding to the third chamber portion 85C or a portion in the vicinity thereof and facing another part of the component C in the portion of the detector body 80C on the substrate 100C side in a concave shape. In addition, the fourth substrate side depression 86dC is configured by forming an outer edge of a portion other than the chamber portion 82C and a portion in the vicinity thereof facing another part of the component C in the portion of the detector body 80C on the substrate 100C side in a concave shape. In addition, the fifth substrate side depression 86eC is configured by forming a portion adjacent to the first substrate side depression 86aC, the second substrate side depression 86bC, and the fourth substrate side depression 86dC in a portion other than the chamber portion 82C and facing another part of the component C in the portion of the detector body 80C on the substrate 100C side in a concave shape.

In addition, sizes of the first substrate side depression 86aC, the second substrate side depression 86bC, the third substrate side depression 86cC, the fourth substrate side depression 86dC, and the fifth substrate side depression 86eC are arbitrary. In Embodiment 3, the sizes are set to sizes that allow accommodation of the component C facing the respective depressions. Specifically, with regard to a size of a planar shape of each depression, as illustrated in FIG. 23A, sizes of the fourth substrate side depression 86dC, the fifth substrate side depression 86eC, the second substrate side depression 86bC, the third substrate side depression 86cC, and the first substrate side depression 86aC are set to increase in this order. However, the sizes are not limited thereto. For example, the sizes may be changed in accordance with a size of the component C or the number of components C. In addition, a depth of each depression is desirably as shallow as possible as long as the facing component C can be accommodated. For example, the depth may be individually set on the basis of an experimental result, etc. Alternatively, from a viewpoint of manufacturability of the detector body 80C, the depths may be set to uniform depths.

In addition, a method of forming the first substrate side depression 86aC, the second substrate side depression 86bC, the third substrate side depression 86cC, the fourth substrate side depression 86dC, and the fifth substrate side depression 86eC is arbitrary. For example, the first substrate side depression 86aC, the second substrate side depression 86bC, the third substrate side depression 86cC, the fourth substrate side depression 86dC, the fifth substrate side depression 86eC, and the detector body 80C may be integrally formed by injection-molding a resin material having a light shielding property. Alternatively, the depressions may be formed by performing a notch process on the detector body 80C formed by injection-molding a resin material having a light shielding property (this description is substantially similarly applied to a method of forming a first detection space side depression 87aC, a second detection space side depression 87bC, and a third detection space side depression 87cC described below).

The component C can be accommodated inside the first substrate side depression 86aC, the second substrate side depression 86bC, the third substrate side depression 86cC, the fourth substrate side depression 86dC, and the fifth substrate side depression 86eC by such an accommodation structure. Therefore, a space for mounting the component C can be easily ensured between the detector body 80C and the substrate 100C, so that the accommodation characteristic of the component C can be improved. In particular, a space for mounting the component C can be formed in the portion of the detector body 80C on the substrate 100C side, which makes it easier to ensure the space. In addition, since the first substrate side depression 86*a*C, the second substrate side depression 86*b*C, the third substrate side depression 86*c*C, the fourth substrate side depression 86*d*C, and the fifth substrate side depression 86*e*C are provided in a portion facing the component C in the portion of the detector body 80C on the substrate 100C side, a space for mounting the component C can be effectively formed, and the space can be made compact.

(Configuration—Reflection Suppressing Structure)

Next, a reflection suppressing structure of the detector body 80C will be described. A feature of the reflection suppressing structure for suppressing reflection of the first detection light or the second detection light incident on the detector body 80C toward the light receiving unit is described below in Embodiment 3.

That is, as illustrated in FIG. 23B, the first detection space side depression 87*a*C, the second detection space side depression 87*b*C, and the third detection space side depression 87*c*C are provided in the detector body 80C.

Each of the first detection space side depression 87*a*C, the second detection space side depression 87*b*C, and the third detection space side depression 87*c*C is a depression for suppressing reflection of the first detection light or the second detection light incident on the detector body 80C toward the light receiving unit. Here, for example, a statement that "suppressing reflection of the first detection light or the second detection light incident on the detector body 80C toward the light receiving unit" corresponds to reflecting the first detection light or the second detection light incident on the detector body 80C in another direction other than a direction toward the light receiving unit, reflecting the first detection light or the second detection light incident on the detector body 80C toward a part of the first detection space side depression 87*a*C, etc.

In addition, the first detection space side depression 87*a*C, the second detection space side depression 87*b*C, and the third detection space side depression 87*c*C are configured by forming a portion of the detector body 80C on the detection space 60C side (a predetermined portion. A lower portion of the detector body 80C in FIG. 22.) in a concave shape. Specifically, as illustrated in FIG. 23B, the first detection space side depression 87*a*C is configured by forming the vicinity of the first incidence port 83*b*C of the first chamber portion 83C in the portion of the detector body 80C on the detection space 60C side in a concave shape. In addition, the second detection space side depression 87*b*C is configured by forming the vicinity of the second incidence port 84*b*C of the second chamber portion 84C and a portion adjacent to the first detection space side depression 87*a*C in the portion of the detector body 80C on the detection space 60C side in a concave shape. In addition, the third detection space side depression 87*c*C is configured by forming the vicinity of the third incidence port 85*a*C of the third chamber portion 85C and a portion adjacent to the second detection space side depression 87*b*C in the portion of the detector body 80C on the detection space 60C side in a concave shape.

In addition, a method of installing the first detection space side depression 87*a*C, the second detection space side depression 87*b*C, and the third detection space side depression 87*c*C is arbitrary. In Embodiment 3, the depressions are disposed at positions that allow the first detection light or the second detection light to enter the first detection space side depression 87*a*C, the second detection space side depression 87*b*C, and the third detection space side depression 87*c*C. Specifically, when viewed from a planar direction, the depressions are disposed at portions overlapping the first light emitting-side optical axis L1C, the second light emitting-side optical axis L2C, or the light receiving-side optical axis L3C in the portion of the detector body 80C on the detection space 60C side. For example, as illustrated in FIG. 23B, when viewed from the planar direction, the first detection space side depression 87*a*C may be disposed at a portion overlapping the first light emitting-side optical axis L1C and the light receiving-side optical axis L3C in the portion of the detector body 80C on the detection space 60C side. In addition, when viewed from the planar direction, the second detection space side depression 87*b*C may be disposed at a portion overlapping the first light emitting-side optical axis L1C, the second light emitting-side optical axis L2C, and the light receiving-side optical axis L3C in the portion of the detector body 80C on the detection space 60C side. In addition, when viewed from the planar direction, the third detection space side depression 87*c*C may be disposed at a portion overlapping the first light emitting-side optical axis L1C, the second light emitting-side optical axis L2C, and the light receiving-side optical axis L3C in the portion of the detector body 80C on the detection space 60C side.

In addition, sizes of the first detection space side depression 87*a*C, the second detection space side depression 87*b*C, and the third detection space side depression 87*c*C are arbitrary. In Embodiment 3, the sizes are set to sizes that allow suppression of reflection of the first detection light or the second detection light entering the detector body 80C (specifically, the first detection space side depression 87*a*C, the second detection space side depression 87*b*C, and the third detection space side depression 87*c*C) toward the light receiving unit. Specifically, a size of a planar shape of each depression is desirably set to be as small as possible as long as reflection of the first detection light or the second detection light toward the light receiving unit can be suppressed, and thus may be individually set on the basis of, for example, an experimental result, etc. (in FIG. 23B, the sizes of the second detection space side depression 87*b*C, the first detection space side depression 87*a*C, and the third detection space side depression 87*c*C are set to increase in this order). In addition, a depth of each depression is desirably as shallow as possible as long as reflection of the first detection light or the second detection light toward the light receiving unit can be suppressed. Thus, for example, the depth may be individually set on the basis of an experimental result, etc.

According to such a reflection suppressing structure, it is possible to suppress reflection of the first detection light or the second detection light entering the detector body 80C toward the light receiving unit by the first detection space side depression 87*a*C, the second detection space side depression 87*b*C, and the third detection space side depression 87*c*C. Therefore, even though a detection target is not detected, it is possible to avoid an excessive increase in quantity of received light of the light receiving unit, and it is possible to maintain detection accuracy of the fire detection apparatus 1C. In particular, it is possible to suppress reflection of the first detection light or the second detection light incident on the side surface of the detector body 80C on the detection space 60C side toward the light receiving unit, and it is possible to further avoid the excessive increase in quantity of received light of the light receiving unit.

(With Regard to Action of Fire Detection Apparatus)

Next, a description will be given of an action of the fire detection apparatus 1C configured as described above.

That is, for example, at the time of assembling the fire detection apparatus 1C, when the first substrate side depression 86*a*C, the second substrate side depression 86*b*C, the third substrate side depression 86*c*C, the fourth substrate side depression 86dC, and the fifth substrate side depression 86eC are provided in the detector body 80C, the component C is accommodated inside the first substrate side depression 86aC, the second substrate side depression 86bC, the third substrate side depression 86cC, the fourth substrate side depression 86dC, and the fifth substrate side depression 86eC, and thus the component C can be reliably accommodated.

In addition, for example, when the first detection light or the second detection light irradiated from the first light emitting unit or the second light emitting unit enters the first detection space side depression 87aC, the second detection space side depression 87bC, or the third detection space side depression 87cC in a state in which the fire detection apparatus 1C is attached to the installation surface 2C, reflection of the entering first detection light or second detection light toward the light receiving unit is suppressed by the first detection space side depression 87aC, the second detection space side depression 87bC, or the third detection space side depression 87cC, and thus it is possible to avoid the excessive increase in quantity of received light of the light receiving unit even though a detection target is not detected.

(Test Result)

Then, a description will be given of a test result of a light receiving test with regard to the fire detection apparatus 1C. Here, the "light receiving test" is a test for measuring a quantity of received light of the light receiving unit when the first detection light or the second detection light is irradiated from the first light emitting unit or the second light emitting unit in a state in which a detection target is not present in the detection space 60C.

In addition, a test method of the light receiving test is arbitrary. For example, the test method is described below. That is, first, a fire detection apparatus including any one of a first detector body described below to a fourth detector body described below is installed in a place in which a detection target is not present. Subsequently, the first detection light is irradiated from only the first light emitting unit for 60 seconds, and a quantity of received light of the light receiving unit at this time is measured. Then, an average value of the quantity of received light measured for 60 seconds is identified as quantity of received light to be measured.

Here, a test object used for the light receiving test is divided into four types of the first detector body to the fourth detector body. Among these detector bodies, the first detector body is the detector body 80C in which a depression is not formed in the portion of the detector body 80C on the detection space 60C side. In addition, the second detector body is the detector body 80C in which the third detection space side depression 87cC is formed in the portion of the detector body 80C on the detection space 60C side. In addition, the third detector body is the detector body 80C in which the second detection space side depression 87bC and the third detection space side depression 87cC are formed in the portion of the detector body 80C on the detection space 60C side. In addition, the fourth detector body is the detector body 80C in which the first detection space side depression 87aC, the second detection space side depression 87bC, and the third detection space side depression 87cC are formed in the portion of the detector body 80C on the detection space 60C side.

Next, details of the test result of the light receiving test will be described. FIG. 24 is a diagram illustrating the test result of the light receiving test. As illustrated in FIG. 24, with regard to a quantity of received light of the first detector body, the quantity of received light (A/D conversion value) equals 30. On the other hand, with regard to a quantity of received light of each of the second detector body to the fourth detector body, the quantity of received light (A/D conversion value) is less than 30, which is smaller than the quantity of received light of the first detector body. In particular, with regard to the quantity of received light of the fourth detector body, the quantity of received light (A/D conversion value) is 15, and thus is about half the quantity of received light of the first detector body.

From the test result shown in FIG. 24, it can be understood that the first detection light entering the detector body 80C can be inhibited from being reflected toward the light receiving unit, and effectiveness of providing at least one or more of the first detection space side depression 87aC, the second detection space side depression 87bC, or the third detection space side depression 87cC could be confirmed.

Effect of Embodiment 3

As described above, according to Embodiment 3, since the incidence suppression unit, which is used to suppress incidence of ambient light into the detection space 60C, having the detector cover 70C covering an outer periphery of the detection space 60C and the detector body 80C that is closer to the substrate 100C than the detector cover 70C, and the depression obtained by forming a predetermined portion of the detector body 80C in a concave shape are included, for example, the component C can be accommodated on the inside of the first substrate side depression 86aC, the second substrate side depression 86bC, the third substrate side depression 86cC, the fourth substrate side depression 86dC, and the fifth substrate side depression 86eC among the depressions. Therefore, a space for mounting the component C can be easily ensured between the detector body 80C and the substrate 100C, so that the accommodation characteristic of the component C can be improved. In addition, for example, it is possible to inhibit detection light entering the detector body 80C from being reflected toward the light receiving unit by the first detection space side depression, the second detection space side depression 87bC, and the third detection space side depression 87cC among the depressions. Therefore, it is possible to avoid the excessive increase in quantity of received light of the light receiving unit even though a detection target is not detected, and it is possible to maintain detection accuracy of the fire detection apparatus 1C.

In addition, since the predetermined portion includes a portion on the substrate 100C side in a portion of the detector body 80C, and the first substrate side depression 86aC, the second substrate side depression 86bC, the third substrate side depression 86cC, the fourth substrate side depression 86dC, and the fifth substrate side depression 86eC are formed such that at least a part of the component C can be accommodated inside these depressions, it is possible to form a space for mounting the component C in the portion of the detector body 80C on the substrate 100C side, and it becomes easier to ensure the space.

In addition, since the predetermined portion includes a portion facing the component C in the portion on the substrate 100C side, it is possible to effectively form a space for mounting the component C, and the space can be made compact.

In addition, since the predetermined portion includes a portion on the detection space 60C side in the portion of the detector body 80C, and the first detection space side depression 87aC, the second detection space side depression 87bC, and the third detection space side depression 87cC are formed such that detection light entering the portion on the detection space 60C side can be inhibited from being reflected toward the light receiving unit, it is possible to inhibit detection light entering the side surface of the detector body 80C on the detection space 60C side from being reflected toward the light receiving unit, and it is possible to further avoid an excessive increase in quantity of received light of the light receiving unit.

Embodiment 4

Next, a fire detection apparatus according to Embodiment 4 will be described. Embodiment 4 corresponds to a mode in which a first incidence suppression unit described below and a second incidence suppression unit described below are configured such that ambient light can be reflected a plurality of times with respect to the first incidence suppression unit described below or the second incidence suppression unit described below when the ambient light enters a detection space through an inflow space described below and an opening described below.

(Configuration)

First, a description will be given of a configuration of the fire detection apparatus according to Embodiment 4. FIG. 25 is a side view illustrating an attachment situation of the fire detection apparatus according to Embodiment 4. FIG. 26 is a bottom view illustrating the fire detection apparatus in a state of removing an attachment base described below. FIG. 27 is a cross-sectional view taken along A-A line of FIG. 26. In the following description, an X direction of FIG. 25 is referred to as a left-right direction of the fire detection apparatus (a +X direction is a left direction of the fire detection apparatus and a −X direction is a right direction of the fire detection apparatus), a Y direction of FIG. 26 is referred to as a front-back direction of the fire detection apparatus (a +Y direction is a frontward direction of the fire detection apparatus and a −Y direction is a backward direction of the fire detection apparatus), and a Z direction of FIG. 25 is referred to as a vertical direction of the fire detection apparatus (a +Z direction is an upward direction of the fire detection apparatus and a −Z direction is a downward direction of the fire detection apparatus). In addition, with reference to a center position of the detection space of FIG. 27 described below, a direction away from the detection space described below is referred to as an "outer side", and a direction approaching the detection space described below is referred to as an "inner side".

The fire detection apparatus 1D is an apparatus that detects and reports a detection target (for example, smoke, etc.) contained in gas. The fire detection apparatus 1D is installed on an installation surface 2D on a lower surface of a ceiling portion of a building in an interior of the building, and includes an attachment base 10D, an outer cover 20D, an inner cover 30D, an inflow space 40D, an insect screen 50D, a detection space 60D, a detector cover 70D, a detector body 80D, a terminal board 90D, and a substrate 100D as illustrated in FIG. 25 to FIG. 27.

(Configuration—Attachment Base)

Returning to FIG. 25, the attachment base 10D is an attaching unit that attaches the outer cover 20D to the installation surface 2D. The attachment base 10D is configured using, for example, a known attachment base for the fire detection apparatus (as an example, a substantially plate-shaped attachment base made of resin), etc., and is fixed to the installation surface 2D by a fixing tool, etc. as illustrated in FIG. 25.

(Configuration—Outer Cover)

The outer cover 20D is an incidence suppression unit that suppresses incidence of ambient light into the detection space 60D, and is a cover that covers the inner cover 30D, the inflow space 40D, the insect screen 50D, the detection space 60D, the detector cover 70D, the detector body 80D, the terminal board 90D, and the substrate 100D. Here, for example, the "ambient light" is light other than first detection light described below and second detection light described below in light entering the detection space 60D, and specifically corresponds to sunlight, light of a lighting apparatus, etc. The outer cover 20D is formed of, for example, a resin material having a light shielding property, and includes an outer cover body 21D, a top surface portion 22D, a first rib portion 23D, and a second rib portion 24D as illustrated in FIG. 25 to FIG. 27.

Among these portions, the outer cover body 21D is a basic structure of the outer cover 20D. The outer cover body 21D is formed from, for example, a substantially hollow cylindrical body whose upper surface and lower surface are open, is disposed so that an upper end portion of the outer cover body 21D comes into contact with a lower surface of the attachment base 10D as illustrated in FIG. 25, and is fixed to the attachment base 10D by a fitting structure (or a fixing tool), etc.

In addition, the top surface portion 22D is a partition unit that partitions the inflow space 40D. The top surface portion 22D is formed from, for example, a substantially circular plate-shaped body, and is provided substantially horizontally below the outer cover body 21D as illustrated in FIG. 25 to FIG. 27. In addition, as illustrated in FIG. 26, a display hole 22aD is provided in the top surface portion 22D. The display hole 22aD is a through-hole for guiding light irradiated from a display unit described below to the outside of the fire detection apparatus 1D through a light guide 104aD and the display hole 22aD of FIG. 26.

In addition, the first rib portion 23D and the second rib 24D are ribs for partitioning the inflow space 40D. Each of the first rib portion 23D and the second rib 24D is formed from a substantially plate-shaped body. As illustrated in FIG. 27, a plurality of first rib portions 23D and second rib portions 24D are disposed between the outer cover body 21D and the top surface portion 22D and connected to the outer cover body 21D or the top surface portion 22D. The "outer cover 20D" corresponds to a "second incidence suppression unit" in the claims.

(Configuration—Inflow Space)

Returning to FIG. 25, the inflow space 40D is a space for allowing gas on the outside of the fire detection apparatus 1D to flow into the fire detection apparatus 1D. A plurality of inflow spaces 40D is formed inside the outer cover 20D. Specifically, as illustrated in FIG. 25 and FIG. 27, a space surrounded by the top surface portion 22D, the first rib portion 23D, the second rib portion 24D, and the inner cover 30D in an internal space of the outer cover 20D is formed as the inflow space 40D.

(Configuration—Inner Cover)

The inner cover 30D is an incidence suppression unit that suppresses incidence of ambient light into the detection space 60D, and is a cover for covering the detection space 60D, the detector cover 70D, the detector body 80D, and the substrate 100D and partitioning the inflow space 40D. The inner cover 30D is, for example, a substantially hollow cylindrical body whose upper surface is open, is formed of a resin material having a light shielding property, and is provided so that a lower side portion of the inner cover 30D faces the top surface portion 22D of the outer cover 20D through the inflow space 40D on the inside of the outer cover 20D as illustrated in FIG. 27. In addition, as illustrated in FIG. 27, a first opening 30aD is formed in the lower side portion of the inner cover 30D. The first opening 30aD is an opening for sending gas flowing into the inflow space 40D to the detection space 60D (that is, an opening for flowing into the inner cover 30D). The first opening 30aD is formed to be smaller than a planar shape of the top surface portion 22D and provided at a substantially central portion and the vicinity thereof in the lower side portion of the inner cover 30D as illustrated in FIG. 27. The "inner cover 30D" corresponds to a "first incidence suppression unit" in the claims, and the "first opening 30aD" corresponds to an "opening" in the claims.

(Configuration—Detection Space)

The detection space 60D is a space for detecting a detection target. As illustrated in FIG. 27, a space surrounded by the detector cover 70D and the detector body 80D in an internal space of the inner cover 30D is formed as the detection space 60D.

(Configuration—Detector Cover)

The detector cover 70D is a partition unit that partitions the detection space 60D, and is incidence a suppression unit that suppresses incidence of ambient light into the detection space 60D. The detector cover 70D is a substantially hollow cylindrical body whose upper surface is open, and is formed of a resin material having a light shielding property. In addition, as illustrated in FIG. 27, the detector cover 70D is disposed so that a lower side portion of the detector cover 70D faces the top surface portion 22D of the outer cover 20D through the first opening 30aD and the inflow space 40D on the inside of the inner cover 30D, and is fixed to the detector body 80D. In addition, as illustrated in FIG. 27, a second opening 70aD is formed in the lower side portion of the detector cover 70D. The second opening 70aD is an opening for allowing gas sent from the first opening 30aD to flow into the detection space 60D, and is provided at a portion corresponding to the first opening 30aD in the lower side portion of the detector cover 70D as illustrated in FIG. 27.

(Configuration—Insect Screen)

The insect screen 50D is a net for preventing insects present outside the fire detection apparatus 1D from intruding into the detection space 60D. The insect screen 50D is configured using a mesh-like and circular net, and is attached to the detector cover 70D as illustrated in FIG. 27.

(Configuration—Detector Body)

The detector body 80D is an attaching unit that attaches the detector cover 70D, and is an incidence suppression unit that suppresses incidence of ambient light into the detection space 60D. The detector body 80D is, for example, a thick plate-shaped body (as an example, a substantially circular plate-shaped body) formed of a resin material having a light shielding property, is closer to the substrate 100D (in FIG. 27, upper side) than the detector cover 70D, is specifically disposed to cover an upper surface of the detector cover 70D as illustrated in FIG. 27, and is fixed to the substrate 100D by a fixing tool, etc.

(Configuration—Terminal Board)

Returning to FIG. 27, the terminal board 90D is an accommodation unit that accommodates the inner cover 30D, the detector cover 70D, the detector body 80D, and the substrate 100D. The terminal board 90D has a substantially hollow cylindrical shape whose lower surface is open, and is formed of, for example, a resin material having a light shielding property. In addition, as illustrated in FIG. 27, the terminal board 90D is provided to cover the inner cover 30D, the detector cover 70D, the detector body 80D, and the substrate 100D from above, is fixed to the outer cover 20D by a fitting structure, etc., and is fixed to the attachment base 10D by a fixing tool, etc. through a first attachment hole (not illustrated) formed in an attachment member 91D.

(Configuration—Substrate)

The substrate 100D is a mounting unit on which various electric circuits (not illustrated) are mounted. The substrate 100D is configured using, for example, a known flat plate-shaped circuit board, etc., is disposed substantially horizontally at an interval from an upper end portion and a lower end portion of the terminal board 90D in the terminal board 90D as illustrated in FIG. 27, and is fixed to the terminal board 90D by a fixing tool through an attachment hole (not illustrated) formed in the terminal board 90D and a second attachment hole (not illustrated) formed in the attachment member 91D.

Further, in addition to the fact that a known component (electric component) used for the conventional fire detection apparatus 1D is mounted on the substrate 100D, a first light emitting unit, a second light emitting unit, a light receiving unit, a display unit, a communication unit, a power supply unit, a control unit, and a storage unit (all of which are not illustrated) are mounted on the substrate 100D.

(Configuration—Substrate—First Light Emitting Unit, Second Light Emitting Unit, and Light Receiving Unit)

Among these units, the first light emitting unit is a light emitting unit that irradiates the detection space 60D with detection light (hereinafter referred to as "first detection light"), and is configured using, for example, a known light emitting element (as an example, an infrared LED, etc.). In addition, the second light emitting unit is a light emitting unit that irradiates the detection space 60D with detection light (hereinafter referred to as "second detection light") having a different wavelength from that of the first detection light, and is configured using, for example, a known light emitting element (as an example, an blue LED, etc.). In addition, the light receiving unit is a light receiving unit that receives scattered light of the first detection light irradiated from the first light emitting unit due to smoke, outputs a first light receiving signal according to the received scattered light, receives scattered light of the second detection light irradiated from the second light emitting unit with respect to smoke, and outputs a second light receiving signal according to the received scattered light, and is configured using, for example, a known light receiving element (as an example, a photodiode, etc.). In addition, a method of installing the first light emitting unit, the second light emitting unit, and the light receiving unit is arbitrary. In Embodiment 4, installation is performed to be able to avoid direct reception of the first detection light or the second detection light irradiated from the first light emitting unit or the second light emitting unit through various prism lens portions described below. For example, the first light emitting unit and the light receiving unit are installed at a position at which an angle between an optical axis of the first light emitting unit (hereinafter referred to as a "first light emitting-side optical axis") and an optical axis of the light receiving unit (hereinafter referred to as a "light receiving-side optical axis") is about 135°. In addition, the second light emitting unit and the light receiving unit are installed at a position at which an angle between an optical axis of the second light emitting unit (hereinafter referred to as a "second light emitting-side optical axis") and the light receiving-side optical axis is about 90°.

(Configuration—Substrate—Display Unit, Communication Unit, and Power Supply Unit)

In addition, the display unit is a display unit that displays designated information (for example, information indicating the presence or absence of detection of a fire) by irradiating light (hereinafter, referred to as "display light") toward the outside of the fire detection apparatus 1D, and is configured using, for example, a known display unit (an LED, etc.). In addition, a light projection method of the display unit is arbitrary. Examples thereof include light projection by guiding display light from the display unit toward the outside of the fire detection apparatus 1D through the light guide 104aD inserted into insertion holes (not illustrated) provided in each of the detector cover 70D, the detector body 80D, and the inner cover 30D and the display hole 22aD of the outer cover 20D described below. In addition, the communication unit is a communication unit that communicates with an external apparatus (for example, a receiver, etc.). In addition, the power supply unit is a power supply unit that supplies power supplied from a commercial power supply or a battery (not illustrated) to each unit of the fire detection apparatus 1D.

(Configuration—Substrate—Control Unit and Storage Unit)

In addition, the control unit is a control unit that controls the fire detection apparatus 1D. Specifically, the control unit is a computer including a CPU and an internal memory such as a RAM for storing various programs (including a basic control program such as the OS and an application program activated on the OS to realize a specific function) to be interpreted and executed on the CPU, a program, and various data. In addition, the storage unit is a storage unit that stores programs and various data necessary for an operation of the fire detection apparatus 1D. The storage unit is configured using a rewritable recording medium. For example, a non-volatile recording medium such as a flash memory can be used.

(Configuration—Details of Configuration of Detector Body)

Next, details of a configuration of the detector body 80D will be described. FIG. 28 is a bottom view illustrating the detector body 80D. However, the detector body 80D can be manufactured in an arbitrary shape using an arbitrary method and material, unless otherwise specified.

In Embodiment 4, as illustrated in FIG. 28, a first prism lens portion 81aD, a second prism lens portion 81bD, a third prism lens portion 81cD, and a chamber portion 82D are provided in the detector body 80D.

(Configuration—Details of Configuration of Detector Body—First Prism Lens Portion, Second Prism Lens Portion, and Third Prism Lens Portion)

The first prism lens portion 81aD is used to change an orientation of the first detection light of the first light emitting unit so that the first detection light enters the detection space 60D (specifically, change the orientation of the first detection light so that the orientation is substantially parallel to a side surface of the detector body 80D on the detection space 60D side). The first prism lens portion 81aD is configured using, for example, a known prism lens (this description is similarly applied to the second prism lens portion 81bD and the third prism lens portion 81cD), and is provided in a first chamber portion 83D described below as illustrated in FIG. 28. In addition, the second prism lens portion 81bD changes an orientation of the second detection light of the second light emitting unit so that the second detection light enters the detection space 60D, and is provided in a second chamber portion 84D described below as illustrated in FIG. 28. In addition, the third prism lens portion 81cD changes an orientation of scattered light received from the detection space 60D so that the scattered light enters the light receiving unit, and is provided in a third chamber portion 85D described below as illustrated in FIG. 28.

(Configuration—Details of Configuration of Detector Body—Chamber Portion)

Returning to FIG. 27, the chamber portion 82D is used to support the first prism lens portion 81aD, the second prism lens portion 81bD, the third prism lens portion 81cD, and the detector cover 70D. As illustrated in FIG. 27 and FIG. 28, the chamber portion 82D is provided on a lower surface of the detector body 80D and includes the first chamber portion 83D, the second chamber portion 84D, and the third chamber portion 85D.

Among these portions, the first chamber portion 83D supports the first prism lens portion 81aD and a part of the detector cover 70D, is formed from, for example, a hollow body whose upper surface and lower surface are open (this description is similarly applied to the second chamber portion 84D and the third chamber portion 85D), and is provided at a position corresponding to the first light emitting unit as illustrated in FIG. 28. In addition, as illustrated in FIG. 28, a first incidence port (not illustrated) for allowing first detection light irradiated from the first light emitting unit to enter the prism lens portion 81aD and a first insertion port 83bD for allowing first detection light whose orientation is changed by the first prism lens portion 81aD to enter the detection space 60D by insertion are provided in the first chamber portion 83D.

In addition, the second chamber portion 84D supports the second prism lens portion 81bD and the other part of the detector cover 70D, and is provided at a position corresponding to the second light emitting unit as illustrated in FIG. 28. In addition, as illustrated in FIG. 28, a second incidence port (not illustrated) for allowing second detection light irradiated from the second light emitting unit to enter the second prism lens portion 81bD and a second insertion port 84bD for allowing second detection light whose orientation is changed by the second prism lens portion 81bD to enter the detection space 60D by insertion are provided in the second chamber portion 84D.

In addition, the third chamber portion 85D supports the third prism lens portion 81cD and the other part of the detector cover 70D, and is provided at a position corresponding to the light receiving unit as illustrated in FIG. 28. In addition, as illustrated in FIG. 28, a third insertion port 85aD for allowing scattered light from the detection space 60D to enter the third prism lens portion 81cD by insertion and a third incidence port (not illustrated) for allowing scattered light whose orientation is changed by the third prism lens portion 81cD to enter the light receiving unit are provided in the third chamber portion 85D.

In addition, a method of forming the chamber portion 82D is arbitrary. For example, the chamber portion 82D and the detector body 80D may be integrally formed by injection-molding a resin material having a light shielding property.

In addition, a method of attaching the first prism lens portion 81aD, the second prism lens portion 81bD, the third prism lens portion 81cD, and the detector cover 70D is arbitrary. For example, after vertically inserting the first prism lens portion 81aD to the third prism lens portion 81cD into the first chamber portion 83D to the third chamber portion 85D, respectively, a part of an upper portion of the detector cover 70D is attached to the first chamber portion 83D to the third chamber portion 85D by fitting.

(Configuration—Incidence Suppressing Structure)

Next, a description will be given of an incidence suppressing structure of the fire detection apparatus 1D. FIG. 29 is a diagram illustrating a situation in which ambient light enters the detection space 60D from the outside of the fire detection apparatus 1D through the inflow space 40D and is a diagram illustrating an area corresponding to FIG. 27. In FIG. 29, ambient lights L1D and L2 described below are indicated by imaginary lines. In Embodiment 4, features of the incidence suppressing structure for suppressing direct incidence of ambient light into the detection space 60D is described below.

(Configuration—Incidence Suppressing Structure—First Feature)

First, with regard to a first feature of the incidence suppressing structure, at least the outer cover 20D and the inner cover 30D are configured by partitioning the inflow space 40D and the detection space 60D such that gas from the outside of the fire detection apparatus 1D can flow into the detection space 60D through the inflow space 40D and ambient light from the outside of the fire detection apparatus 1D can be inhibited from directly entering the detection space 60D through the inflow space 40D. Specifically, as illustrated in FIG. 29, the outer cover 20D and the inner cover 30D are configured such that the ambient lights L1D and L2 can be reflected a plurality of times with respect to the outer cover 20D or the inner cover 30D when the ambient lights L1D and L2 enter the detection space 60D through the inflow space 40D and the first opening 30aD. Here, the ambient light L1D illustrated on a left side of FIG. 29 is described as being reflected by the outer cover 20D and the inner cover 30D and entering the detection space 60D, and the ambient light L2D illustrated on a right side of FIG. 29 is described as being reflected by the outer cover 20D and the inner cover 30D and exiting to the outside of the fire detection apparatus 1D. However, the invention is not limited thereto, and it is possible to adopt ambient light having a predetermined incidence angle different from incidence angles of the ambient lights L1D and L2. Further, in Embodiment 4, the outer cover 20D and the inner cover 30D are configured such that these ambient lights can be reflected a plurality of times with respect to the outer cover 20D or the inner cover 30D.

In this case, a specific configuration of the outer cover 20D is arbitrary and as below in Embodiment 4. In more detail, first, in a configuration of the top surface portion 22D, a size of the planar shape of the top surface portion 22D is set to a length in which ambient light entering the inflow space 40D at a predetermined angle can be reflected a plurality of times by the top surface portion 22D. For example, the size is set to be slightly smaller than a size of a planar shape of the outer cover body 21D. In addition, with regard to a method of installing the top surface portion 22D, the top surface portion 22D is installed with a gap from the lower side portion of the inner cover 30D such that the top surface portion 22D is installed at a position corresponding to a lower opening end of the outer cover body 21D and gas having a predetermined amount can flow into the detection space 60D through the inflow space 40D from the outside of the fire detection apparatus 1D. For example, a length of this gap may be set on the basis of an experimental result, etc. (this description is similarly applied to a length of a gap between first rib portions 23D described below).

In addition, configurations of the first rib portion 23D and the second rib portion 24D are as follows.

In more detail, first, as illustrated in FIG. 27 and FIG. 29, each of the first rib portion 23D and the second rib portion 24D is disposed along a direction orthogonal to the installation surface 2D (in the figure, the vertical direction) in the inflow space 40D. According to such a configuration, when ambient light enters the detection space 60D through the inflow space 40D, it is possible to reflect the ambient light a plurality of times with respect to the first rib portion 23D and the second rib portion 24D, and it is possible to attenuate the ambient light entering the detection space 60D. In particular, ambient light entering in a direction substantially parallel to the installation surface 2D can be prevented from entering the first opening 30aD by being reflected a plurality of times.

In addition, the first rib portion 23D and the second rib portion 24D are configured such that inflow of gas flowing into the inflow space 40D into the first opening 30aD is not hindered by the first rib portion 23D and the second rib portion 24D. Specifically, the first rib portions 23D and the second rib portions 24D are radially disposed from the vicinity of a center of the inner cover 30D. In this case, at least one of the first rib portions 23D and the second rib portions 24D may be disposed with an interval therebetween or disposed to come into contact with each other. In Embodiment 4, the first rib portions 23D are disposed with an interval therebetween, and the second rib portions 24D are disposed to come into contact with each other (specifically, end portions of the second rib portions 24D on the first opening 30aD side are disposed to come into contact with each other). In addition, a size of the second rib portion 24D is set to a size that allows ambient light entering the inflow space 40D at the predetermined angle can be reflected by the second rib portion 24D. For example, as illustrated in FIG. 29, a vertical length of the second rib portion 24D is set to a length in which a distal end portion of the second rib portion 24D is located near the first opening 30aD. In addition, a length of the second rib portion 24D in the front-back direction is set to be shorter than a diameter of the top surface portion 22D. In addition, it is desirable that a thickness of the second rib portion 24D is set to be as thin as possible so as not to narrow the first opening 30aD. According to the above-described configuration, it is possible to ensure an inflow property of gas flowing into the inflow space 40D into the first opening 30aD, and it becomes easy to maintain detection accuracy of the fire detection apparatus 1D.

In addition, a specific configuration of the inner cover 30D is arbitrary and as below in Embodiment 4. In more detail, first, a shape and a size of the lower side portion of the inner cover 30D are set such that ambient light entering the inflow space 40D at the predetermined angle can be reflected a plurality of times by the lower side portion of the inner cover 30D. For example, a size of a planar shape of the lower side portion of the inner cover 30D is set to a size substantially equal to the size of the planar shape of the top surface portion 22D. In addition, as illustrated in FIG. 29, a shape of a side surface of the lower side portion of the inner cover 30D is set to an inclined shape in which at least a part of the lower side portion of the inner cover 30D (in FIG. 29, a portion corresponding to an outer side portion of the inflow space 40D described below in the lower side portion of the inner cover 30D) is inclined upward as approaching an outer side of the inner cover 30D. In addition, with regard to a method of installing the inner cover 30D, the inner cover 30D is installed at a position at which ambient light entering the inflow space 40D at the predetermined angle can be reflected a plurality of times by the lower side portion of the inner cover 30D and the top surface portion 22D. For example, as illustrated in FIG. 29, the inner cover 30D is installed at a position at which the entire lower side portion of the inner cover 30D substantially overlaps the top surface portion 22D when viewed in the planar direction.

According to the first feature described above, when compared to a conventional technology (a technology in which the detection space and the inflow space are arranged in parallel along the installation surface), it is possible to inhibit ambient light from directly entering the detection space 60D through the inflow space 40D while allowing gas to reliably flow into the detection space 60D, and it is possible to maintain detection accuracy of the fire detection apparatus 1D. In addition, when ambient light enters the detection space 60D through the inflow space 40D, the ambient light can be reflected a plurality of times with respect to the inner cover 30D (specifically, the lower side portion of the inner cover 30D) or the outer cover 20D (specifically, the top surface portion 22D and the second rib portion 24D). Therefore, it is possible to effectively attenuate ambient light entering the detection space 60D, and it becomes easy to maintain an inflow property of gas and detection accuracy of the fire detection apparatus 1D.

(Configuration—Incidence Suppressing Structure—Second Feature)

Returning to FIG. 27, next, with regard to a second feature of the incidence suppressing structure, the inner cover 30D and the outer cover 20D are configured such that a length in a direction (vertical direction) orthogonal to the installation surface 2D in the inner side portion of the inflow space 40D is uniform, and a length in the direction orthogonal to the installation surface 2D in the outer side portion of the inflow space 40D increases as approaching an outer side. Here, in Embodiment 4, the "inner side portion of the inflow space 40D" is described as a portion from a central portion in a portion of the inflow space 4D to a portion located on an outer side of an outer edge of the first opening 30aD (in FIG. 27, a portion corresponding to a portion on a slightly outer side of a middle portion between a central portion and an outer edge of the top surface portion 22D). In addition, in Embodiment 4, the "outer side portion of the inflow space 40D" is described as a portion from a portion located on the outer side of the outer edge of the first opening 30aD in the portion of the inflow space 4D to the outer edge.

Specifically, as illustrated in FIG. 27, the top surface portion 22D of the outer cover 20D is formed from a flat plate-shape body. In addition, a portion corresponding to the inner side portion of the inflow space 40D in the lower side portion of the inner cover 30D is formed in a flat shape and parallel to the top surface portion 22D. In addition, as described above, the outer side portion of the inflow space 40D in the lower side portion of the inner cover 30D is formed in the inclined shape inclined upward as approaching the outer side of the inner cover 30D. In this case, the first opening 30aD is disposed such that the entire first opening 30aD faces the inner side portion of the inflow space 40D and disposed parallel to a portion corresponding to the inner side portion of the inflow space 40D in the top surface portion 22D and the lower side portion of the inner cover 30D.

According to such a second feature, when compared to a case in which a length in the direction orthogonal to the installation surface 2D in the inner side portion of the inflow space 40D decreases as approaching an inner side, an inflow property of gas into the first opening 30aD is easily ensured. In addition, when compared to a case in which the length in the direction orthogonal to the installation surface 2D in the inner side portion of the inflow space 40D increases as approaching the inner side, ambient light can be inhibited from directly entering the detection space 60D through the inflow space 40D and the first opening 30aD. Therefore, it becomes easier to maintain the inflow property of gas and the detection accuracy of the fire detection apparatus 1D.

(Configuration—Light Reception Suppressing Structure)

Next, a light reception suppressing structure of the fire detection apparatus 1D will be described. FIG. 30 is an enlarged view of an area of a light reception suppressing portion 110D of FIG. 28 described below. In FIG. 30, a light receiving-side optical axis LL is indicated by an imaginary line. In Embodiment 4, a feature of the light reception suppressing structure for inhibiting ambient light entering the detection space 60D from being received by the light receiving unit described below.

That is, as illustrated in FIG. 30, the light reception suppressing portion 110D is provided inside the inner cover 30D. Here, the light reception suppressing unit 110D is a light reception suppressing unit that inhibits ambient light entering the detection space 60D from being received by the light receiving unit. As illustrated in FIG. 28 and FIG. 30, the light reception suppressing portion 110D is provided in the third chamber portion (specifically, an inner side portion of the third prism lens portion 81cD in the third chamber portion), and includes a first light shielding rib 111D, a second light shielding rib 112D, and a third light shielding rib 113D.

Among these light shielding ribs, the first light shielding rib 111D, the second light shielding rib 112D, and the third light shielding rib 113D are ribs for configuring the light reception suppressing portion 110D. As illustrated in FIG. 30, the first light shielding rib 111D, the second light shielding rib 112D, and the third light shielding rib 113D are formed from a substantially concave body having the third insertion port 85aD substantially orthogonal to the light receiving-side optical axis LL, and arranged in parallel with an interval therebetween along incidence direction (that is, an axial direction of the light receiving-side optical axis LL) of scattered light (first detection light or second detection light). Specifically, the first light shielding rib 111D, the second light shielding rib 112D, and the third light shielding rib 113D are arranged in parallel in this order from a front side to a rear side in the incidence direction. In Embodiment 4, a length of the interval is set to a length in which ambient light having a predetermined incidence angle can be inhibited from being received by the light receiving unit by the first light shielding rib 111D, the second light shielding rib 112D, and the third light shielding rib 113D, and is set on the basis of, for example, an experimental result, etc. The "third insertion port 85aD" corresponds to an "insertion port" in the claims.

In addition, specific configurations of the third insertion ports 85aD of the first light shielding rib 111D, the second light shielding rib 112D, and the third light shielding rib 113D are arbitrary. In Embodiment 4, the portions are set to be smaller toward a front side in the incidence direction. In more detail, the third insertion port 85aD of the second light shielding rib 112D is set to be smaller than the third insertion port 85aD of the third light shielding rib 113D, and the third insertion port 85aD of the first light shielding rib 111D is set to be smaller than the third insertion opening 85aD of the second light shielding rib 112D. In this way, when compared to a case in which the third insertion ports 85aD of the first light shielding rib 111D, the second light shielding rib 112D, and the third light shielding rib 113D are set to be larger toward the front side in the incidence direction, it is possible to inhibit detection light entering through the third insertion port 85aD from exiting to the outside through the third insertion port 85aD, and it becomes easier to maintain detection accuracy of fire detection apparatus 1D.

In addition, a method of forming the light reception suppressing portion 110D is arbitrary. For example, the light reception suppressing portion 110D and the detector body 80D may be integrally formed by injection-molding a resin material having a light shielding property. However, the invention is not limited thereto. For example, the light reception suppressing portion 110D may be fixed to the detector body 80D by a fixing tool, etc. after separately forming the light reception suppressing portion 110D and the detector body 80D.

According to such a light reception suppressing structure, the light reception suppressing portion 110D can inhibit ambient light entering the detection space 60D from being received by the light receiving unit, and it becomes easier to maintain detection accuracy of the fire detection apparatus 1D.

(With Regard to Action of Fire Detection Apparatus)

Returning to FIG. 29, next, a description will be given of an action of the fire detection apparatus 1D configured as described above. The action of the fire detection apparatus 1D is roughly divided into an action corresponding to ambient light (hereinafter referred to as an "ambient light action") and an action corresponding to gas on the outside of the fire detection apparatus 1D (hereinafter referred to as a "gas action"). Hereinafter, each of the ambient light action and the gas action will be described.

(With Regard to Action of Fire Detection Apparatus—Ambient Light Action)

First, the ambient light action will be described.

In more detail, for example, when the ambient lights L1D and L2 attempt to enter the detection space 60D through the inflow space 40D in a state in which the fire detection apparatus 1D is attached to the installation surface 2D, as illustrated in FIG. 29, the ambient lights L1D and L2 are reflected a plurality of times by the inner cover 30D (specifically, the lower side portion of the inner cover 30D) or the outer cover 20D (specifically, the top surface portion 22D and the second rib portion 24D). In this way, the ambient lights L1D and L2 are inhibited from directly entering the detection space 60D, and thus it is possible to maintain detection accuracy of the fire detection apparatus 1D when compared to a conventional technology (a technology in which the detection space and the inflow space are arranged in parallel along the installation surface). In addition, even when the ambient light L1D reflected a plurality of times flows into the detection space 60D, the ambient light L1D is attenuated by the reflection. Thus, even when the ambient light L1D is received by the light receiving unit, an influence on the detection accuracy of the fire detection apparatus 1D can be reduced.

In addition, for example, even when ambient light not reflected by the inner cover 30D or the outer cover 20D (or the ambient light reflected a plurality of times) flows into the detection space 60D, the ambient light is inhibited from entering the light receiving unit by the light reception suppressing portion 11D (specifically, the first light shielding rib 111D, the second light shielding rib 112D, and the third light shielding rib 113D). Thus, it becomes easy to maintain the detection accuracy of the fire detection apparatus 1D.

(With Regard to Action of Fire Detection Apparatus—Gas Action)

Next, the gas action will be described.

In more detail, for example, when gas on the outside of the fire detection apparatus 1D attempts to enter the detection space 60D through the inflow space 40D in the state in which the fire detection apparatus 1D is attached to the installation surface 2D, a predetermined amount of gas flows into the detection space 60D through the inflow space 40D, the first opening 30aD, and the second opening 70aD surrounded by the inner cover 30D (specifically, the lower side portion of the inner cover 30D) and the outer cover 20D (specifically, the top surface portion 22D, the first rib portion 23D, and the second rib portion 24D). In this way, similarly to the conventional technology, it is possible to maintain the inflow property of gas into the detection space 60D.

Effect of Embodiment 4

As described above, according to Embodiment 4, since the detection space 60D used to detect a detection target and provided at a position on the installation surface 2D side of the inflow space 40D on the inside of the fire detection apparatus 1D, and the incidence suppression unit which is used to inhibit ambient light from entering the detection space 60D from the outside of the fire detection apparatus 1D and partitions the inflow space 40D and the detection space 60D such that gas can flow into the detection space 60D through the inflow space 40D and ambient light can be inhibited from directly entering the detection space 60D through the inflow space 40D are included, when compared to the conventional technology (the technology in which the detection space and the inflow space are arranged in parallel along the installation surface), it is possible to inhibit ambient light from directly entering the detection space 60D through the inflow space 40D while allowing gas to reliably flow into the detection space 60D, and it is possible to maintain the inflow property of gas and the detection accuracy of the fire detection apparatus 1D. In addition, since the inner cover 30D and the outer cover 20D are configured such that ambient light can be reflected a plurality of times with respect to the inner cover 30D or the outer cover 20D when the ambient light enters the detection space 60D through the inflow space 40D and the first opening 30aD, the ambient light can be reflected a plurality of times with respect to the inner cover 30D or the outer cover 20D when the ambient light enters the detection space 60D through the inflow space 40D. Therefore, it is possible to effectively attenuate ambient light entering the detection space 60D, and it becomes easy to maintain the detection accuracy of the fire detection apparatus 1D.

In addition, since the first rib portion 23D and the second rib portion 24D which are provided on the outer cover 20D, have plate shapes, and are respectively disposed along the direction orthogonal to the installation surface 2D in the inflow space 40D are included, ambient light can be reflected a plurality of times with respect to the first rib portion 23D and the second rib portion 24D when the ambient light enters the detection space 60D through inflow space 40D, and the ambient light entering the detection space 60D can be attenuated. In particular, ambient light entering in a direction substantially parallel to the installation surface 2D can be prevented from being reflected a plurality of times and entering the first opening 30aD. In addition, since the first rib portion 23D and the second rib portion 24D are configured such that an inflow of gas flowing into the inflow space 40D into the first opening 30aD is not hindered by the first rib portion 23D and the second rib portion 24D, it is possible to ensure an inflow property of gas flowing into the inflow space 40D into the first opening 30aD, and it becomes easier to maintain detection accuracy of the fire detection apparatus 1D.

In addition, since the first opening 30aD is disposed such that the entire first opening 30aD faces the inner side portion of the inflow space 40D, and the inner cover 30D and the outer cover 20D are configured such that the length of the inflow space 40D in the direction orthogonal to the installation surface 2D in the inner side portion becomes uniform and the length of the inflow space 40D in the direction orthogonal to the installation surface 2D in the outer side portion increases toward the outer side, when compared to a case in which the length of the inflow space 40D in the direction orthogonal to the installation surface 2D in the inner side portion decreases toward the inner side, it becomes easy to ensure the inflow property of gas into the first opening 30aD. In addition, when compared to a case in which the length of the inflow space 40D in the direction orthogonal to the installation surface 2D in the inner side portion increases toward the inner side, ambient light is inhibited from directly entering the detection space 60D through the inflow space 40D and the first opening 30aD. Therefore, it becomes easier to maintain the inflow property of gas and the detection accuracy of the fire detection apparatus 1D.

In addition, since the light reception suppressing portion 110D provided inside the inner cover 30D and used to inhibit ambient light entering the detection space 60D from being received by the light receiving unit is included, the light reception suppressing portion 110D can inhibit ambient light entering the detection space 60D from being received by the light receiving unit, and it becomes easier to maintain the detection accuracy of the fire detection apparatus 1D.

In addition, since the third insertion openings 85aD of the first light shielding rib 111D, the second light shielding rib 112D, and the third light shielding rib 113D are decreased toward the front side in the incident direction, when compared to a case in which the third insertion openings 85aD of the first light shielding rib 111D, the second light shielding rib 112D, and the third light shielding rib 113D are increased toward the front side in the incident direction, it is possible to inhibit detection light entering through these third insertion openings 85aD from exiting to the outside through these third insertion openings 85aD, and it becomes easier to maintain the detection accuracy of the fire detection apparatus 1D.

Embodiment 5

Next, a fire detection apparatus according to Embodiment 5 will be described. Embodiment 5 corresponds to a mode of including a first reflecting unit described below and provided in a light shielding area described below and a second reflecting unit described below and provided at a different position from an installation position of the first reflecting unit described below in the light shielding area described below.

(Configuration)

First, a description will be given of a configuration of the fire detection apparatus according to Embodiment 5. FIG. 31 is a side view illustrating an attachment situation of the fire detection apparatus according to Embodiment 5. FIG. 32 is a bottom view illustrating the fire detection apparatus in a state of removing an attachment base described below. FIG. 33 is a cross-sectional view taken along A-A line of FIG. 32. In the following description, an X direction of FIG. 31 is referred to as a left-right direction of the fire detection apparatus (a +X direction is a left direction of the fire detection apparatus and a −X direction is a right direction of the fire detection apparatus), a Y direction of FIG. 32 is referred to as a front-back direction of the fire detection apparatus (a +Y direction is a frontward direction of the fire detection apparatus and a −Y direction is a backward direction of the fire detection apparatus), and a Z direction of FIG. 31 is referred to as a vertical direction of the fire detection apparatus (a +Z direction is an upward direction of the fire detection apparatus and a −Z direction is a downward direction of the fire detection apparatus). In addition, with reference to a center position of a detection space of FIG. 33 described below, a direction away from the detection space described below is referred to as an "outer side", and a direction approaching the detection space described below is referred to as an "inner side".

The fire detection apparatus 1E is an apparatus that detects and reports a detection target (for example, smoke, etc.) contained in gas. The fire detection apparatus 1E is installed on an installation surface 2E (in Embodiment 5, an installation surface parallel to a predetermined optical axis described below) on a lower surface of a ceiling portion of a building in an interior of the building, and includes an attachment base 10E, an outer cover 20E, an inner cover 30E, an inflow space 40E, an insect screen 50E, a detection space 60E, a detector cover 70E, a detector body 80E, a terminal board 90E, and a substrate 100E as illustrated in FIG. 31 to FIG. 33.

(Configuration—Attachment Base)

Returning to FIG. 31, the attachment base 10E is an attaching unit that attaches the outer cover 20E to the installation surface 2E. The attachment base 10E is configured using, for example, a known attachment base for the fire detection apparatus (as an example, a substantially plate-shaped attachment base made of resin), etc., and is fixed to the installation surface 2E by a fixing tool, etc. as illustrated in FIG. 31.

(Configuration—Outer Cover)

The outer cover 20E is a cover that covers the inner cover 30E, the inflow space 40E, the insect screen 50E, the detection space 60E, the detector cover 70E, the detector body 80E, the terminal board 90E, and the substrate 100E. The outer cover 20E is formed of, for example, a resin material having a light shielding property, and includes an outer cover body 21E, a top surface portion 22E, a first rib portion 23E, and a second rib portion 24E as illustrated in FIG. 31 to FIG. 33.

Among these portions, the outer cover body 21E is a basic structure of the outer cover 20E. The outer cover body 21E is formed from, for example, a substantially hollow cylindrical body whose upper surface and lower surface are open, is disposed so that an upper end portion of the outer cover body 21E comes into contact with a lower surface of the attachment base 10E as illustrated in FIG. 31, and is fixed to the attachment base 10E by a fitting structure (or a fixing tool), etc.

In addition, the top surface portion 22E is a partition unit that partitions the inflow space 40E. The top surface portion 22E is formed from, for example, a substantially circular plate-shaped body, and is provided substantially horizontally below the outer cover body 21E as illustrated in FIG. 31 to FIG. 33. In addition, as illustrated in FIG. 32, a display hole 22aE is provided in the top surface portion 22E. The display hole 22aE is a through-hole for guiding light irradiated from a display unit described below to the outside of the fire detection apparatus 1E through a light guide 104aE and the display hole 22aE of FIG. 32.

In addition, the first rib portion 23E is a partition unit that partitions the inflow space 40E. The first rib portion 23E is formed from a substantially plate-shaped body, and vertically provided between the outer cover body 21E and the top surface portion 22E. Specifically, as illustrated in FIG. 31 and FIG. 33, a plurality of first rib portions 23E is radially provided from the vicinity of a center of the outer cover 20E and connected to the outer cover body 21E and the top surface portion 22E.

In addition, the second rib portion 24E is a partition unit that partitions the inflow space 40E. The second rib portion 24E is formed from a substantially plate-shaped body, and vertically provided between the outer cover body 21E and the top surface portion 22E. Specifically, as illustrated in FIG. 31 and FIG. 33, the second rib portion 24E is provided between inner end portions of adjacent first rib portions 23E and connected to the top surface portion 22E.

(Configuration—Inflow Space)

Returning to FIG. 31, the inflow space 40E is a space for allowing gas on the outside of the fire detection apparatus 1E to flow into the fire detection apparatus 1E. A plurality of inflow spaces 40E is formed inside the outer cover 20E. Specifically, as illustrated in FIG. 31 and FIG. 33, a space surrounded by the top surface portion 22E, the first rib portion 23E, the second rib portion 24E, and the inner cover 30E in an internal space of the outer cover 20E is formed as the inflow space 40E.

(Configuration—Inner Cover)

The inner cover 30E is a cover that covers the detection space 60E, the detector cover 70E, the detector body 80E, and the substrate 100E, and is a partition unit that partitions the inflow space 40E. The inner cover 30E is, for example, a substantially hollow cylindrical body whose upper surface is open, is formed of a resin material having a light shielding property, and is provided so that a lower side portion of the inner cover 30E faces the top surface portion 22E of the outer cover 20E through the inflow space 40E on the inside of the outer cover 20E as illustrated in FIG. 33. In addition, as illustrated in FIG. 33, a first opening 30aE is formed in the lower side portion of the inner cover 30E. The first opening 30aE is an opening for sending gas flowing into the inflow space 40E to the detection space 60E, and is provided at a substantially central portion and the vicinity thereof in the lower side portion of the inner cover 30E as illustrated in FIG. 33.

(Configuration—Detection Space)

The detection space 60E is a space for detecting a detection target. As illustrated in FIG. 33, a space surrounded by the detector cover 70E and the detector body 80E in an internal space of the inner cover 30E is formed as the detection space 60E.

(Configuration—Detector Cover)

The detector cover 70E is a partition unit that partitions the detection space 60E, and is an incidence suppression unit that suppresses incidence of ambient light into the detection space 60E. The detector cover 70E is a substantially hollow cylindrical body whose upper surface is open, and is formed of a resin material having a light shielding property. In addition, as illustrated in FIG. 33, the detector cover 70E is disposed so that a lower side portion of the detector cover 70E faces the top surface portion 22E of the outer cover 20E through the first opening 30aE and the inflow space 40E on the inside of the inner cover 30E, and is fixed to the detector body 80E. In addition, as illustrated in FIG. 33, a second opening 70aE is formed in the lower side portion of the detector cover 70E. The second opening 70aE is an opening for allowing gas sent from the first opening 30aE to flow into the detection space 60E, and is provided at a portion corresponding to the first opening 30aE in the lower side portion of the detector cover 70E as illustrated in FIG. 33.

(Configuration—Insect Screen)

The insect screen 50E is a net for preventing insects present outside the fire detection apparatus 1E from intruding into the detection space 60E. The insect screen 50E is configured using a mesh-like and circular net, and is attached to the detector cover 70E as illustrated in FIG. 33.

(Configuration—Detector Body)

The detector body 80E is an attaching unit that attaches the detector cover 70E, and is an incidence suppression unit that suppresses incidence of ambient light into the detection space 60E. The detector body 80E is, for example, a thick plate-shaped body (as an example, a substantially circular plate-shaped body) formed of a resin material having a light shielding property, is provided on the substrate 100E side (in FIG. 33, upper side) of the detector cover 70E, is specifically disposed to cover an upper surface of the detector cover 70E as illustrated in FIG. 33, and is fixed to the substrate 100E by a fixing tool, etc. The "detector cover 70E" and the "detector body 80E" correspond to "light shielding area formation member" in the claims. In addition, an area 80aE surrounded by the "detector cover 70E" and the "detector body 80E" (hereinafter, referred to as a "light shielding area 80aE") corresponds to a "light shielding area" in the claims.

(Configuration—Terminal Board)

Returning to FIG. 33, the terminal board 90E is an accommodation unit that accommodates the inner cover 30E, the detector cover 70E, the detector body 80E, and the substrate 100E. The terminal board 90E has a substantially hollow cylindrical shape whose lower surface is open, and is formed of, for example, a resin material having a light shielding property. In addition, as illustrated in FIG. 33, the terminal board 90E is provided to cover the inner cover 30E, the detector cover 70E, the detector body 80E, and the substrate 100E from above, is fixed to the outer cover 20E by a fitting structure, etc., and is fixed to the attachment base 10E by a fixing tool, etc. through a first attachment hole (not illustrated) formed in an attachment member 91E.

(Configuration—Substrate)

The substrate 100E is a mounting unit on which various electric circuits (not illustrated) are mounted. The substrate 100E is configured using, for example, a known flat plate-shaped circuit board, etc., is disposed substantially horizontally at an interval from an upper end portion and a lower end portion of the terminal board 90E in the terminal board 90E as illustrated in FIG. 33, and is fixed to the terminal board 90E by a fixing tool through an attachment hole (not illustrated) formed in the terminal board 90E and a second attachment hole (not illustrated) formed in the attachment member 91E.

Further, in addition to the fact that a known component (electric component) used for the conventional fire detection apparatus 1E is mounted on the substrate 100E, a first light emitting unit, a second light emitting unit, a light receiving unit, a display unit, a communication unit, a power supply unit, a control unit, and a storage unit (none of which are illustrated) are mounted on the substrate 100E.

(Configuration—Substrate—First Light Emitting Unit, Second Light Emitting Unit, and Light Receiving Unit)

Among these units, the first light emitting unit is a light emitting unit that irradiates the detection space 60E with detection light (hereinafter referred to as "first detection light") along a first light emitting-side optical axis described below, and is configured using, for example, a known light emitting element (as an example, an infrared LED, etc.). In addition, the second light emitting unit is a light emitting unit that irradiates the detection space 60E with detection light (hereinafter referred to as "second detection light")

having a different wavelength from that of the first detection light along a second light emitting-side optical axis described below, and is configured using, for example, a known light emitting element (as an example, an blue LED, etc.). In addition, the light receiving unit is a light receiving unit that receives scattered light of the first detection light irradiated from the first light emitting unit due to smoke, outputs a first light receiving signal according to the received scattered light, receives scattered light of the second detection light irradiated from the second light emitting unit with respect to smoke, and outputs a second light receiving signal according to the received scattered light, and is configured using, for example, a known light receiving element (as an example, a photodiode, etc.). In addition, a method of installing the first light emitting unit, the second light emitting unit, and the light receiving unit is arbitrary. In Embodiment 5, installation is performed to be able to avoid direct reception of the first detection light or the second detection light irradiated from the first light emitting unit or the second light emitting unit through various prism lens portions described below. For example, the first light emitting unit and the light receiving unit are installed at a position at which an angle between an optical axis of the first light emitting unit (hereinafter referred to as a "first light emitting-side optical axis") and an optical axis of the light receiving unit (hereinafter referred to as a "light receiving-side optical axis") is about 135°. In addition, the second light emitting unit and the light receiving unit are installed at a position at which an angle between an optical axis of the second light emitting unit (hereinafter referred to as a "second light emitting-side optical axis") and the light receiving-side optical axis is about 90°.

(Configuration—Substrate—Display Unit, Communication Unit, and Power Supply Unit)

In addition, the display unit is a display unit that displays designated information (for example, information indicating the presence or absence of detection of a fire) by irradiating light (hereinafter, referred to as "display light") toward the outside of the fire detection apparatus 1E, and is configured using, for example, a known display unit (an LED, etc.). A light projection method of the display unit is arbitrary. Examples thereof include light projection by guiding display light from the display unit toward the outside of the fire detection apparatus 1E through the light guide 104aE inserted into insertion holes (not illustrated) provided in each of the detector cover 70E, the detector body 80E, and the inner cover 30E and the display hole 22aE of the outer cover 20E described below. In addition, the communication unit is a communication unit that communicates with an external apparatus (for example, a receiver, etc.). In addition, the power supply unit is a power supply unit that supplies power supplied from a commercial power supply or a battery (not illustrated) to each unit of the fire detection apparatus 1E.

(Configuration—Substrate—Control Unit and Storage Unit)

In addition, the control unit is a control unit that controls the fire detection apparatus 1E. Specifically, the control unit is a computer including a CPU and an internal memory such as a RAM for storing various programs (including a basic control program such as the OS and an application program activated on the OS to realize a specific function) to be interpreted and executed on the CPU, a program, and various data. In addition, the storage unit is a storage unit that stores programs and various data necessary for an operation of the fire detection apparatus 1E. The storage unit is configured using a rewritable recording medium. For example, a non-volatile recording medium such as a flash memory can be used.

(Configuration—Details of Configuration of Detector Body)

Next, details of a configuration of the detector body 80E will be described. FIG. 34 is a bottom view illustrating the detector body 80E. However, the detector body 80E can be manufactured in an arbitrary shape using an arbitrary method and material, unless otherwise specified.

In Embodiment 5, as illustrated in FIG. 34, a first prism lens portion 81aE, a second prism lens portion 81bE, a third prism lens portion 81cE, and a chamber portion 82E are provided in the detector body 80E.

(Configuration—Details of Configuration of Detector Body—First Prism Lens Portion, Second Prism Lens Portion, and Third Prism Lens Portion)

The first prism lens portion 81aE is used to change an orientation of the first detection light of the first light emitting unit so that the first detection light enters the detection space 60E (specifically, change the orientation of the first detection light so that the orientation is substantially parallel to a side surface of the detector body 80E on the detection space 60E side). The first prism lens portion 81aE is configured using, for example, a known prism lens (this description is similarly applied to the second prism lens portion 81bE and the third prism lens portion 81cE), and is provided in a first chamber portion 83E described below as illustrated in FIG. 34. In addition, the second prism lens portion 81bE changes an orientation of the second detection light of the second light emitting unit so that the second detection light enters the detection space 60E, and is provided in a second chamber portion 84E described below as illustrated in FIG. 34. In addition, the third prism lens portion 81cE changes an orientation of scattered light received from the detection space 60E so that the scattered light enters the light receiving unit, and is provided in a third chamber portion 85E described below as illustrated in FIG. 34.

(Configuration—Details of Configuration of Detector Body—Chamber Portion)

Returning to FIG. 33, the chamber portion 82E is used to support the first prism lens portion 81aE, the second prism lens portion 81bE, the third prism lens portion 81cE, and the detector cover 70E. As illustrated in FIG. 33 and FIG. 34, the chamber portion 82E is provided on a lower surface of the detector body 80E and includes the first chamber portion 83E, the second chamber portion 84E, and the third chamber portion 85E.

Among these portions, the first chamber portion 83E supports the first prism lens portion 81aE and a part of the detector cover 70E, is formed from, for example, a hollow body whose upper surface and lower surface are open (this description is similarly applied to the second chamber portion 84E and the third chamber portion 85E), and is provided at a position corresponding to the first light emitting unit as illustrated in FIG. 34. In addition, as illustrated in FIG. 34, a first incidence port (not illustrated) for allowing first detection light irradiated from the first light emitting unit to enter the first prism lens portion 81aE and a first incidence port 83bE for allowing first detection light whose orientation is changed by the first prism lens portion 81aE to enter the detection space 60E are provided in the first chamber portion 83E.

In addition, the second chamber portion 84E supports the second prism lens portion 81bE and the other part of the detector cover 70E, and is provided at a position corresponding to the second light emitting unit as illustrated in FIG. 34. In addition, as illustrated in FIG. 34, a second incidence port (not illustrated) for allowing second detection light irradiated from the second light emitting unit to enter the second prism lens portion 81bE and a second incidence port 84bE for allowing second detection light whose orientation is changed by the second prism lens portion 81bE to enter the detection space 60E are provided in the second chamber portion 84E.

In addition, the third chamber portion 85E supports the third prism lens portion 81cE and the other part of the detector cover 70E, and is provided at a position corresponding to the light receiving unit as illustrated in FIG. 34. In addition, as illustrated in FIG. 34, a third incidence port 85aE for allowing scattered light from the detection space 60E to enter the third prism lens portion 81cE and a third incidence port (not illustrated) for allowing scattered light whose orientation is changed by the third prism lens portion 81cE to enter the light receiving unit are provided in the third chamber portion 85E.

In addition, a method of forming the chamber portion 82E is arbitrary. For example, the chamber portion 82E and the detector body 80E may be integrally formed by injection-molding a resin material having a light shielding property.

In addition, a method of attaching the first prism lens portion 81aE, the second prism lens portion 81bE, the third prism lens portion 81cE, and the detector cover 70E is arbitrary. For example, after vertically inserting the first prism lens portion 81aE to the third prism lens portion 81cE into the first chamber portion 83E to the third chamber portion 85E, respectively, a part of an upper portion of the detector cover 70E is attached to the first chamber portion 83E to the third chamber portion 85E by fitting.

(Configuration—Incidence Suppressing Structure)

Next, a description will be given of an incidence suppressing structure of the fire detection apparatus 1E. FIG. 35 is a bottom view illustrating the detector cover 70E and the detector body 80E. FIG. 36 is a cross-sectional view taken along B-B line of FIG. 35. FIG. 37 is a cross-sectional view taken along C-C line of FIG. 36. In FIG. 36 and FIG. 37, first detection light LW and second detection light L2E are indicated by imaginary lines. In Embodiment 5, a feature of the incidence suppressing structure for inhibiting the first detection light LW irradiated from the first light emitting unit or the second detection light L2E irradiated from the first light emitting unit from entering the light receiving unit is described below.

That is, as illustrated in FIG. 35 to FIG. 37, a first reflective portion 110E and a second reflective portion 120E are provided in the light shielding area 80aE.

(Configuration—Incidence Suppressing Structure—First Reflective Portion)

The first reflective portion 110E is a first reflecting unit that reflects the first detection light LW or the second detection light L2E not to be parallel to a predetermined corresponding optical axis (first light emitting-side optical axis or second light emitting-side optical axis) so that the first detection light LW or the second detection light L2E directly incident on and reflected by the first reflective portion 110E from the first light emitting unit or the second light emitting unit does not enter the light receiving unit. The first reflective portion 110E is formed by inclining a part of the detector cover 70E forming the light shielding area 80aE non-perpendicularly to the installation surface 2E. Specifically, as illustrated in FIG. 36 and FIG. 37, the portion is formed by inclining an entire lower part of a portion other than a portion on the chamber portion 82E side in a portion covering an outer edge of the light shielding area 80aE in the detector cover 70E toward an inner side of the detection space 60E as being directed downward.

In this case, an inclination angle of the first reflective portion 110E is arbitrary. In Embodiment 5, the inclination angle is set to an angle at which the first detection light LW or the second detection light L2E reflected by the first reflective portion 110E can be reflected toward the detector body 80E or the second reflective portion 120E (upward in FIG. 36), and may be set to, for example, about 45°. When the first detection light LW or the second detection light L2E reflected by the first reflective portion 110E is reflected toward the second reflective portion 120E, it is desirable that the inclination angle is set to an angle at which the first detection light LW or the second detection light L2E can be reflected a plurality of times with respect to a reflective wall 121E of the second reflective portion 120E described below. In this way, it is possible to effectively attenuate the first detection light L1E or the second detection light L2E, and it is possible to reduce an influence on detection accuracy of the fire detection apparatus 1E even when the first detection light L1E or the second detection light L2E is received by the light receiving unit.

The first detection light L1E or the second detection light L2E directly incident on and reflected by the first reflective portion 110E from the first light emitting unit or the second light emitting unit can be inhibited from entering the light receiving unit by the first reflective portion 110E. In addition, since it is unnecessary to separately provide a member for configuring the first reflective portion 110E, it is possible to omit an effort for attachment work of the first reflective portion 110E. Furthermore, when compared to a case in which the first reflective portion 110E is vertically formed, it is possible to reduce an installation space of the detector cover 70E. For example, the fire detection apparatus 1E can be easily made compact.

(Configuration—Incidence Suppressing Structure—Second Reflective Portion)

Returning to FIG. 36, the second reflective portion 120E is a second reflecting unit that reflects the first detection light L1E or the second detection light L2E not to be parallel to a predetermined corresponding optical axis (first light emitting-side optical axis or second light emitting-side optical axis) so that the first detection light L1E or the second detection light L2E directly incident on and reflected by the second reflective portion 120E from the first light emitting unit or the second light emitting unit does not enter the light receiving unit. As illustrated in FIG. 36 and FIG. 37, the second reflective portion 120E is provided at a different position from an installation position of the first reflective portion 110E in the light shielding area 80aE, and includes the reflective wall 121E.

Here, the reflective wall 121E is a wall that can reflect the first detection light LW or the second detection light L2E. The reflective wall 121E is a substantially rectangular plate-shaped body. As illustrated in FIG. 36 and FIG. 37, a plurality of reflective walls 121E is vertically arranged along a direction parallel to the installation surface 2E with an interval therebetween in the light shielding area 80aE and specifically vertically arranged downward from the detector body 80E.

In addition, a specific size of the reflective wall 121E is arbitrary. For example, as illustrated in FIG. 36, a height (vertical length) of the reflective wall 121E may be set to such a length that a part of the first reflective portion 110E overlaps the reflective wall 121E when viewed from a side surface direction. As an example, the height may be set to about a half of a vertical length of the light shielding area 80aE. In addition, as illustrated in FIG. 37, a width of the reflective wall 121E may be set to a length that allows the first detection light LW or the second detection light L2E directly incident on and reflected by each reflective wall 121E from the first light emitting unit or the second light emitting unit to be reflected toward an adjacent reflective wall 121E (in FIG. 37, in a direction orthogonal to a predetermined corresponding optical axis (the first light emitting-side optical axis or the second light emitting-side optical axis) and parallel to the installation surface 2E). In addition, in particular, from a viewpoint of effectively attenuating the first detection light LW or the second detection light L2E, it is more desirable to set the width to a length that allows the first detection light LW or the second detection light L2E to be reflected a plurality of times by a reflective wall 121E on which and from which the first detection light LW or the second detection light L2E is directly incident and reflected and an adjacent reflective wall 121E. At the time of performing such setting, the width may differ depending on the irradiation direction, the irradiation range, etc. of the first detection light LW or the second detection light L2E, and thus may be set on the basis of an experimental result, etc., as an example.

In addition, a method of installing the reflective wall 121E is arbitrary. In Embodiment 5, the reflective wall 121E is installed as described below.

In more detail, first, the plurality of reflective walls 121E is disposed such that a reflective surface of each of the plurality of reflective walls 121E is orthogonal to the installation surface 2E. Here, as illustrated in FIG. 37, the "reflective surface" refers to a side surface that reflects the first detection light LW or the second detection light L2E incident thereon among side surfaces of the reflective wall 121E, and is described as a main side surface of the reflective wall 121E (a side surface having a relatively large area among the side surfaces of the reflective wall 121E) in the embodiment. Specifically, as illustrated in FIG. 36 and FIG. 37, the reflective surface of each of the plurality of reflective walls 121E is disposed along the vertical direction. According to such installation, when compared to a case in which the reflective surface of each of the plurality of reflective walls 121E is disposed not to be orthogonal to the installation surface 2E, it is possible to effectively reflect the first detection light LW or the second detection light L2E reflected by any of the plurality of reflective walls 121E toward the adjacent reflective wall 121E, and it is possible to inhibit the first detection light LW or the second detection light L2E reflected by the plurality of reflective walls 121E from entering the light receiving unit.

In addition, the plurality of reflective walls 121E is installed at a portion corresponding to the first reflective portion 110E at the outer edge of the light shielding area 80aE. Specifically, as illustrated in FIG. 37, each of the plurality of reflective walls 121E is installed to protrude from the outer edge of the light shielding area 80aE toward an inner side of the light shielding area 80aE in a portion overlapping the first reflective portion 110E (that is, a portion corresponding to the first reflective portion 110E) when viewed in a direction orthogonal to the installation surface 2E (planar direction) at the outer edge of the light shielding area 80aE. According to such installation, when compared to a case in which the plurality of reflective walls 121E is provided at a portion other than the outer edge of the light shielding area 80aE, it is possible to suppress a hindrance to reception of the first detection light LW or the second detection light L2E by the light receiving unit due to the plurality of reflective walls 121E, and it is possible to allow the first detection light LW or the second detection light L2E reflected by the first reflective portion 110E to effectively enter any one of the plurality of reflective walls 121E. Therefore, it is possible to inhibit the first detection light LW or the second detection light L2E reflected by the first reflective portion 110E to enter the light receiving unit while ensuring a desired quantity of received light in the light receiving unit.

In addition, the plurality of reflective walls 121E is installed such that the first detection light LW or the second detection light L2E directly incident on and reflected by each reflective wall 121E from the first light emitting unit or the second light emitting unit can be reflected toward the adjacent reflective wall 121E. In particular, as illustrated in FIG. 37, it is desirable to install the reflective walls to allow reflection toward a reflective wall 121E provided at a position far from the light receiving unit among reflective walls 121E adjacent to the first detection light LW or the second detection light L2E. Specifically, the reflective walls are installed such that the reflective surface of each reflective wall 121E faces the reflective wall 121E provided at the position far from the light receiving unit. According to such installation, when compared to a case in which the first detection light LW or the second detection light L2E is reflected toward a reflective wall 121E provided at a position near the light receiving unit among the adjacent reflective walls 121E, it is possible to inhibit the first detection light LW or the second detection light L2E from entering the light receiving unit.

In addition, a method of forming the reflective wall 121E is arbitrary. For example, the reflective wall 121E and the detector body 80E may be integrally formed by injection-molding a resin material having a light shielding property. However, the invention is not limited thereto. After separately forming the reflective wall 121E and the detector body 80E, the reflective wall 121E may be fixed to the detector body 80E by a fixing tool, an adhesive, etc.

Such a second reflective portion 120E can inhibit the first detection light LW or the second detection light L2E directly incident on and reflected by the second reflective portion 120E from the first light emitting unit or the second light emitting unit from entering the light receiving unit. In particular, it is possible to reflect the first detection light LW or the second detection light L2E reflected by any one of the plurality of reflective walls 121E toward the adjacent reflective wall 121E, and it is possible to further inhibit the first detection light LW or the second detection light L2E reflected by the plurality of reflective walls 121E from entering the light receiving unit.

According to the incidence suppressing structure, it is possible to inhibit the first detection light LW or the second detection light L2E directly incident on and reflected by the first reflective portion 110E or the second reflective portion 120E from the first light emitting unit or the second light emitting unit from entering the light receiving unit. In particular, when compared to a case in which only one of the first reflective portion 110E or the second reflective portion 120E is provided, it is possible to effectively inhibit detection light in various irradiation directions or irradiation ranges from entering the light receiving unit. Therefore, it is possible to maintain detection accuracy of the fire detection apparatus 1E.

(With Regard to Action of Fire Detection Apparatus)

Returning to FIG. 36, next, a description will be given of an action of the fire detection apparatus 1E configured as described above. The action of the fire detection apparatus 1E is roughly divided into an action corresponding to the first reflective portion 110E (hereinafter referred to as a "first action") and an action corresponding to the second reflective portion 120E (hereinafter referred to as a "second action"). Hereinafter, each of the first action and the second action will be described.

(With Regard to Action of Fire Detection Apparatus—First Action)

First, the first action will be described. In more detail, for example, when the first detection light LW or the second detection light L2E is irradiated toward the detection space 60E from the first light emitting unit or the second light emitting unit, the first detection light LW or the second detection light L2E enters the first reflective portion 110E. In this case, as illustrated in FIG. 36, since the first detection light LW or the second detection light L2E is reflected toward the detector body 80E or the second reflective portion 120E by the first reflective portion 110E, it is possible to prevent the reflected first detection light LW or second detection light L2E from entering the light receiving unit. The reflected first detection light LW or second detection light L2E is received by the light receiving unit after being reflected by the detector body 80E, the second reflective portion 120E, etc. again (or without being reflected by the detector body 80E or the second reflective portion 120E again). In this case, since the first detection light LW or the second detection light L2E is attenuated by the reflection, even when the first detection light LW or the second detection light L2E is received by the light receiving unit, it is possible to reduce an influence on detection accuracy of the fire detection apparatus 1E.

(With Regard to Action of Fire Detection Apparatus—Second Action)

In addition, the second action will be described. In more detail, for example, when the first detection light LW or the second detection light L2E is irradiated toward the detection space 60E by the first light emitting unit or the second light emitting unit, the first detection light LW or the second detection light L2E enters the second reflective portion 120E (specifically, any one of the plurality of reflective walls 121E). In this case, as illustrated in FIG. 37, the first detection light LW or the second detection light L2E is reflected toward the adjacent reflective wall 121E by any one of the plurality of reflective walls 121E, and thus it is possible to prevent the reflected first detection light LW or second detection light L2E from entering the light receiving unit. The reflected first detection light LW or second detection light L2E is received by the light receiving unit after being reflected by the reflective wall 121E, etc. again (or without being reflected by the reflective wall 121E). In this case, since the first detection light LW or the second detection light L2E is attenuated by the reflection, even when the first detection light LW or the second detection light L2E is received by the light receiving unit, it is possible to reduce an influence on detection accuracy of the fire detection apparatus 1E.

Effect of Embodiment 5

As described above, according to Embodiment 5, since the first reflective portion 110E provided in the light shielding area 80aE and used to reflect detection light directly incident on and reflected by the first reflective portion 110E from the first light emitting unit or the second light emitting unit not to be parallel to a predetermined optical axis such that the detection light does not enter the light receiving unit, and the second reflective portion 120E provided at a different position from the installation position of the first reflective portion 110E in the light shielding area 80aE and used to reflect detection light directly incident on and reflected by the second reflective portion 120E from the first light emitting unit or the second light emitting unit not to be parallel to a predetermined optical axis such that the detection light does not enter the light receiving unit are included, it is possible to inhibit detection light directly incident on and reflected by the first reflective portion 110E or the second reflective portion 120E from the first light emitting unit or the second light emitting unit from entering the light receiving unit. In particular, when compared to a case in which only one of the first reflective portion 110E or the second reflective portion 120E is provided, it is possible to effectively inhibit detection light in various irradiation directions or irradiation ranges from entering the light receiving unit. Therefore, it is possible to maintain detection accuracy of the fire detection apparatus 1E.

In addition, since the first reflective portion 110E is formed by inclining a part of the light shielding area formation member forming the light shielding area 80aE not to be perpendicular to the installation surface 2E, it is unnecessary to separately provide a member for configuring the first reflective portion 110E. Thus, it is possible to omit an effort for attachment work of the first reflective portion 110E. In addition, when compared to a case in which the first reflective portion 110E is vertically formed, it is possible to reduce an installation space of the light shielding area formation member. For example, the fire detection apparatus 1E is easily made compact.

In addition, since the second reflective portion 120E includes the plurality of reflective walls 121E which is vertically arranged along the direction parallel to the installation surface 2E with an interval therebetween in the light shielding area 80aE and which can reflect detection light, for example, it is possible to reflect detection light reflected by any one of the plurality of reflective walls 121E toward the adjacent reflective wall 121E, and it is possible to further inhibit detection light reflected by the plurality of reflective walls 121E from entering the light receiving unit.

In addition, since the plurality of reflective walls 121E of the second reflective portion 120E is disposed such that the reflective surface of each of the plurality of reflective walls 121E of the second reflective portion 120E is orthogonal to the installation surface, when compared to a case in which the reflective walls are disposed such that the reflective surface of each of the plurality of reflective walls 121E of the second reflective portion 120E is not orthogonal to the installation surface, it is possible to effectively reflect detection light reflected by any one of the plurality of reflective walls 121E toward the adjacent reflective wall 121E, and it is possible to further inhibit detection light reflected by the plurality of reflective walls 121E from entering the light receiving unit.

In addition, since the plurality of reflective walls 121E of the second reflective portion 120E is provided at the portion corresponding to the first reflective portion 110E at the outer edge of the light shielding area 80aE, when compared to a case in which the plurality of reflective walls 121E of the second reflective portion 120E is provided at a portion other than the outer edge of the light shielding area 80aE, it is possible to inhibit reception of detection light by the light receiving unit from being hindered by the plurality of reflective walls 121E, and it is possible to allow detection light reflected by the first reflective portion 110E to effectively enter any one of the plurality of reflective walls 121E. Therefore, it is possible to inhibit detection light reflected by the first reflective portion 110E from entering the light receiving unit while ensuring a desired quantity of received light in the light receiving unit.

[III] Modifications to Embodiments

Embodiment 1 to Embodiment 5 according to the invention have been described above. However, a specific configuration and means of the invention may be arbitrarily modified and improved within a range of a technical idea of each invention described in the claims. Hereinafter, such modifications will be described.

Modification to Embodiment 1

First, a modification of Embodiment 1 will be described.

(With Regard to Problems to be Solved and Effects of Invention)

First, the problems to be solved by the invention according to Embodiment 1 and the effects of the invention are not limited to the above contents, and may differ depending on the details of the implementation environment and configuration of the invention. Further, only some of the problems may be solved, or only some of the effects may be achieved.

(With Regard to Dispersion and Integration)

In addition, the above-described configurations are functionally conceptual, and may not be physically configured as illustrated. That is, specific forms of dispersion and integration of each part are not limited to the illustrated ones, and all or some thereof can be configured to be functionally or physically dispersed or integrated in an arbitrary unit. For example, an arbitrary one of the respective features may be replaced with a conventional one. For example, one of the first light emitting unit 61A or the second light emitting unit 62A may be omitted to use one light emitting unit, or another light emitting unit may be provided in addition to these light emitting units to use three or more light emitting units.

(With Regard to the Reflecting Unit (1))

In addition, in Embodiment 1, a description has been given of a case in which the reflecting unit is configured using the smoke detection unit cover-side inclined portion 43A of the smoke detection unit cover 4A. However, the invention is not limited thereto. For example, a reflective member separate from the smoke detection unit cover 4A may be provided in the light shielding space 3A to configure the reflecting unit by the reflective member. In this case, for example, the reflective member may be provided on the opposite side from the opposite side from the first light emitting unit 61A with reference to the occurrence space 32A and the opposite side from the second light emitting unit 62A with reference to the occurrence space 32A.

The reflective member in this case may be arbitrarily configured. For example, as described in Embodiment 1, the reflective member may be configured such that detection light is reflected to the upper side (+Z direction), or configured such that when detection light primarily reflected by the reflective member returns to the reflective member by being reflected once in the light shielding space 3A after the primary reflection, the returning detection light is reflected to the light emitting unit (that is, the first light emitting unit 61A and the second light emitting unit 62A) side by the reflective member. In addition, for example, unlike the case described in Embodiment 1, the reflective member may be configured such that detection light is reflected to the lower side (−Z direction), or configured such that when detection light primarily reflected by the reflective member returns to the reflective member by being reflected once in the light shielding space 3A after the primary reflection, the returning detection light is reflected by the reflective member in a direction other than the light emitting unit side (excluding the light receiving unit 63A side). The smoke detection unit cover-side inclined portion 43A may be configured to exhibit a similar function to that of the reflective member.

(With Regard to the Reflecting Unit (2))

In addition, in Embodiment 1, a description has been given of a case in which the first light emitting-side optical axis 611A, the second light emitting-side optical axis 621A, and the light receiving-side optical axis 631A are provided on the same plane. However, the invention is not limited thereto. In a case in which the respective optical axes are not provided on the same plane, it is possible to adopt the following configuration. Specifically, focusing on a concept that a plane is defined by two mutually intersecting straight lines, it is possible to adopt a configuration so that the reflecting unit primarily reflects detection light from the first light emitting unit 61A in a direction intersecting a plane defined by the first light emitting-side optical axis 611A and the light receiving-side optical axis 631A, and primarily reflects detection light from the second light emitting unit 62A in a direction intersecting a plane defined by the second light emitting-side optical axis 621A and the light receiving-side optical axis 631A, that is, primarily reflects the detection light from the first light emitting unit 61A and the detection light from the second light emitting unit 62A in different directions.

(With Regard to Installation of Detector)

In addition, the detector 100A may be attached to a surface on the monitored area side (that is, the indoor side surface of the wall) corresponding to an installation surface on the lateral side in the wall corresponding to the installation object. In this case, by primarily reflecting the detection light emitted from the first light emitting unit 61A and the second light emitting unit 62A to the attachment surface 11A side (that is, in a direction parallel to the XY plane), for example, the detection light can be primarily reflected toward the lateral side different from the lower side (−Z direction) corresponding to a side at which dust is generally easily deposited. Thus, it is possible to prevent the detection light from being incident on the light receiving unit 63A by reflection of the detection light due to dust, and it is possible to further reduce the degree of adverse effect of the detection light on determination of a fire. In addition, the detection light emitted from the first light emitting unit 61A and the second light emitting unit 62A may be primarily reflected to the opposite side from the attachment surface 11A side by changing the shape of the smoke detection unit cover-side inclined portion 43A. In this configuration, the detection light can be primarily reflected toward the lateral side different from the lower side (−Z direction) corresponding to a side at which dust is generally easily deposited. In addition, the detection light emitted from the first light emitting unit 61A and the detection light emitted from the second light emitting unit 62A may be primarily reflected in mutually opposite directions by changing the shape of the smoke detection unit cover-side inclined portion 43A.

Modification to Embodiment 2

First, a modification of Embodiment 2 will be described.

(With Regard to Problems to be Solved and Effects of Invention)

First, the problems to be solved by the invention according to Embodiment 2 and the effects of the invention are not limited to the above contents, and may differ depending on the details of the implementation environment and configuration of the invention. Further, only some of the problems may be solved, or only some of the effects may be achieved.

(With Regard to Dispersion and Integration)

In addition, the above-described configurations are functionally conceptual, and may not be physically configured as illustrated. That is, specific forms of dispersion and integration of each part are not limited to the illustrated ones, and all or some thereof can be configured to be functionally or physically dispersed or integrated in an arbitrary unit. For example, an arbitrary one of the respective features may be replaced with a conventional one. For example, one of the first light emitting unit 61B or the second light emitting unit 62B may be omitted to use one light emitting unit, or another light emitting unit may be provided in addition to these light emitting units to use three or more light emitting units.

(With Regard to Light Guiding Space (1))

In addition, in Embodiment 2, as illustrated in FIG. 17, a description has been given of a case in which only one light guiding space groove 46B is provided. However, the invention is not limited thereto. For example, a first light guiding space groove that connects the first light emitting unit substrate side opening 441aB and the light receiving unit substrate side opening 443aB to each other and a second light guiding space groove that connects the second light emitting unit substrate side opening 442aB and the light receiving unit substrate side opening 443aB to each other and is not connected to the first light guiding space groove may be formed to form the light guiding space using these light guiding space grooves.

(With Regard to Light Guiding Space (2))

In addition, with regard to the light guiding space 7B of Embodiment 2, the reflective layer 601B may be omitted or a non-closed space may be configured to form and mount a light guiding space of various configurations on the detector 100B. In addition, as the light guiding space 7B of Embodiment 2, without using the light guiding space groove 46B, a tunnel light path for allowing partial detection light from each light emitting unit to enter the light receiving unit 63B may be provided on the smoke detection unit cover 40B, and the tunnel light path may be used as the light guiding space.

Modification to Embodiment 3

Next, a modification of Embodiment 3 will be described.
(With Regard to Problems to be Solved and Effects of Invention)

The problems to be solved by the invention according to Embodiment 3 and the effects of the invention are not limited to the above contents, and may differ depending on the details of the implementation environment and configuration of the invention. Further, only some of the problems may be solved, or only some of the effects may be achieved.

(With Regard to Fire Detection Apparatus)

Embodiment 3 describes that the fire detection apparatus 1C includes the inner cover 30C. However, the invention is not limited thereto. For example, the inner cover 30C may be omitted.

(With Regard to Detector Body)

In addition, Embodiment 3 describes that the accommodation structure and the reflection suppressing structure are provided in the detector body 80C. However, the invention is not limited thereto. For example, any one of the accommodation structure or the reflection suppressing structure may be omitted.

(With Regard to Substrate)

Embodiment 3 describes that the first light emitting unit and the second light emitting unit are mounted on the substrate 100C. However, the invention is not limited thereto. For example, any one of the first light emitting unit or the second light emitting unit may be omitted. In this case, for example, only one or only two of the first detection space side depression 87aC, the second detection space side depression 87bC, or the third detection space side depression 87cC may be omitted.

(With Regard to Accommodation Structure)

Embodiment 3 describes that the number of installed depressions provided in a portion of the detector body 80C on the substrate 100C side is five. However, the invention is not limited thereto. For example, the number may be fewer than five or may be six or more.

(With Regard to Reflection Suppressing Structure)

Embodiment 3 describes that the number of installed depressions provided in a portion of the detector body 80C on the detection space side is three. However, the invention is not limited thereto. For example, the number may be fewer than three or may be four or more.

Modification to Embodiment 4

Next, a modification of Embodiment 4 will be described.
(With Regard to Problems to be Solved and Effects of Invention)

The problems to be solved by the invention according to Embodiment 4 and the effects of the invention are not limited to the above contents, and may differ depending on the details of the implementation environment and configuration of the invention. Further, only some of the problems may be solved, or only some of the effects may be achieved.

(With Regard to Fire Detection Apparatus)

Embodiment 4 describes that the fire detection apparatus 1D includes the inner cover 30D. However, the invention is not limited thereto. For example, the inner cover 30D may be omitted. In this case, for example, a part of a lower side portion of the outer cover 20D may be configured to function similarly to the lower side portion of the inner cover 30D. That is, substantially similarly to the lower side portion of the inner cover 30D, a shape and a size of the part of the lower side portion of the outer cover 20D may be set such that ambient light incident on the inflow space 40D at a predetermined angle can be reflected a plurality of times by the lower side portion of the outer cover 20D.

In addition, Embodiment 4 describes that the fire detection apparatus 1D includes the light reception suppressing portion 110D. However, the invention is not limited thereto. For example, the light reception suppressing portion 110D may be omitted.

In addition, Embodiment 4 describes that the fire detection apparatus 1D includes the first light emitting unit and the second light emitting unit. However, the invention is not limited thereto. For example, any one of the first light emitting unit or the second light emitting unit may be omitted.

(With Regard to First Rib Portion and Second Rib Portion)

Embodiment 4 describes that the first rib portion 23D and the second rib portion 24D are provided on the outer cover 20D. However, the invention is not limited thereto. For example, the rib portions may be provided on the inner cover 30D.

(With Regard to Detector Body)

Embodiment 4 describes that the first prism lens portion 81aD, the second prism lens portion 81bD, the third prism lens portion 81cD, and the chamber portion 82D are provided in the detector body 80D. However, the invention is not limited thereto. For example, the first prism lens portion 81aD, the second prism lens portion 81bD, the third prism lens portion 81cD, and the chamber portion 82D may be omitted. In this case, a specific configuration of the detector body 80D is arbitrary. For example, each support for supporting each of the first light emitting unit, the second light emitting unit, and the light receiving unit may be provided in the detector body 80D. Furthermore, each optical path hole for forming an optical path between the detection space 60D and each of the first light emitting unit, the second light emitting unit, and the light receiving unit may be formed in the detector body 80D. According to such a configuration, a detection target can be detected substantially similarly to Embodiment 4.

(With Regard to Light Reception Suppressing Portion)

Embodiment 4 describes that the light reception suppressing portion 110D includes three light shielding ribs (the first light shielding rib 111D, the second light shielding rib 112D, and the third light shielding rib 113D). However, the invention is not limited thereto. For example, two or fewer light shielding ribs may be included, or four or more light shielding ribs may be included.

In addition, Embodiment 4 describes that the third insertion ports 85aD of the first light shielding rib 111D, the second light shielding rib 112D, and the third light shielding rib 113D are set to decrease toward the front side in the incidence direction. However, the invention is not limited thereto. For example, the third insertion ports 85aD of the first light shielding rib 111D, the second light shielding rib 112D, and the third light shielding rib 113D may be set to increase toward the front side in the incidence direction. Alternatively, the third insertion ports 85aD of the first light shielding rib 111D, the second light shielding rib 112D, and the third light shielding rib 113D may be set to uniform sizes.

Modification to Embodiment 5

Next, a modification of Embodiment 5 will be described.

(With Regard to Problems to be Solved and Effects of Invention)

First, the problems to be solved by the invention according to Embodiment 5 and the effects of the invention are not limited to the above contents, and may differ depending on the details of the implementation environment and configuration of the invention. Further, only some of the problems may be solved, or only some of the effects may be achieved.

(With Regard to Fire Detection Apparatus)

Embodiment 5 describes that the fire detection apparatus 1E includes the inner cover 30E. However, the invention is not limited thereto. For example, the inner cover 30E may be omitted.

In addition, Embodiment 5 describes that the fire detection apparatus 1E includes the first light emitting unit and the second light emitting unit. However, the invention is not limited thereto. For example, any one of the first light emitting unit or the second light emitting unit may be omitted.

(With Regard to Detector Body)

Embodiment 5 describes that the first prism lens portion 81aE, the second prism lens portion 81bE, the third prism lens portion 81cE, and the chamber portion 82E are provided in the detector body 80E. However, the invention is not limited thereto. For example, the first prism lens portion 81aE, the second prism lens portion 81bE, the third prism lens portion 81cE, and the chamber portion 82E may be omitted. In this case, a specific configuration of the detector body 80E is arbitrary. For example, each support for supporting each of the first light emitting unit, the second light emitting unit, and the light receiving unit may be provided in the detector body 80E. Furthermore, each optical path hole for forming an optical path between the detection space 60E and each of the first light emitting unit, the second light emitting unit, and the light receiving unit may be formed in the detector body 80E. According to such a configuration, a detection target can be detected substantially similarly to Embodiment 5.

(With Regard to Various Reflective Portions)

Embodiment 5 describes that the first reflective portion 110E and the second reflective portion 120E (reflective wall 121E) are formed of a resin material having a light shielding property. However, the invention is not limited thereto. For example, the portions may be formed of a material or a color capable of absorbing detection light or coating may be applied thereto so that detection light can be absorbed. In this way, it is possible to suppress scattering of unnecessary detection light as a noise source in the detection space 60E.

(With Regard to First Reflective Portion)

Embodiment 5 describes that the first reflective portion 110E is formed by inclining a part of the light shielding area formation member (specifically, the detector cover 70E). However, the invention is not limited thereto. For example, the first reflective portion 110E may be formed separately from the detector cover 70E and fixed to the detector cover 70E by a fixing tool, an adhesive, etc.

In addition, Embodiment 5 describes that the first reflective portion 110E is formed by inclining the entire lower part of the portion other than the portion on the chamber portion 82E side in the portion covering the outer edge of the light shielding area 80aE in the detector cover 70E. However, the invention is not limited thereto. For example, the first reflective portion 110E may be formed by inclining only a portion of the lower part on which the first detection light and the second detection light irradiated from the first light emitting unit and the second light emitting unit can be directly incident.

In addition, Embodiment 5 describes that the first reflective portion 110E is inclined toward the inner side of the detection space 60E as being directed downward. However, the invention is not limited thereto. For example, the first reflective portion 110E may be inclined toward the outer side of the detection space 60E as being directed downward.

(With Regard to Second Reflective Portion)

Embodiment 5 describes that the height of the reflective wall 121E is set to such a length that the part of the first reflective portion 110E overlaps the reflective wall 121E when viewed from the side surface direction. However, the invention is not limited thereto. For example, the height may be set to such a length that the first reflective portion 110E and the reflective wall 121E do not overlap each other when viewed from the side surface direction.

In addition, Embodiment 5 describes that the reflective wall 121E of the second reflective portion 120E is installed at the portion corresponding to the first reflective portion 110E at the outer edge of the light shielding area 80aE. However, the invention is not limited thereto. For example, the reflective wall 121E may be installed only at a position on which the first detection light and the second detection light irradiated from the first light emitting unit and the second light emitting unit can be directly incident and the vicinity thereof in the corresponding portion. Alternatively, the reflective wall 121E may be installed at a position other than the outer edge of the light shielding area 80aE or may be installed at a position not corresponding to the first reflective portion 110E at the outer edge of the light shielding area 80aE.

In addition, Embodiment 5 describes that the plurality of reflective walls 121E is installed such that the reflective surface of each of the plurality of reflective walls 121E is orthogonal to the installation surface 2E. However, the invention is not limited thereto. For example, the reflective surface of each of the plurality of reflective walls 121E may be disposed along a direction not orthogonal to the installation surface 2E.

In addition, Embodiment 5 describes that the plurality of reflective walls 121E is installed such that the first detection light or the second detection light directly incident on and reflected by each reflective wall 121E from the first light emitting unit or the second light emitting unit can be reflected toward the adjacent reflective wall 121E. However, the invention is not limited thereto. For example, the reflective walls may be installed such that the first detection light or the second detection light directly incident on and reflected by each reflective wall 121E can be reflected toward the first reflective portion 110E.

One embodiment of the present invention provides a fire detection apparatus comprises a detection space into which a detection target flows, detection light being allowed to enter the detection space.

According to this embodiment, since a detection space into which a detection target flows, detection light being allowed to enter the detection space is provided, detection light can be used to detect the detection target in the detection space, and the occurrence of a fire can be effectively detected.

Another embodiment of the present invention provides the alarm apparatus according to the above embodiment, wherein the fire detection apparatus is a scattered light detector and includes the detection space provided in a light shielding area shielded from light from an outside, the detection target flowing into the detection space, a light emitting unit that emits the detection light along a light emitting-side optical axis toward the detection space, a light receiving unit that receives scattered light generated when the detection light emitted from the light emitting unit is scattered by the detection target flowing into the detection space along a light receiving-side optical axis intersecting the light emitting-side optical axis, and a reflecting unit that primarily reflects the detection light emitted from the light emitting unit in a direction intersecting a plane defined by the light emitting-side optical axis and the light receiving-side optical axis.

According to this embodiment, by primary reflecting detection light emitted from the light emitting unit in the direction intersecting the plane defined by the light emitting-side optical axis and the light receiving-side optical axis, for example, the detection light from the first light emitting unit can be prevented from being directly incident on the light receiving unit after being reflected only once in the light shielding area. Thus, it is possible to reduce the degree of the adverse effect of the detection light on determination of a fire.

Another embodiment of the present invention provides the alarm apparatus according to the above embodiment, wherein the reflecting unit is formed by inclining at least a part on the light emitting-side optical axis in a light shielding area formation member forming the light shielding area.

According to this embodiment, when the reflecting unit is formed by inclining at least a part of the first light emitting-side optical axis in a light shielding area formation member forming the light shielding area, for example, the light shielding area formation member can be used as the light reflecting unit. Thus, a dedicated component for configuring the reflecting unit is unnecessary, the number of components of a scattered light detector can be reduced, and the weight and cost of the scattered light detector can be reduced.

Another embodiment of the present invention provides the alarm apparatus according to the above embodiment, wherein when the detection light primarily reflected by the reflecting unit is reflected once in the light shielding area after the primary reflection and returns to the reflecting unit, the reflecting unit reflects the returning detection light to a side of the light emitting unit.

According to this embodiment, in the case where detection light primarily reflected by the reflecting unit is reflected once in the light shielding area after the primary reflection and returns to the reflecting unit, for example, it is possible to prevent the detection light returning to the reflecting unit from being incident on the light receiving unit by reflecting the returning detection light to a side of the light emitting unit. Thus, it is possible to further reduce the degree of adverse effect of the detection light on determination of a fire. In addition, for example, in the case where the detection target is present in the detection space, in addition to detection light before primary reflection by the reflecting unit, detection light returning after primary reflection can be allowed to pass through the detection space. Thus, it is possible to increase the quantity of light in the detection space, and it is possible to provide a scattered light detector having relatively high sensitivity.

Another embodiment of the present invention provides the alarm apparatus according to the above embodiment, wherein at least a part of the light shielding area is surrounded by a circuit board, the circuit board includes an absorbing layer that absorbs light, and the reflecting unit primarily reflects the detection light emitted from the light emitting unit to the absorbing layer.

According to this embodiment, by primarily reflecting detection light emitted from the light emitting unit by the absorbing layer, for example, the detection light can be absorbed by the absorbing layer. Thus, it is possible to weaken the intensity of the detection light after primary reflection, and it is possible to further reduce the degree of adverse effect of the detection light on determination of a fire.

Another embodiment of the present invention provides the alarm apparatus according to the above embodiment, wherein the scattered light detector is attached to an installation surface on a lower side of an installation object, the scattered light detector includes an attachment surface facing the installation surface, and the reflecting unit primarily reflects the detection light emitted from the light emitting unit to a side of the attachment surface.

According to this embodiment, by primarily reflecting the detection light emitted from the light emitting unit to the attachment surface side, for example, it is possible to primarily reflect the detection light toward the upper side on the opposite side from the lower side corresponding to a side at which dust is generally likely to be deposited. Thus, it is possible to prevent the detection light from being incident on the light receiving unit due to reflection of the detection light by dust, and it is possible to further reduce the degree of adverse effect of the detection light on determination of a fire.

Another embodiment of the present invention provides the alarm apparatus according to the above embodiment, wherein the scattered light detector is attached to an installation surface on a lateral side of an installation object, the scattered light detector includes an attachment surface facing the installation surface, and the reflecting unit primarily reflects the detection light emitted from the light emitting unit to a side of the attachment surface or an opposite side from the side of the attachment surface.

According to this embodiment, by primarily reflecting the detection light emitted from the light emitting unit to the attachment surface side or the side opposite to the attachment surface side, for example, it is possible to primarily reflect the detection light toward the upper side on the different side from the lower side corresponding to a side at which dust is generally likely to be deposited. Thus, it is possible to prevent the detection light from being incident on the light receiving unit due to reflection of the detection light by dust, and it is possible to further reduce the degree of adverse effect of the detection light on determination of a fire.

Another embodiment of the present invention provides the alarm apparatus according to the above embodiment, wherein the detection target is smoke.

According to this embodiment, when the detection target is smoke, for example, smoke can be detected, and thus it is possible to reliably determine a fire by detection of the smoke.

Another embodiment of the present invention provides the alarm apparatus according to the above embodiment, wherein the fire detection apparatus is a scattered light detector and includes the detection space into which the detection target flows, a light emitting unit that emits the detection light toward the detection space, a light receiving unit that receives at least scattered light generated when the detection light emitted from the light emitting unit is scattered by the detection target flowing into the detection space, and a light guiding unit that guides partial detection light, which is light corresponding to a part of the detection light emitted from the light emitting unit and used to comprehend a state of the light emitting unit or the light receiving unit, to the light receiving unit without passing through the detection space, and the light guiding unit includes a light guiding space that guides the partial detection light and extends from a side of the light emitting unit to a side of the light receiving unit.

According to this embodiment, by guiding partial detection light corresponding to light which is only a part of detection light emitted from the light emitting unit used to comprehend a state of the light emitting unit or the light receiving unit to the light receiving unit without passing through the detection space, for example, the partial detection light may be allowed to enter the light receiving unit. Thus, it is possible to comprehend the state of the light emitting unit or the light receiving unit. In particular, for example, since the light guiding unit includes a light guiding space, it is possible to freely set a path of the light guiding space by surrounding a certain space. Thus, for example, guidance of a light guiding member such as an optical fiber in the scattered light detector is unnecessary, and it is possible to improve manufacturability of the scattered light detector. In addition, for example, when the inside of the light guiding space can be made hollow, it is possible to reduce the amount of a material for forming the light guiding space, and thus it is possible to reduce the cost and weight of the scattered light detector.

Another embodiment of the present invention provides the alarm apparatus according to the above embodiment, wherein the light guiding space includes a reflective layer that reflects the partial detection light at a predetermined reflectance.

According to this embodiment, when the light guiding space includes the reflective layer, for example, it is possible to prevent partial detection light from attenuating in the light guiding space. Thus, partial detection light can be reliably made incident on the light receiving unit.

Another embodiment of the present invention provides the alarm apparatus according to the above embodiment, wherein the light guiding space is surrounded by at least a part of a circuit board on which the light emitting unit or the light receiving unit is mounted.

According to this embodiment, since the light guiding space is surrounded by at least a part of the circuit board, for example, it is unnecessary to provide a dedicated component for forming the light guiding space. Thus, it is possible to reduce the number of components, and it is possible to reduce the cost and weight of the scattered light detector.

Another embodiment of the present invention provides the alarm apparatus according to the above embodiment, wherein the light guiding space is an enclosed space.

According to this embodiment, when the light guiding space is an enclosed space, for example, it is possible to prevent the detection target from flowing into the light guiding space. Therefore, partial detection light can be made stably incident on the light receiving unit regardless of the detection target flowing into the occurrence space, and thus it is possible to accurately comprehend a state of the light emitting unit or the light receiving unit at all times.

Another embodiment of the present invention provides the alarm apparatus according to the above embodiment, wherein the detection target is smoke.

According to this embodiment, when the detection target is smoke, for example, smoke can be detected, and thus it is possible to reliably determine a fire by detection of the smoke.

Another embodiment of the present invention provides the alarm apparatus according to the above embodiment, wherein the fire detection apparatus is a fire detection apparatus for detecting a fire in a monitored area and includes the detection space that performs detection of the detection target, a substrate on which a component is mounted, the component including a detection unit that detects the detection target by irradiating and receiving the detection light in the detection space, an incidence suppression unit that inhibits ambient light from entering the detection space, the incidence suppression unit having a cover portion that covers an outer periphery of the detection space and a base portion provided on a substrate side of the cover portion to cover the substrate, and a depression obtained by forming a predetermined portion of the base portion in a concave shape.

According to this embodiment, since the incidence suppression unit, which is used to suppress incidence of ambient light into the detection space, has the cover covering an outer periphery of the detection space and a base portion provided on a substrate side of the cover portion, and the depression obtained by forming a predetermined portion of the base portion in a concave shape, for example, the component can be accommodated on the inside of the depression. Therefore, a space for mounting the component can be easily ensured between the detector body and the substrate, so that the accommodation characteristic of the component can be improved. In addition, for example, it is possible to inhibit detection light entering the detector body from being reflected toward the light receiving unit by the depression Therefore, it is possible to avoid the excessive increase in quantity of received light of the light receiving unit even though a detection target is not detected, and it is possible to maintain detection accuracy of the fire detection apparatus.

Another embodiment of the present invention provides the alarm apparatus according to the above embodiment, wherein the predetermined portion includes a portion on the substrate side in a portion of the base portion, and the depression is formed so that at least a part of the component mounted on the substrate is allowed to be accommodated in the depression.

According to this embodiment, since the predetermined portion includes a portion on the substrate side in a portion of the base portion, and the depression is formed such that at least a part of the component can be accommodated inside the depression, it is possible to form a space for mounting the component in the portion of the base portion, and it becomes easier to ensure the space.

Another embodiment of the present invention provides the alarm apparatus according to the above embodiment, wherein the predetermined portion includes a portion facing the component in the portion on the substrate side.

According to this embodiment, since the predetermined portion includes a portion facing the component in the portion on the substrate side, it is possible to effectively form a space for mounting the component, and the space can be made compact.

Another embodiment of the present invention provides the alarm apparatus according to the above embodiment, wherein the predetermined portion includes a portion on a detection space side in the portion of the base portion, and the depression is formed to be able to inhibit the detection light entering the portion on the detection space side from being reflected toward the detection unit.

According to this embodiment, since the predetermined portion includes a portion on the detection space side in the portion of the detector body, and the depression is formed such that detection light entering the portion on the detection space side can be inhibited from being reflected toward the light receiving unit, it is possible to inhibit detection light entering the side surface of the detector body on the detection space side from being reflected toward the light receiving unit, and it is possible to further avoid an excessive increase in quantity of received light of the light receiving unit.

Another embodiment of the present invention provides the alarm apparatus according to the above embodiment, wherein the fire detection apparatus is a fire detection apparatus attached to an installation surface of an installation object, is a fire detection apparatus for detecting a fire in a monitored area, and includes an inflow space provided in the fire detection apparatus, gas on an outside of the fire detection apparatus being allowed to flow into the inflow space, a detection space for detecting the detection target, the detection space being provided at a position on an installation surface side of the inflow space in the fire detection apparatus, and an incidence suppression unit that inhibits ambient light from entering the detection space from the outside of the fire detection apparatus, the incidence suppression unit partitioning the inflow space and the detection space so that the gas is allowed to flow into the detection space through the inflow space, and inhibiting the ambient light from directly entering the detection space through the inflow space is allowed, the incidence suppression unit includes a first incidence suppression unit that accommodates the detection space, the first incidence suppression unit being configured to partition a part of the inflow space, a second incidence suppression unit that accommodates the first incidence suppression unit, the second incidence suppression unit being configured to partition another part of the inflow space, and an opening provided in a side portion on an opposite side from a side portion on the installation surface side in side portions of the first incidence suppression unit to allow the gas flowing into the inflow space to flow into the first incidence suppression unit, and the first incidence suppression unit and the second incidence suppression unit are configured such that when the ambient light enters the detection space through the inflow space and the opening, the ambient light is allowed to be reflected a plurality of times with respect to the first incidence suppression unit or the second incidence suppression unit.

According to this embodiment, since the detection space used to detect a detection target and provided at a position on the installation surface side of the inflow space on the inside of the fire detection apparatus, and the incidence suppression unit which is used to inhibit ambient light from entering the detection space from the outside of the fire detection apparatus and partitions the inflow space and the detection space such that gas can flow into the detection space through the inflow space and ambient light can be inhibited from directly entering the detection space through the inflow space are included, when compared to the conventional technology (the technology in which the detection space and the inflow space are arranged in parallel along the installation surface), it is possible to inhibit ambient light from directly entering the detection space through the inflow space while allowing gas to reliably flow into the detection space, and it is possible to maintain the inflow property of gas and the detection accuracy of the fire detection apparatus. In addition, since the first incidence suppression unit and the second incidence suppression unit are configured such that when the ambient light enters the detection space through the inflow space and the opening, the ambient light is allowed to be reflected a plurality of times with respect to the first incidence suppression unit or the second incidence suppression unit, the ambient light can be reflected a plurality of times with respect to the first incidence suppression unit or the second incidence suppression unit when the ambient light enters the detection space through the inflow space. Therefore, it is possible to effectively attenuate ambient light entering the detection space, and it becomes easy to maintain the detection accuracy of the fire detection apparatus.

Another embodiment of the present invention provides the alarm apparatus according to the above embodiment, further comprising a plurality of plate-shaped ribs provided on the first incidence suppression unit or the second incidence suppression unit and disposed along a direction orthogonal to the installation surface in the inflow space, wherein the plurality of ribs is configured such that inflow of the gas flowing into the inflow space into the opening is not hindered by the plurality of ribs.

According to this embodiment, since the plurality of plate-shaped ribs which are provided on the first incidence suppression unit or the second incidence suppression unit and disposed along a direction orthogonal to the installation surface in the inflow space are included, ambient light can be reflected a plurality of times with respect to the ribs when the ambient light enters the detection space through inflow space, and the ambient light entering the detection space can be attenuated. In particular, ambient light entering in a direction substantially parallel to the installation surface can be prevented from being reflected a plurality of times and entering the opening. In addition, since the ribs are configured such that an inflow of gas flowing into the inflow space into the opening is not hindered by the ribs, it is possible to ensure an inflow property of gas flowing into the inflow space into the opening, and it becomes easier to maintain detection accuracy of the fire detection apparatus.

Another embodiment of the present invention provides the alarm apparatus according to the above embodiment, wherein the opening is disposed such that the entire opening faces an inner side portion of the inflow space, and the first incidence suppression unit and the second incidence suppression unit are configured such that a length in the direction orthogonal to the installation surface in the inner side portion of the inflow space is uniform, and a length in the direction orthogonal to the installation surface in an outer side portion of the inflow space increases toward an outer side.

According to this embodiment, since the opening is disposed such that the entire opening faces the inner side portion of the inflow space, and the first incidence suppression unit or the second incidence suppression unit are configured such that the length of the inflow space in the direction orthogonal to the installation surface in the inner side portion becomes uniform and the length of the inflow space in the direction orthogonal to the installation surface in the outer side portion increases toward the outer side, when compared to a case in which the length of the inflow space in the direction orthogonal to the installation surface in the inner side portion decreases toward the inner side, it becomes easy to ensure the inflow property of gas into the opening. In addition, when compared to a case in which the length of the inflow space in the direction orthogonal to the installation surface in the inner side portion increases toward the inner side, ambient light is inhibited from directly entering the detection space through the inflow space and the opening. Therefore, it becomes easier to maintain the inflow property of gas and the detection accuracy of the fire detection apparatus.

Another embodiment of the present invention provides the alarm apparatus according to the above embodiment, further comprising: a light emitting unit provided inside the first incidence suppression unit to irradiate the detection space with the detection light; a light receiving unit provided inside the first incidence suppression unit to receive scattered light generated when the detection light irradiated from the light emitting unit is scattered by the detection target in the detection space; and a light reception suppressing unit provided inside the first incidence suppression unit to inhibit the ambient light entering the detection space from being received by the light receiving unit.

According to this embodiment, since the light reception suppressing portion provided inside the first incidence suppression unit and used to inhibit ambient light entering the detection space from being received by the light receiving unit is included, the light reception suppressing portion can inhibit ambient light entering the detection space from being received by the light receiving unit, and it becomes easier to maintain the detection accuracy of the fire detection apparatus.

Another embodiment of the present invention provides the alarm apparatus according to the above embodiment, wherein the light reception suppressing unit includes a plurality of light shielding ribs arranged in parallel with an interval therebetween along an incidence direction of the detection light, each of the plurality of light shielding ribs having an insertion port for inserting the detection light, and the insertion port of each of the plurality of light shielding ribs is reduced in size toward a front side in the incidence direction.

According to this embodiment, since the insertion port of each of the plurality of light shielding ribs is reduced in size toward a front side in the incidence direction, when compared to a case in which the insertion port of each of the plurality of light shielding ribs are increased toward the front side in the incident direction, it is possible to inhibit detection light entering through the insertion port from exiting to the outside through the insertion port and it becomes easier to maintain the detection accuracy of the fire detection apparatus.

Another embodiment of the present invention provides the alarm apparatus according to the above embodiment, wherein the fire detection apparatus is a fire detection apparatus for detecting a fire in a monitored area and includes the detection space provided inside a light shielding area shielded from light from an outside and used to detect the detection target, a light emitting unit that irradiates the detection space with the detection light along a predetermined optical axis, a light receiving unit that receives scattered light generated when the detection light irradiated from the light emitting unit is scattered by the detection target in the detection space, a first reflecting unit provided in the light shielding area and used to reflect the detection light not to be parallel to the predetermined optical axis so that the detection light directly incident on and reflected by the first reflecting unit from the light emitting unit does not enter the light receiving unit, and a second reflecting unit provided at a different position from an installation position of the first reflecting unit in the light shielding area and used to reflect the detection light not to be parallel to the predetermined optical axis so that the detection light directly incident on and reflected by the second reflecting unit from the light emitting unit does not enter the light receiving unit.

According to this embodiment, since the first reflecting unit provided in the light shielding area and used to reflect detection light directly incident on and reflected by the first reflective portion from the light emitting unit not to be parallel to a predetermined optical axis such that the detection light does not enter the light receiving unit, and the second reflecting unit provided at a different position from the installation position of the first reflecting unit in the light shielding area and used to reflect detection light directly incident on and reflected by the second reflecting unit from the light emitting unit not to be parallel to a predetermined optical axis such that the detection light does not enter the light receiving unit are included, it is possible to inhibit detection light directly incident on and reflected by the first reflecting unit or the second reflecting unit from the light emitting unit from entering the light receiving unit. In particular, when compared to a case in which only one of the first reflecting unit or the second reflecting unit is provided, it is possible to effectively inhibit detection light in various irradiation directions or irradiation ranges from entering the light receiving unit. Therefore, it is possible to maintain detection accuracy of the fire detection apparatus.

Another embodiment of the present invention provides the alarm apparatus according to the above embodiment, wherein the fire detection apparatus is attached to an installation surface of an installation object, the installation surface being parallel to the predetermined optical axis, and the first reflecting unit is formed by inclining a part of a light shielding area formation member forming the light shielding area not to be perpendicular to the installation surface.

According to this embodiment, since the first reflecting unit is formed by inclining a part of the light shielding area formation member forming the light shielding area not to be perpendicular to the installation surface, it is unnecessary to separately provide a member for configuring the first reflecting unit. Thus, it is possible to omit an effort for attachment work of the first reflecting unit. In addition, when compared to a case in which the first reflecting unit is vertically formed, it is possible to reduce an installation space of the light shielding area formation member. For example, the fire detection apparatus is easily made compact.

Another embodiment of the present invention provides the alarm apparatus according to the above embodiment, wherein the fire detection apparatus is attached to an installation surface of an installation object, and the second reflecting unit includes a plurality of reflective walls vertically arranged along a direction parallel to the installation surface with an interval therebetween in the light shielding area, the plurality of reflective walls being allowed to reflect the detection light.

According to this embodiment, since the second reflecting unit includes the plurality of reflective walls which is vertically arranged along the direction parallel to the installation surface with an interval therebetween in the light shielding area and which can reflect detection light, for example, it is possible to reflect detection light reflected by any one of the plurality of reflective walls toward the adjacent reflective wall, and it is possible to further inhibit detection light reflected by the plurality of reflective walls from entering the light receiving unit.

Another embodiment of the present invention provides the alarm apparatus according to the above embodiment, wherein the plurality of reflective walls of the second reflecting unit is disposed such that a reflective surface of each of the plurality of reflective walls of the second reflecting unit is orthogonal to the installation surface.

According to this embodiment, since the plurality of reflective walls of the second reflecting unit is disposed such that the reflective surface of each of the plurality of reflective walls of the second reflecting unit is orthogonal to the installation surface, when compared to a case in which the reflective walls are disposed such that the reflective surface of each of the plurality of reflective walls of the second reflecting unit is not orthogonal to the installation surface, it is possible to effectively reflect detection light reflected by any one of the plurality of reflective walls toward the adjacent reflective wall, and it is possible to further inhibit detection light reflected by the plurality of reflective walls from entering the light receiving unit.

Another embodiment of the present invention provides the alarm apparatus according to the above embodiment, wherein the plurality of reflective walls of the second reflecting unit is provided in a portion corresponding to the first reflecting unit at an outer edge of the light shielding area.

According to this embodiment, since the plurality of reflective walls of the second reflecting unit is provided at the portion corresponding to the first reflecting unit at the outer edge of the light shielding area, when compared to a case in which the plurality of reflective walls of the second reflecting unit is provided at a portion other than the outer edge of the light shielding area, it is possible to inhibit reception of detection light by the light receiving unit from being hindered by the plurality of reflective walls, and it is possible to allow detection light reflected by the first reflecting unit to effectively enter any one of the plurality of reflective walls. Therefore, it is possible to inhibit detection light reflected by the first reflecting unit from entering the light receiving unit while ensuring a desired quantity of received light in the light receiving unit.

REFERENCE SIGNS LIST

1A Attachment base
2A Outer cover
3A Light shielding space
4A Smoke detection unit cover
5A Insect screen
6A Circuit board
11A Attachment surface
21A Main body
21aA Division point
22A Guide portion
23A Rib
31A Detection point
32A Occurrence space
41A Smoke detection unit cover-side inflow/outflow opening
42A Component accommodation portion
42aA Communication opening
43A Smoke detection unit cover-side inclined portion
61A First light emitting unit
62A Second light emitting unit
63A Light receiving unit
100A Detector
211A Outer cover-side inflow/outflow opening
221A Guide portion-side inclination portion
600A Absorbing layer
611A First light emitting-side optical axis
621A Second light emitting-side optical axis
631A Light receiving-side optical axis
900A Installation surface
AD Acute angle
1B Attachment base
2B Outer cover
3B Light shielding space
4B Smoke detection unit cover
5B Insect screen
6B Circuit board
7B Light guiding space
11B Attachment surface
21B Main body
21aB Division point
22B Guide portion
23B Rib
31B Detection point
32B Occurrence space
41B Smoke detection unit cover-side inflow/outflow opening
42B Smoke detection unit cover side substrate facing opening
43B Smoke detection unit cover-side inclined portion
44B Smoke detection unit cover side component accommodation portion
45B Positioning projection
46B Light guiding space groove
61B First light emitting unit
62B Second light emitting unit
63B Light receiving unit
100B Detector
211B Outer cover-side inflow/outflow opening
221B Guide portion-side inclination portion
400B Circuit board side facing surface
441B First light emitting unit accommodation portion 441aB First light emitting unit substrate side opening
441bB First light emitting unit light shielding space side opening
442B Second light emitting unit accommodation portion
442aB Second light emitting unit substrate side opening
442bB Second light emitting unit light shielding space side opening
443B Light receiving unit accommodation portion
443aB Light receiving unit substrate side opening
600B Absorbing layer
601B Reflective layer
602B Positioning hole
611B First light emitting-side optical axis
612B First light emitting element
613B First light emitting side optical component
621B Second light emitting-side optical axis
622B Second light emitting element
631B Light receiving-side optical axis
632B Light receiving element
900B Installation surface
1C Fire detection apparatus
2C Installation surface
10C Attachment base
20C Outer cover
21C Outer cover body
22C Top surface portion
22aC Display hole
23C First rib portion
24C Second rib portion
30C Inner cover
30aC First opening
40C Inflow space
50C Insect screen
60C Detection space
70C Detector cover
70aC Second opening
80C Detector body
81aC First prism lens portion
81bC Second prism lens portion
81cC Third prism lens portion
82C Chamber portion
83C First chamber portion
83aC First incidence port
83bC First incidence port
84C Second chamber portion
84aC Second incidence port
84bC Second incidence port
85C Third chamber portion
85aC Third incidence port
85bC Third incidence port
86aC First substrate side depression
86bC Second substrate side depression
86cC Third substrate side depression
86dC Fourth substrate side depression
86eC Fifth substrate side depression
87aC First detection space side depression
87bC Second detection space side depression
87cC Third detection space side depression
90C Terminal board
91C Attachment member
100C Substrate
104aC Light guide
C Component
L1C First light emitting-side optical axis
L2C Second light emitting-side optical axis
L3C Light receiving-side optical axis
1D Fire detection apparatus
2D Installation surface
10D Attachment base
20D Outer cover
21D Outer cover body
22D Top surface portion
22aD Display hole
23D First rib portion
24D Second rib portion
30D Inner cover
30aD First opening
40D Inflow space
50D Insect screen
60D Detection space
70D Detector cover
70aD Second opening
80D Detector body
81aD First prism lens portion
81bD Second prism lens portion
81cD Third prism lens portion
82D Chamber portion
83D First chamber portion
83bD First insertion port
84D Second chamber portion
84bD Second insertion port
85D Third chamber portion
85aD Third insertion port
90D Terminal board
91D Attachment member
100D Substrate
104aD Light guide
110D Light reception suppressing portion
111D First light shielding rib
112D Second light shielding rib
113D Third light shielding rib
L1D, L2D Ambient light
LL Light receiving-side optical axis
1E Fire detection apparatus
2E Installation surface
10E Attachment base
20E Outer cover
21E Outer cover body
22E Top surface portion
22aE Display hole
23E First rib portion
24E Second rib portion
30E Inner cover
30aE First opening
40E Inflow space
50E Insect screen
60E Detection space
70E Detector cover
70aE Second opening
80E Detector body
80aE Light shielding area
81aE First prism lens portion
81bE Second prism lens portion
81cE Third prism lens portion
82E Chamber portion
83E First chamber portion
83bE First incidence port
84E Second chamber portion
84bE Second incidence port
85E Third chamber portion
85aE Third incidence port
90E Terminal board
91E Attachment member
100E Substrate 104aE Light guide
110E First reflective portion
120E Second reflective portion
121E Reflective wall
L1E First detection light
L2E Second detection light

The invention claimed is:

1. A fire detection apparatus which is a scattered light detector attached to an installation surface of an installation object, comprising
   an attachment surface facing the installation surface,
   an inflow opening that allows a detection target to flow into the fire detection apparatus,
   a detection space into which the detection target flows, detection light being allowed to enter the detection space, and the detection space provided in a light shielding area shielded from light from an outside,
   a light emitting unit that emits the detection light along a light emitting-side optical axis toward the detection space,
   a light receiving unit that receives scattered light generated when the detection light emitted from the light emitting unit is scattered by the detection target flowing into the detection space along a light receiving-side optical axis intersecting the light emitting-side optical axis, and
   a reflecting unit that primarily reflects the detection light emitted from the light emitting unit in a direction intersecting a plane defined by the light emitting-side optical axis and the light receiving-side optical axis, wherein
   the inflow opening is provided on an opposite side of the attachment surface with respect to the detection space,
   the reflecting unit is provided closer to an outside of the fire detection apparatus than an outer edge of the inflow opening,
   the reflecting unit is formed by inclining at least a part on the light emitting-side optical axis in a light shielding area formation member forming the light shielding area; and,
   the reflecting unit primarily reflects the detection light emitted from the light emitting unit to a side of the attachment surface and to the outside of the fire detection apparatus than the outer edge of the inflow opening.

2. The fire detection apparatus according to claim 1, wherein when the detection light primarily reflected by the reflecting unit is reflected once in the light shielding area after the primary reflection and returns to the reflecting unit, the reflecting unit reflects the returning detection light to a side of the light emitting unit.

3. The fire detection apparatus according to claim 1,
   wherein at least a part of the light shielding area is surrounded by a circuit board,
   the circuit board includes an absorbing layer that absorbs light, and
   the reflecting unit primarily reflects the detection light emitted from the light emitting unit to the absorbing layer.

4. The fire detection apparatus according to claim 1, wherein the detection target is smoke.

5. The fire detection apparatus according to claim 1, further comprising
   a second reflecting unit provided at a different position from an installation position of the reflecting unit in the light shielding area and used to reflect the detection light not to be parallel to the predetermined optical axis so that the detection light directly incident on and reflected by the second reflecting unit from the light emitting unit does not enter the light receiving unit.

6. The fire detection apparatus according to claim 5,
   the second reflecting unit includes a plurality of reflective walls vertically arranged along a direction parallel to the installation surface with an interval therebetween in the light shielding area, the plurality of reflective walls being allowed to reflect the detection light.

7. The fire detection apparatus according to claim 6, wherein the plurality of reflective walls of the second reflecting unit is disposed such that a reflective surface of each of the plurality of reflective walls of the second reflecting unit is orthogonal to the installation surface.

8. The fire detection apparatus according to claim 6, wherein the plurality of reflective walls of the second reflecting unit is provided in a portion corresponding to the first reflecting unit at an outer edge of the light shielding area.

* * * * *